(12) United States Patent
Canton et al.

(10) Patent No.: US 10,997,364 B2
(45) Date of Patent: May 4, 2021

(54) OPERATIONS ON SOUND FILES ASSOCIATED WITH CELLS IN SPREADSHEETS

(71) Applicant: Microsoft Technology Licensing, LLC, Redmond, WA (US)

(72) Inventors: Christian Canton, Bellevue, WA (US); John Campbell, Woodinville, WA (US); Samuel C. Radakovitz, Bellevue, WA (US); Matthew Hart Fichtner, Seattle, WA (US); Carlos Augusto Otero, Seattle, WA (US); Benjamin Edward Rampson, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 341 days.

(21) Appl. No.: 15/199,953

(22) Filed: Jun. 30, 2016

(65) Prior Publication Data

US 2017/0124044 A1 May 4, 2017

Related U.S. Application Data

(60) Provisional application No. 62/357,292, filed on Jun. 30, 2016, provisional application No. 62/357,284,
(Continued)

(51) Int. Cl.
*G06F 40/18* (2020.01)
*G06F 3/0484* (2013.01)
(Continued)

(52) U.S. Cl.
CPC ............ *G06F 40/18* (2020.01); *G06F 3/0482* (2013.01); *G06F 3/04817* (2013.01);
(Continued)

(58) Field of Classification Search
CPC ...... G06F 17/246; G06F 16/433; G06F 3/162; G06F 3/165; G06F 3/167; G06F 17/27; G06F 17/28
(Continued)

(56) References Cited

U.S. PATENT DOCUMENTS 5,717,939 A    2/1998  Bricklin et al.
5,850,629 A    12/1998 Holm et al.
(Continued)

FOREIGN PATENT DOCUMENTS

CN    101796829    8/2010
CN    102842323    12/2012
(Continued)

OTHER PUBLICATIONS

PCT Second Written Opinion in PCT/US2016/059135, dated Nov. 7, 2017, 6 pages.
(Continued)

*Primary Examiner* — Ariel Mercado
(74) *Attorney, Agent, or Firm* — NovoTechIP International PLLC

(57) ABSTRACT

Systems for associating audio files with cells of a spreadsheet are provided. Both audio files and data may be associated with a single cell of the spreadsheet. An audio file may be recorded, retrieved from storage, or converted from a document (e.g., using text-to-speech technology) for association with a spreadsheet. Upon association, audio parameters may be viewed and/or manipulated by a user, providing audio processing functionality within a spreadsheet. Controls may be provided for listening to the audio file and/or playing the audio file in response to spreadsheet data satisfying a condition. Text transcriptions (e.g., speech-to-text) of audio files may be inserted into the spreadsheet. For low vision users, audio transcriptions (e.g., text-to-speech) of
(Continued)

data may be generated and "played" for the user. Spreadsheet operations (e.g., sort and/or filter operations) may also be performed on a range of cells based on audio parameters of associated audio files.

20 Claims, 26 Drawing Sheets

Related U.S. Application Data filed on Jun. 30, 2016, provisional application No. 62/249,884, filed on Nov. 2, 2015, provisional application No. 62/249,869, filed on Nov. 2, 2015.

(51) Int. Cl.
| | |
|---|---|
| *G06F 3/16* | (2006.01) |
| *G06F 3/0481* | (2013.01) |
| *G06F 3/0488* | (2013.01) |
| *G06F 40/106* | (2020.01) |
| *G06F 40/177* | (2020.01) |
| *G06F 40/197* | (2020.01) |
| *G06K 9/00* | (2006.01) |
| *G06T 11/20* | (2006.01) |
| *G06T 11/60* | (2006.01) |
| *G10L 13/033* | (2013.01) |
| *G10L 15/26* | (2006.01) |
| *G11B 27/00* | (2006.01) |
| *G06F 3/0482* | (2013.01) |
| *G06T 1/00* | (2006.01) |

(52) U.S. Cl.
CPC ...... *G06F 3/04842* (2013.01); *G06F 3/04845* (2013.01); *G06F 3/04847* (2013.01); *G06F 3/04883* (2013.01); *G06F 3/162* (2013.01); *G06F 3/165* (2013.01); *G06F 40/106* (2020.01); *G06F 40/177* (2020.01); *G06F 40/197* (2020.01); *G06K 9/00* (2013.01); *G06K 9/00442* (2013.01); *G06K 9/00449* (2013.01); *G06K 9/00463* (2013.01); *G06T 11/206* (2013.01); *G06T 11/60* (2013.01); *G10L 13/033* (2013.01); *G10L 15/26* (2013.01); *G11B 27/00* (2013.01); *G06T 1/0007* (2013.01); *G06T 2200/24* (2013.01)

(58) Field of Classification Search
USPC ........................................................ 715/220
See application file for complete search history.

(56) References Cited

U.S. PATENT DOCUMENTS

| | | | |
|---|---|---|---|
| 5,860,064 A | 1/1999 | Henton | |
| 6,055,549 A | 4/2000 | Takano | |
| 6,065,013 A | 5/2000 | Fuh et al. | |
| 6,138,130 A | 10/2000 | Adler et al. | |
| 6,262,736 B1 | 7/2001 | Nelson | |
| 6,289,312 B1 | 9/2001 | Raman | |
| 6,377,965 B1 | 4/2002 | Hachamovitch et al. | |
| 6,415,305 B1 | 7/2002 | Agrawal et al. | |
| 6,496,832 B2 | 12/2002 | Chi et al. | |
| 6,640,234 B1 | 10/2003 | Coffen | |
| 6,701,485 B1 | 3/2004 | Igra et al. | |
| 6,779,151 B2 | 8/2004 | Cahill et al. | |
| 6,785,660 B1 | 8/2004 | Fedor et al. | |
| 6,988,241 B1 | 1/2006 | Guttman et al. | |
| 6,988,248 B1 | 1/2006 | Tang | |
| 7,047,484 B1 | 5/2006 | Becker et al. | |
| 7,138,575 B2 | 11/2006 | Childs et al. | |
| 7,350,141 B2 | 3/2008 | Kotler et al. | |
| 7,424,668 B2 | 9/2008 | DeSpain | |
| 7,430,709 B2 | 9/2008 | Cho | |
| 7,451,397 B2 | 11/2008 | Weber et al. | |
| 7,594,172 B2 | 9/2009 | Fish | |
| 7,639,873 B2 | 12/2009 | Qian | |
| 7,647,551 B2 | 1/2010 | Vigesaa et al. | |
| 7,761,782 B1 | 7/2010 | Warren et al. | |
| 7,849,395 B2 | 12/2010 | Ellis et al. | |
| 7,853,867 B2 | 12/2010 | Egilsson | |
| 7,885,811 B2 | 2/2011 | Zimmerman et al. | |
| 7,962,436 B2 | 6/2011 | Brelage et al. | |
| 8,091,024 B2 | 1/2012 | Graeber | |
| 8,121,842 B2 | 2/2012 | Shih et al. | |
| 8,145,999 B1* | 3/2012 | Barrus | G06F 3/0481 |
| | | | 715/716 |
| 8,161,372 B2 | 4/2012 | Ellis et al. | |
| 8,166,385 B2 | 4/2012 | Garcia-Molina et al. | |
| 8,515,241 B2 | 8/2013 | Forsyth et al. | |
| 8,516,389 B2 | 8/2013 | Fujimoto et al. | |
| 8,527,866 B2 | 9/2013 | Sutter et al. | |
| 8,640,022 B2 | 1/2014 | Waldman et al. | |
| 8,645,832 B2 | 2/2014 | Pea et al. | |
| 8,786,667 B2 | 7/2014 | Shanmukhadas | |
| 8,862,646 B1 | 10/2014 | Murayama et al. | |
| 9,020,999 B2 | 4/2015 | Rai Bhatti | |
| 9,042,653 B2 | 5/2015 | Lin et al. | |
| 9,066,145 B2 | 6/2015 | Kilar et al. | |
| 9,098,484 B2 | 8/2015 | Viry | |
| 9,124,856 B2 | 9/2015 | Deshpande et al. | |
| 9,129,234 B2 | 9/2015 | Campbell et al. | |
| 9,141,938 B2 | 9/2015 | Goldberg | |
| 9,256,589 B2 | 2/2016 | Chitilian et al. | |
| 9,280,533 B2 | 3/2016 | Rochelle et al. | |
| 9,430,954 B1 | 8/2016 | Dewhurst | |
| 9,830,047 B2* | 11/2017 | Kirsch | G06F 3/0482 |
| 10,311,141 B1 | 6/2019 | Olkin | |
| 10,535,370 B2* | 1/2020 | Silano | G06F 3/0482 |
| 2001/0007455 A1 | 7/2001 | Yoo | |
| 2002/0091871 A1 | 7/2002 | Cahill et al. | |
| 2002/0099552 A1 | 7/2002 | Rubin | |
| 2004/0246376 A1 | 12/2004 | Sekiguchi et al. | |
| 2005/0246642 A1 | 11/2005 | Valderas et al. | |
| 2006/0106618 A1 | 5/2006 | Racovolis et al. | |
| 2006/0179012 A1 | 8/2006 | Jacobs | |
| 2006/0212469 A1 | 9/2006 | Babanov et al. | |
| 2007/0124319 A1 | 5/2007 | Platt et al. | |
| 2007/0136652 A1 | 6/2007 | Ellis et al. | |
| 2007/0244702 A1 | 10/2007 | Kahn | |
| 2008/0016436 A1 | 1/2008 | Liu et al. | |
| 2008/0028288 A1 | 1/2008 | Vayssiere et al. | |
| 2008/0052083 A1 | 2/2008 | Shalev | |
| 2008/0156171 A1 | 7/2008 | Guldi | |
| 2008/0215959 A1 | 9/2008 | Lection | |
| 2008/0235625 A1 | 9/2008 | Holm et al. | |
| 2008/0276159 A1 | 11/2008 | Narayanaswami et al. | |
| 2009/0006466 A1 | 1/2009 | Ellis et al. | |
| 2009/0006939 A1 | 1/2009 | DeSpain et al. | |
| 2009/0037309 A1 | 2/2009 | Altberg | |
| 2009/0044090 A1 | 2/2009 | Gur et al. | |
| 2009/0158139 A1 | 6/2009 | Morris et al. | |
| 2009/0164880 A1* | 6/2009 | Lection | G06F 3/0481 |
| | | | 715/212 |
| 2009/0254206 A1 | 10/2009 | Snowdon | |
| 2010/0058163 A1 | 3/2010 | Garcia-Molina et al. | |
| 2010/0128855 A1 | 5/2010 | Demo et al. | |
| 2010/0131570 A1 | 5/2010 | Weinberg | |
| 2010/0205530 A1 | 8/2010 | Butin | |
| 2010/0211575 A1 | 8/2010 | Collins et al. | |
| 2011/0035652 A1 | 2/2011 | McGarry | |
| 2011/0066933 A1 | 3/2011 | Ludwig | |
| 2011/0072067 A1 | 3/2011 | Gartner | |
| 2011/0252299 A1 | 10/2011 | Lloyd et al. | |
| 2012/0013539 A1 | 1/2012 | Hogan et al. | |
| 2012/0013540 A1 | 1/2012 | Hogan | |
| 2012/0066574 A1* | 3/2012 | Lee | G06F 17/243 |
| | | | 715/202 |
| 2012/0069028 A1 | 3/2012 | Bouguerra | |
| 2012/0088477 A1 | 4/2012 | Cassidy | |
| 2012/0159298 A1 | 6/2012 | Fisher et al. | |
| 2012/0189203 A1 | 7/2012 | Lin et al. | |

(56) References Cited

U.S. PATENT DOCUMENTS

| | | |
|---|---|---|
| 2012/0236201 A1 | 9/2012 | Larsen |
| 2012/0324421 A1 | 12/2012 | Boeckenhauer et al. |
| 2013/0035075 A1 | 2/2013 | Seetharaman et al. |
| 2013/0036346 A1 | 2/2013 | Cicerone |
| 2013/0067305 A1 | 3/2013 | Golan |
| 2013/0110884 A1 | 5/2013 | Eakins |
| 2013/0124965 A1 | 5/2013 | Elias et al. |
| 2013/0131537 A1 | 5/2013 | Tam |
| 2013/0298016 A1 | 11/2013 | Chigier |
| 2014/0047312 A1 | 2/2014 | Ruble et al. |
| 2014/0053055 A1 | 2/2014 | Summers et al. |
| 2014/0081634 A1 | 3/2014 | Forutanpour |
| 2014/0122516 A1 | 5/2014 | Brewer et al. |
| 2014/0164890 A1 | 6/2014 | Fox et al. |
| 2014/0201126 A1 | 7/2014 | Zadeh |
| 2014/0244668 A1 | 8/2014 | Barrus et al. |
| 2014/0310746 A1 | 10/2014 | Larsen |
| 2014/0359417 A1 | 12/2014 | Bar-On |
| 2014/0372850 A1 | 12/2014 | Campbell et al. |
| 2014/0372857 A1 | 12/2014 | Otero et al. |
| 2014/0372858 A1 | 12/2014 | Campbell et al. |
| 2014/0372952 A1 | 12/2014 | Otero et al. |
| 2015/0050010 A1 | 2/2015 | Lakhani et al. |
| 2015/0100880 A1 | 4/2015 | Matas et al. |
| 2015/0142418 A1 | 5/2015 | Byron |
| 2015/0161250 A1 | 6/2015 | Elbaz |
| 2015/0378979 A1 | 12/2015 | Hirzel et al. |
| 2016/0070733 A1 | 3/2016 | Gould |
| 2016/0224536 A1 | 8/2016 | Thomas |
| 2016/0240187 A1 | 8/2016 | Fleizach |
| 2016/0336003 A1 | 11/2016 | Agiomyrgiannakis |
| 2016/0337059 A1 | 11/2016 | Nehls |
| 2017/0123756 A1 | 5/2017 | Canton et al. |
| 2017/0124043 A1 | 5/2017 | Canton et al. |
| 2017/0124045 A1 | 5/2017 | Canton et al. |
| 2017/0124049 A1 | 5/2017 | Campbell et al. |
| 2017/0124050 A1 | 5/2017 | Campbell et al. |
| 2017/0124056 A1 | 5/2017 | Radakovitz et al. |
| 2017/0337040 A1 | 11/2017 | Salvi et al. |
| 2020/0202069 A1 | 6/2020 | Campbell et al. |

FOREIGN PATENT DOCUMENTS

| | | |
|---|---|---|
| KR | 20140146350 | 12/2014 |
| WO | 157744 | 8/2001 |
| WO | 2005050973 | 6/2005 |

OTHER PUBLICATIONS

U.S. Appl. No. 15/199,968, Amendment and Response filed Oct. 12, 2017, 9 pages.

PCT Second Written Opinion in PCT/US2016/059303, dated Oct. 26, 2017, 8 pages.

U.S. Appl. No. 15/199,968, Notice of Allowance dated Nov. 13, 2017, 10 pages.

PCT Second Written Opinion in PCT/US2016/060194, dated Oct. 26, 2017, 7 pages.

U.S. Appl. No. 15/199,938, Office Action dated May 31, 2018, 36 pages.

U.S. Appl. No. 15/339,170, Office Action dated Jun. 28, 2018, 23 pages.

Wyatt, Allen, "Inserting a Sound File in Your Worksheet", Published on: Apr. 10, 2011, 2 pages, available at: http://excel.tips.net/T002864_Inserting_a_Sound_File_in_Your_Worksheet.html.

Azzarello, Pat, "Group Report: Improving Computer Audio and Music Production Systems User Interfaces", In Proceedings of Tenth Annual Interactive Music Conference, Oct. 13, 2005, 12 pages.

"Rivendell—Scenario: breakaway from normal programing to playout audiobook chapters, for a length of time and rejoing normal programming. And how to load and playout the audiobook discs/tracks in order", Published on: Apr. 3, 2016, 21 pages, aailable at: https://thebrettblog.wordpress.com/.

Virostek, Paul, "The Power User's Guide to Soundminer Metadata", Published on: Jun. 24, 2014, 12 pages, available at: http://www.creativefieldrecording.com/2014/06/24/the-power-users-guide-to-soundminer-metadata/.

Dalgleish, Debra, "Excel List of All MP3 Files in a Directory", Published on: May 5, 2009, 3 pages, available at: http://blog.contextures.com/archives/2009/05/05/excel-list-of-all-mp3-files-in-a-directory/.

"Trying to open audio files from spreadsheet using windows API", Retrieved on: Apr. 25, 2016, 3 pages, available at: http://stackoverflow.com/questions/34459965/trying-to-open-audio-files-from-spreadsheet-using-windows-api.

"Embedded Metadata in WAVE Files", Retrieved on: Apr. 25, 2016, 10 pages, available at: http://www.avpreserve.com/wp-content/uploads/2014/04/EmbeddedMetadata.pdf.

PCT International Search Report in PCT/US2016/059143, dated Apr. 3, 2017, 21 pages.

PCT International Search Report in PCT/US2016/060025, dated Apr. 7, 2017, 23 pages.

5 Ways to Extract Video Frames and Save to Images, Published on: Apr. 7, 2016, https://www.raymond.cc/blog/extract-video-frames-to-images-using-vlc-media-player/, 12 pages.

An Introduction to Data Validation in Excel, Published on: Mar. 15, 2014, http://trumpexcel.com/2014/03/learn-all-about-data-validation-in-excel/, 4 pages.

Anchor image to a cell, Published on: Jan. 14, 2012, http://apache-poi.1045710.n5.nabble.com/Anchor-image-to-a-cell-td4302682.html, 14 pages.

Canton et al., "Compound Data Types", Oct. 2, 2015, 16 pages.

Canton et al., "Condensed Core Design", Jul. 30, 2015, 312 pages.

Canton et al., "Rich Data Types", Jul. 30, 2015, 217 pages.

Chang, et al., "A Spreadsheet Model for Handling Streaming Data", In Proceedings of the 33rd Annual ACM Conference on Human Factors in Computing Systems, Apr. 18, 2015, 4 pages.

Chang, et al., "A spreadsheet model for using web service data", In Proceedings of IEEE Symposium on Visual Languages and Human-Centric Computing, Jul. 28, 2014, 8 pages.

Chang, et al., "A Spreadsheet Tool for Creating Web Applications Using Online Data", In Proceedings of CHI Workshop on End User Development in the Internet of Things Era, vol. 12, Issue 2, Apr. 18, 2015, 6 pages.

Combine the contents of multiple cells, Retrieved on: Jan. 25, 2016, https://support.office.com/en-us/article/Combine-the-contents-of-multiple-cells-3A86C317-6B91-4F1D-8781-203320AEFDCE, 3 pages.

Create an Excel Drop Down list with Search Suggestions, Published on: Oct. 19, 2013, http://trumpexcel.com/2013/10/excel-drop-down-list-with-search-suggestions/, 11 pages.

Deliver content using spreadsheet templates, Published on: Sep. 21, 2015, https://support.google.com/youtube/answer/6066171?hl=en, 3 pages.

Eastonz, Trevor, "Embed a Video in Microsoft Excel—It's a breeze", Published on: Jul. 18, 2013.

French, Ted, "Concatenate Text Data in Google Spreadsheets", Published on: Jun. 15, 2014, http://spreadsheets.about.com/od/exceltextfunctions/ss/2014-06-15-google-spreadsheets-concatenate-text-strings.htm#step1, 6 pages.

French, Ted, "Convert Measurements in Excel", Published on: Mar. 18, 2011, http://spreadsheets.about.com/od/excel2010functions/ss/2011-03-18-Convert-Measurements-In-Excel-2010.htm, 4 pages.

Hacid, et al., "A Database Approach for Modeling and Querying Video Data", In Proceedings of the15th International Conference on Data Engineering, vol. 12, No. 5, Sep. 2000, 22 pages.

Harvey, Greg, "How to Edit and Format Inserted Pictures in Excel 2013", Published on: Jan. 2013, http://www.dummies.com/how-to/content/how-to-edit-and-format-inserted-pictures-in-excel-.html, 3 pages.

How to Concatenate Cells in Excel, Published on: Jul. 9, 2007, https://wagda.lib.washington.edu/gishelp/tutorial/concatenate.pdf, 6 pages.

How to insert multiple pictures and resize them at once in Excel?, Published on: Oct. 9, 2014, http://www.extendoffice.com/documents/excel/1156-excel-insert-multiple-pictures.html, 18 pages.

(56) References Cited

OTHER PUBLICATIONS

How to insert picture into excel cell, Published on: May 30, 2013, http://trumpexcel.com/2013/05/insert-picture-into-excel-cell/, 9 page.
How to resize pictures to fit cells in Excel?, Published on: Jan. 15, 2013, http://www.extendoffice.com/documents/excel/1060-excel-resize-picture-to-fit-cell.html, 11 pages.
How to: Use Text-to-Speech in Excel 2002, Retrieved on: Jul. 7, 2016, https://support.microsoft.com/en-us/kb/288986, 4 pages.
Høydahl, Jan, "Cominvent AS—Enterprise Search Consultants", Published on: Jan. 25, 2012, http://www.cominvent.com/2012/01/25/super-flexible-autocomplete-with-solr/, 4 pages.
In-Cell Dropdown and Validation in Spreadsheets, Published on: Aug. 26, 2010, http://googledrive.blogspot.in/2010/08/in-cell-dropdown-and-validation-in.html, 27 pages.
Insert Images into Google Spreadsheet Cells, Published on: Apr. 15, 2016, https://www.bettercloud.com/monitor/the-academy/insert-images-into-google-spreadsheet-cells/, 3 pages.
Javaid, Usman, "Excel 2010: Merge Cells (Concatenation)", Published on: Mar. 25, 2010, http://www.addictivetips.com/microsoft-office/excel-2010-merge-cells-concatenation/, 19 pages.
Keng, Kuek Ser Kuang, "Edit video using spreadsheet—GS Video", Published on: Dec. 24, 2015, https://www.youtube.com/watch?v=-bwFdhJg1MA, 2 pages.
Klement, Scott, "Load Images into Your HSSF Spreadsheets", Published on: Dec. 11, 2008, http://www.easy400.net/hssfcgi/documentation/20081211.html, 9 pages.
Levoy, Marc, "Spreadsheets for Images", In Proceedings of 21st International ACM Conference on Computer Graphics and Interactive Techniques, Jul. 24, 1994, 8 pages.
Lim, Jon, "Google Spreadsheets: Count with Multiple Values in Cells", Published on: Apr. 7, 2014, http://jonlim.ca/2014/04/google-spreadsheets-count-multiple-values-cells/, 5 pages.
Machlis, Sharon, "How to create an automatically updating Google spreadsheet", Published on: Dec. 8, 2013, http://www.computerworld.com/article/2469616/business-intelligence/business-intelligence-79661-how-to-create-an-automatically-updating-spreadsheet.html, 2 pages.
Powerful transcription that's ready for work, Published on: Dec. 17, 2015, http://australia.nuance.com/dragon/transcription-solutions/index.htm, 5 pages.
Puls, Ken, "Using VLOOKUP to return a picture", Published on: Feb. 7, 2014, http://www.cga-pdnet.org/pdf/vlookupforpictures.pdf, 7 pages.
Reynolds, Janine, "New in Smartsheet: See Images in Your Sheets", Published on: Jan. 15, 2016, https://www.smartsheet.com/blog/new-in-smartsheet-embed-images, 16 pages.
Sartain, JD., "How to create relational databases in Excel 2013", Published on: Aug. 7, 2014, http://www.pcworld.com/article/2462281/how-to-create-relational-databases-in-excel-2013.html, 11 pages.
Singh, et al., "Transforming Spreadsheet Data Types using Examples", In Proceedings of Annual Symposium on Principles of Programming Languages, Oct. 26, 2015, 13 pages.
Trevi, Javier, "Showing all available MySQL data types when creating a new table with MySQL for Excel", Published on: Jul. 23, 2014, https://blogs.oracle.com/MySqlOnWindows/entry/showing_all_available_mysql_data, 8 pages.
Use Formula AutoComplete, Retrieved on: Oct. 26, 2015, https://support.office.com/en-us/article/Use-Formula-AutoComplete-6d13daa5-e003-4431-abab-9edef51fae6b, 4 pages.
Vaziri, et al., "Stream Processing with a Spreadsheet", In Proceedings of European Conference on Object-Oriented Programming, Jul. 28, 2014, 25 pages.
Wyatt, Allen, "Conditionally Playing an Audio File", Published on: Oct. 10, 2011 http://excel.tips.net/T006559_Conditionally_Playing_an_Audio_File.html, 2 pages.
Wyatt, Allen, "Displaying Images based on a Result", Published on: Apr. 10, 2011, http://excel.tips.net/T003128_Displaying_Images_based_on_a_Result.html, 10 pages.
Wyatt, Allen, "Displaying Images based on a Result", Published on: Oct. 28, 2011, http://excel.tips.net/T003128_Displaying_Images_based_on_a_Result.html, 9 pages.
Wyatt, Allen, "Hiding Graphics when Filtering", Retrieved on: Jul. 8, 2016, http://excel.tips.net/T003866_Hiding_Graphics_when_Filtering.html, 2 pages.
Wyatt, Allen, "Inserting a Voice Annotation in Your Worksheet", Published on: Oct. 19, 2011, http://excel.tips.net/T002870_Inserting_a_Voice_Annotation_in_Your_Worksheet.html, 2 pages.
Wyatt, Allen, "Sorting with Graphics", Published on: Oct. 28, 2011, http://excel.tips.net/T002954_Sorting_with_Graphics.html, 2 pages.
U.S. Appl. No. 15/199,938, Office Action dated Dec. 6, 2017, 24 pages.
Launch Excel, Series: Resize & autofit column widths, copyright 2011, published by www.launchexcet.com, http://web.archive.org/web/20110924045718/https://www.launchexcel.com/column-width-resize, 2 pages.
PCT International Preliminary Report on Patentability in PCT/US2016/059303, dated Jan. 18, 2018, 9 pages.
PCT International Preliminary Report on Patentability in PCT/US2016/060194, dated Jan. 18, 2018, 8 pages.
PCT International Preliminary Report on Patentability in PCT/US2016/059135, dated Jan. 30, 2018, 16 pages.
"PhotoSpread Quick User's Manual", WebArchive online PDF, Jul. 8, 2011, 7 pages, http://web.archive.org/web/20110708161116/http://infolab.stanford.edu/~paepcke/shared-documents/photospread/photospreadmanual010309.pdf.
Chang, et al., "Creating interactive web data applications with spreadsheets", In Proceedings of the 27th annual ACM symposium on User interface software and technology, Oct. 5, 2014, pp. 87-96.
Kandel et al., "PhotoSpread: A Spreadsheet for Managing Photos", The 26th Annual CHI Conference on Human Factors in Computing Systems, Conference Proceedings, Apr. 5, 2005, in Florence, Italy, 10 pages.
Kandel et al., "The PhotoSpread Query Language", Sep. 6, 2007, http://ilpubs.stanford.edu:8090/812/1/2007-27.pdf, abstract only ,1 page.
Wyatt, Allen, "Generating Automatic Links to Audio Files (Microsoft Excel)" Jun. 7, 2014, http://excelribbon.tips.net/T013127_Generating_Automtic_Links_to_audio_files.html, 4 pages.
PCT Invitation to Pay Additional Fees in PCT/US2016/059143, dated Feb. 9, 2017, 9 pages.
PCT International Search Report in PCT/US2016/059135, dated Feb. 16, 2017, 15 pages.
PCT International Search Report in PCT/US2016/060194, dated Feb. 16, 2017, 14 pages.
PCT International Search Report in PCT/US2016/059303, dated Feb. 16, 2017, 17 pages.
Converting test to speech in Excel, Sep. 29, 2015, 2 pages, http://web.archive.org/web/20150929113340/https://support.office/com/en-us/article/converting-text-to-speech-in-excel-3f2ca8c0-90e2-4391-8e69-573832ea7300#toc307831251.
Wang et al., "Development of an image processing based sheet music recognition system for iOS device", 2014 IEEE International Conference on Consumer Electronics, May 26, 2014, 2 pages.
Inglis, "DoReMIRE ScoreCloud", SOS Sound on Sound, Jan. 1, 2015, http://www.soundonsound.com/reviews/doremir-scorecloud, 4 pages.
Bakke et al., "A spreadsheet-based user interface for managing plural relationships in structured data", Human Factors in Computing Systems, May 7, 2011, 10 pages.
PCT Invitation to Pay Additional Fees in PCT/US2016/060180, dated Feb. 9, 2017, 8 pages.
U.S. Appl. No. 15/199,968, Office Action dated Jul. 12, 2017, 20 pages.
Brian C. Whitmer, "Brigham Young University Improving Spreadsheets for Complex Problems", All These and Dissertations, Paper 1713, Apr. 8, 2008, http://scholarsarchive.byu.edu/cgi/viewcontent.cgl?artcile=2712&context=etd, pp. 1-7, 15-26.
PCT International Search Report and Written Opinion in PCT/US2016/060180, dated Jul. 12, 2017, 22 pages.

(56) References Cited

OTHER PUBLICATIONS

Han et al., "Situational data integration with data services and nested table", Service Oriented Computing and Applications, vol. 7, No. 2, Apr. 27, 2012, pp. 129-150.
U.S. Appl. No. 15/340,187, Office Action dated May 18, 2018, 32 pages.
PCT International Preliminary Report on Patentability in PCT/US2016/060025, dated May 8, 2018, 16 pages.
PCT International Preliminary Report on Patentability in PCT/US2016/060180, dated May 8, 2018, 15 pages.
U.S. Appl. No. 15/199,938, Amendment and Response filed Apr. 6, 2018, 21 pages.
PCT International Preliminary Report on Patentability in PCT/US2016/059143, dated May 8, 2018, 13 pages.
"Final Office Action Issued in U.S. Appl. No. 15/339,170", dated Jan. 11, 2019, 21 Pages.
"Final Office Action Issued in U.S. Appl. No. 15/340,874", dated Feb. 5, 2019, 22 Pages.
"Final Office Action Issued in U.S. Appl. No. 15/340,187", dated Jan. 2, 2019, 52 pages.
"Non-Final Office Action Issued in U.S. Appl. No. 15/340,201", dated Jan. 2, 2019, 14 pages.
"Non Final Office Action Issued in U.S. Appl. No. 15/199,938", dated Oct. 5, 2018, 34 pages.
"Non Final Office Action Issued in U.S. Appl. No. 15/340,874", dated Sep. 28, 2018, 28 Pages.
"Sort and Filter: The basics of spreadsheets," School of Data, copyright 2012, schoolofdata.org, Retrieved From: https://web.archive.org/web/20121217023142/https://schoolofdata.org/handbook/courses/sort-and-filter, 2012., 8 Pages.
"Final Office Action Issued in U.S. Appl. No. 15/199,938", dated Feb. 26, 2019, 37 Pages.
"Advisory Action Issued in U.S. Appl. No. 15/340,187", dated Mar. 26, 2019, 5 Pages.
"Non-Final Office Action Issued in U.S. Appl. No. 15/340,187", dated May 1, 2019, 60 Pages.
"Non Final Office Action Issued in U.S. Appl. No. 15/339,170", dated Oct. 4, 2019, 25 Pages.
"Non Final Office Action Issued in U.S. Appl. No. 15/199,938", dated Jun. 27, 2019, 24 Pages.
"Final Office Action Issued in U.S. Appl. No. 15/340,201", dated Jul. 11, 2019, 15 Pages.
"Advisory Action Issued in U.S. Appl. No. 15/340,874", dated Jun. 10, 2019, 4 Pages.
"Non Final Office Action Issued in U.S. Appl. No. 15/340,874", dated Jun. 27, 2019, 22 Pages.
"Advisory Action Issued in U.S. Appl. No. 15/339,170", dated Jul. 5, 2019, 5 Pages.
"Notice of Allowance Issued in U.S. Appl. No. 15/340,187", dated Sep. 18, 2019, 9 Pages.
"Final Office Action Issued in U.S. Appl. No. 15/340,874", dated Nov. 20, 2019, 24 Pages.
"Non Final Office Action Issued in U.S. Appl. No. 15/340,201", dated Apr. 24, 2020, 16 Pages.
"Non Final Office Action Issued in U.S. Appl. No. 15/340,874", dated Mar. 12, 2020, 25 Pages.
"Final Office Action Issued in U.S. Appl. No. 15/340,874", dated Sep. 4, 2020, 13 Pages.
"Final Office Action Issued in U.S. Appl. No. 15/340,201", dated Sep. 22, 2020, 16 Pages.
"Non Final Office Action Issued in U.S. Appl. No. 16/806,977", dated Jan. 28, 2021, 23 Pages.
"Non Final Office Action Issued in U.S. Appl. No. 15/340,201", dated Mar. 17, 2021, 19 Pages.

* cited by examiner

OPERATIONS ON SOUND FILES ASSOCIATED WITH CELLS IN SPREADSHEETS

RELATED APPLICATIONS

This application claims priority to U.S. Provisional Application No. 62/249,884, entitled "Compound Data Types," filed on Nov. 2, 2015; U.S. Provisional Application No. 62/249,869, entitled "Rich Data Types," filed Nov. 2, 2015; U.S. Provisional Application No. 62/357,292, entitled "Compound Data Objects," filed on Jun. 30, 2016; and U.S. Provisional Application No. 62/357,284, entitled "Rich Data Types," filed on Jun. 30, 2016; the entire disclosures of which are hereby incorporated in their entireties herein by reference.

BACKGROUND

Today, there is no notion of embedding sound into spreadsheets without custom code. More importantly, even if sound is embedded using custom code, the properties of the sound file cannot be accessed and operated on by the spreadsheet application. Accordingly, spreadsheets cannot analyze sound files, play sound files in response to business logic, or otherwise integrate sound processing or sound recognition into the spreadsheet logic. Additionally, current spreadsheets are ill-suited for providing new features in a touch- or mobile-first world where sound recordings are immediately and universally available. Nor are current spreadsheets well-suited for low-vision readers, who use sound to make sense of data in a spreadsheet.

It is with respect to these and other general considerations that embodiments have been described. Also, although relatively specific problems have been discussed, it should be understood that the embodiments should not be limited to solving the specific problems identified in the background.

SUMMARY

The disclosure generally relates to a system and methods for associated one or more audio files with one or more cells of a spreadsheet. In aspects, when an audio file is associated with one or more cells, the audio file may be treated as a new type of value in the one or more cells. In further aspects, both an audio file and additional data may be associated with a single cell of the spreadsheet. In some cases, a user may make an audio recording, e.g., on a mobile device, and associate the audio recording with a spreadsheet provided by a mobile spreadsheet application. Alternatively, the spreadsheet application may have the capability to generate sound from data using various algorithms to create an audio file. For instance, the spreadsheet application may perform transcription on documents (text-to-speech), convert a chart or a range of values into sound and/or use optical character recognition (OCR) on sheet music generate music. The spreadsheet application may then associate the audio file with a spreadsheet. In aspects, an associated audio file may be anchored to a cell or a range of cells within the spreadsheet or may be allowed to float over the grid.

Upon associating an audio file with a spreadsheet, various audio parameters (e.g., pitch, length, speed, volume, etc.) may be surfaced for viewing and/or manipulation by a user. For instance, by exposing operations for adjusting audio parameters, audio processing functionality is provided. Additionally, user interface (UI) controls may be provided for listening to the audio file, as well as logic for automatically playing the audio file when certain conditions in spreadsheet data are met. In further aspects, transcription (e.g., speech-to-text) of an audio file may be performed and the text transcription may be inserted into a comment bubble, into the same cell as the audio file, or into different cell or cells of the spreadsheet. Moreover, for low vision users, transcription (e.g., text-to-speech) of data within cells of the spreadsheet may be performed and the data may be "played" for the user at any time. Spreadsheet operations (e.g., sort and/or filter operations) may also be performed on a range of cells based on audio parameters of associated audio files.

In aspects, a system is provided that includes a processing unit and a memory storing computer executable instructions that, when executed by the processing unit, cause the system to perform a method. The method includes selecting at least one cell of a spreadsheet, wherein the at least one cell is associated with at least one audio file. The method further includes retrieving one or more parameters of the at least one audio file and exposing one or more operations. Additionally, the method includes performing an operation on at least one parameter of the at least one audio file.

In further aspects, a method for performing operations on a range of cells within a spreadsheet is provided. The method includes receiving a selection of a range of cells within a spreadsheet, wherein the range of cells is associated with a plurality of audio files. The method further includes retrieving one or more parameters for each of the plurality of audio files and exposing one or more operations based at least in part on the one or more parameters. Additionally, the method includes performing an operation on the range of cells.

In still further aspects, a computer-readable storage medium is provided that stores computer executable instructions. The computer executable instructions, when executed by at least one processing unit, cause a computing device to receive a selection of at least one cell of a spreadsheet, wherein the at least one cell is associated with at least one audio file. The computer executable instructions further causing the computing device to identify a plurality of tracks for the at least one audio file and splice the audio file into the plurality of tracks. Additionally, the computer executable instructions cause the computing device to provide a user interface displaying a visual representation for each of the plurality of tracks.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
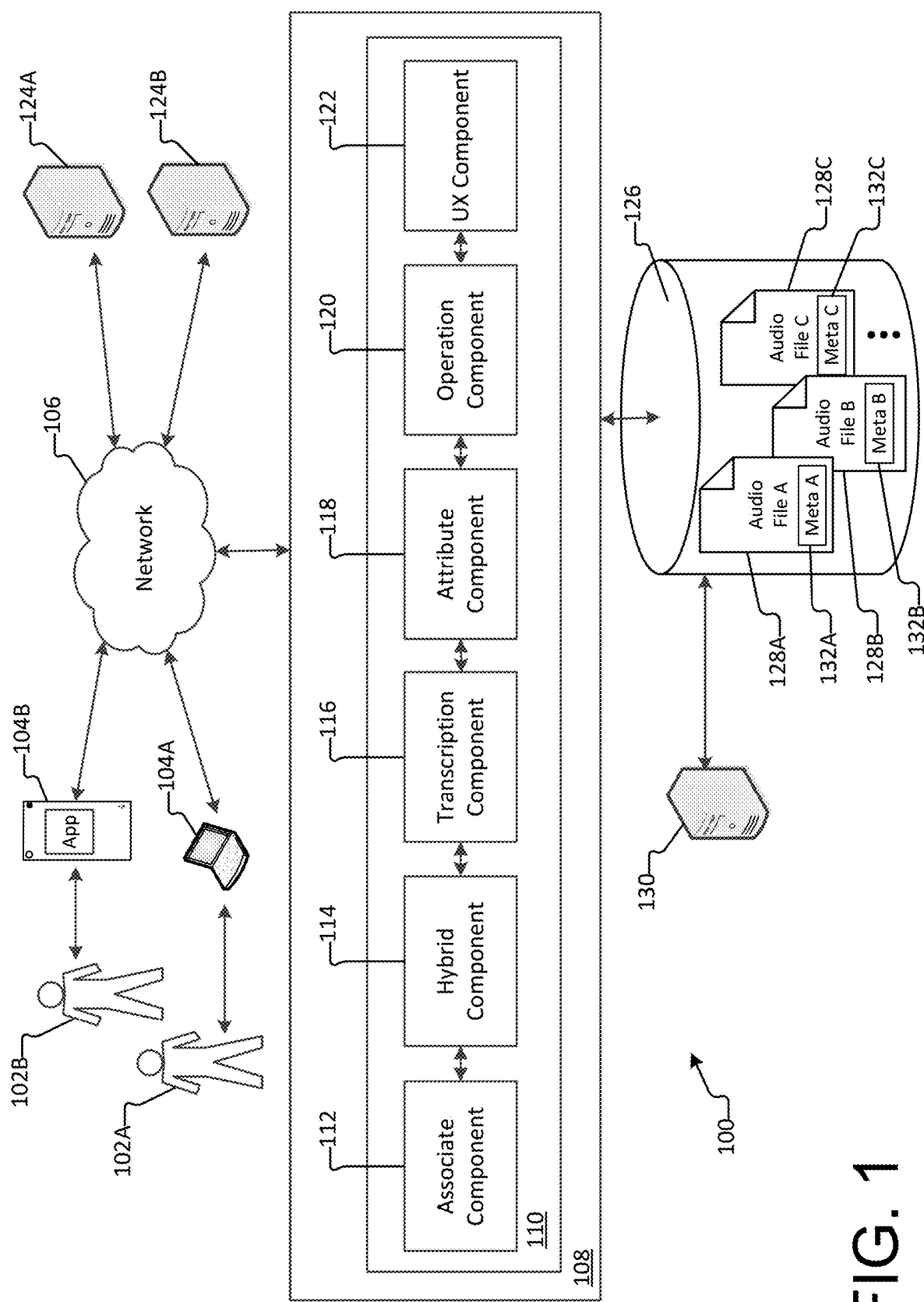
FIG. 1 illustrates a system for associating one or more audio files with one or more cells in a spreadsheet, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, the disclosure generally relates to a system and methods for associating one or more audio files with a spreadsheet. In further aspects, both an audio file and additional data may be associated with a cell of the spreadsheet. In some cases, a user may make an audio recording, e.g., on a mobile device, and associate the audio recording with a spreadsheet provided by a mobile spreadsheet application. Alternatively, the spreadsheet application may have the capability to perform transcription on documents (text-to-speech) and/or optical character recognition (OCR) on sheet music, convert the document or sheet music into an audio file, and associate the audio file with a spreadsheet. Additionally or alternatively, a function may calculate a translation from a musical score for piano to a musical score for saxophone (e.g., a scale and note translation may result in new values for each note in the music, where the 'result' is the new score). In aspects, an associated audio file may be anchored to a cell or a range of cells within the spreadsheet or may be allowed to float over the grid. However, even if the audio file is allowed to float, the audio file may be referenced by a function in the spreadsheet and operations may be performed on the audio file.

Upon associating an audio file with a spreadsheet, various audio parameters (e.g., pitch, length, speed, volume, etc.) may be surfaced for viewing and/or manipulation by a user. For instance, by exposing operations for adjusting audio parameters, audio processing functionality is provided. Additionally, user interface (UI) controls may be provided for listening to the audio file (e.g., play, stop, pause, etc.), as well as logic for automatically playing the audio file when certain conditions in spreadsheet data are met (e.g., revenue numbers hit certain values). In further aspects, transcription (e.g., speech-to-text) of an audio file may be performed and the text transcription may be inserted into a comment bubble, into the same cell as the audio file, or into different cell or cells of the spreadsheet. Moreover, for low vision users, transcription (e.g., text-to-speech) of data within cells of the spreadsheet may be performed and the data may be "played" for the user at any time. For instance, a range of values may be described as sound by mapping volume, pitch, etc., to the values. Spreadsheet operations (e.g., sort and/or filter operations) may also be performed based on the parameters of associated audio files (e.g., based on pitch, length, etc.). It is with respect to these and other general considerations that embodiments have been made.

FIG. 1 illustrates a system for associating one or more audio files with one or more cells in a spreadsheet, according to an example embodiment.

System 100 may include one or more client computing devices 104 (e.g., client computing devices 104A and 104B) that may execute a client version of a spreadsheet application capable of associating audio files with cells in a spreadsheet. In some examples, the client spreadsheet application may execute locally on a client computing device 104. In other examples, a client spreadsheet application (e.g., a mobile app on a thin client computing device 104) may operate in communication (e.g., via network 106) with a corresponding server version of spreadsheet application 110 executing on one or more server computing devices, e.g., server computing device 108. In still other aspects, rather than executing a client version of a spreadsheet application, the one or more client computing devices 104 may remotely access, e.g., via a browser over network 106, the spreadsheet application 110 implemented on the server computing device 108 or multiple server computing devices (e.g., in a distributed computing environment such as a cloud computing environment).

As illustrated by FIG. 1, a server version of spreadsheet application 110 is implemented by server computing device 108. As should be appreciated, the server version of spreadsheet application 110 may also be implemented in a distributed environment (e.g., cloud computing environment) across a plurality of server computing devices (not shown). Moreover, as should be appreciated, either a client or a server version of the spreadsheet application 110 may be capable of associating one or more audio files with cells of a spreadsheet. While a server version of the spreadsheet application 110 and associated components 112-122 are shown and described, this should not be understood as limiting. Rather, a client version of spreadsheet application 110 may similarly implement components 112-122 on a client computing device 104.

In a basic configuration, the one or more client computing devices 104 are personal or handheld computers having both input elements and output elements operated by one or more users 102 (e.g., user 102A and user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client spreadsheet application and/or remotely accessing spreadsheet application 110 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As described above, the spreadsheet application 110 may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud computing environment). Server computing device 108 may provide data, including audio data and audio attributes, associated with cells of a spreadsheet to and from the one or more client computing devices 104 and/or one or more other server computing devices (e.g., server computing devices 124A and/or 124B) via network 106.

As used herein, sound waves may be digitally encoded (e.g., by pulse-code modulation), in some cases processed (e.g., filtered, edited, etc.) and/or compressed (e.g., based on a codec to reduce file size), and stored as an audio file in a file format identified by a file extension, such as .wav, .wma, .aiff, .m4a, .snd, .mp3, .omf, etc. For example, a microphone of a mobile device may record (or capture) sound waves (e.g., of a conversation) and may convert the sound waves into an analog electric signal. An analog-to-digital converter (ADC) may then convert the analog signal into a digital signal, e.g., generally using pulse-code modulation. In some cases, the ADC may be available on the mobile device, while in other cases the analog signal may be downloaded from the mobile device and converted to a digital signal on another device (e.g., personal or server computing device). The digital signal may be processed and/or compressed and stored in a file format (e.g., audio data), as detailed above. Later, when an audio file is played, the digital signal may be converted back to an analog electrical signal using a digital-to-audio converter (DAC) for transmission to a speaker.

In aspects, an audio file may be retrieved based on a file locator, which may be a uniform resource locator (URL) identifying a file path to a local storage location or a remote storage location. In aspects, one or more audio files (e.g., audio files 128A, 128B, and 128C) may be stored in a storage location (e.g., storage 126) accessible to spreadsheet application 110. An audio file may be defined by audio data (e.g., digital data encoding the sound) and audio attributes that may describe the audio data (e.g., frequency, amplitude, sampling rate, codec, etc.), audio specifications (e.g., bitrate, volume, pitch, speed, channel, audio effects, etc.) and/or the audio file (e.g., author, creation date and/or time, file name, file size, duration, etc.). As should be appreciated, each audio attribute may be defined by an attribute-value pair. That is, an audio attribute (e.g., duration) may be paired with a value for that attribute (e.g., 1:05 minutes) for a particular audio file.

In at least some examples, audio attributes may be organized in a data structure (e.g., a table, array, etc.) based on attribute-value pairs and/or attribute-type pairs. For example, for attribute "bitrate" a value may be "96 kilobits per second (Kbps)" and a type may be "variable bitrate, VBR"; for attribute "sampling rate" a value may be "44.1 kHz"; for attribute "channel" a type may be "stereo" and a value may be "channel 1"; for attribute "duration" a value may be "21:04 minutes"; for attribute "codec" a type may be "MP3"; and the like. As should be appreciated, the above attribute-value and/or attribute-type pairs are offered as examples only and any suitable value or type may be paired with any attribute identified above. Attribute-value pairs and/or attribute-type pairs associated with audio attributes may be organized and stored in any suitable data structure, e.g., a table, array, etc., and may be appended as metadata to an audio file comprising audio data (e.g., digitally encoded audio signals). For instance, as illustrated, metadata 132A may be appended to audio file 128A, metadata 132B may be appended to audio file 128B, and metadata 132C may be appended to audio file 128C. Alternatively, the audio attributes may be stored in a separate location or database from the audio files and may be referenced by or otherwise indexed to the audio files (not shown).

As may be appreciated, audio data may include digitally encoded (or modulated) signals representative of sound waves, where the audio data is in a machine-readable format for storing and/or playing the audio file. In some aspects, the audio data may be described in terms of sound wave attributes (e.g., frequency, amplitude, etc.), the sample rate at which the audio data was captured and/or the codec (compressor/decompressor) used to compress the audio data. Additionally, audio attributes may describe specifications or settings associated with the audio data (e.g., bitrate, volume, pitch, speed, channel, audio effects, etc.) and/or attributes of the audio file (e.g., author, creation date and/or time, file name, file size, duration, etc.). In aspects, audio attributes describe the audio data and/or audio file in a human-readable format.

In at least some examples, one or more audio files may be stored in different storage locations within a distributed environment (e.g., cloud computing environment) accessible to spreadsheet application 110 over a network, e.g., network 106. As described herein, the location of an audio file in storage may be represented by a file locator, which may be a URL to local storage (e.g., C:\Music\favorites\song1.wav) or a URL to remote storage accessible over a network (e.g., http://www.music.com/90smix/song1.wav). Additionally, an audio file may be referenced by name (e.g., "song1.wav") to locate it within the local workbook file. With respect to remote storage, a URL may provide a file path to a storage location hosted by a third party (e.g., Pandora®, Spotify®, etc.), in a public or private cloud storage location (e.g., OneDrive®, iCloud®, iTunes®, Amazon® Cloud Drive, etc.), in an enterprise storage location (e.g., SharePoint®, etc.), in a public storage location accessed over the Internet, and the like. In other aspects, the audio file may be referenced within a function of the spreadsheet by a globally unique name rather than by a URL. A globally unique name may be any string that is unique across the spreadsheet, e.g., "OctoberEarnings" or "OctoberEarnings.way." If the same name is used on different sheets of a spreadsheet to return different values, the name may be qualified by the sheet on which it appears in order to create a unique name, e.g., "Sheet1!OctoberEarnings" and "Sheet2!OctoberEarnings."

As illustrated in FIG. 1, the spreadsheet application 110 may include various components for associating one or more audio files with one or more cells of a spreadsheet, including an associate component 112, a hybrid component 114, a transcription component 116, an attribute component 118, an operation component 120, a UX component 122, and the like. In aspects, each component may communicate and pass data between the other components. The various components may be implemented using hardware, software, or a combination of hardware and software. Moreover, the various components may be executed on a single server computing device (e.g., server computing device 108), on multiple server computing devices (e.g., server computing devices 124A, 124B and/or 130), or locally on a client computing device (e.g., client computing device 102A or 102B).

As described above, the spreadsheet application 110 may be configured to associate one or more audio files with one or more cells of a spreadsheet. As should be appreciated, while examples and descriptions provided below may generally reference associating a single audio file with a single cell, the methods and systems described may similarly be applied for multiple audio files within a single cell or within a range of cells. In cases where application of the methods or systems may differ with respect to associating multiple audio files with a single cell, additional disclosure will be provided.

In aspects, associate component 112 may associate one or more audio files with one or more cells of a spreadsheet. In some examples, associate component 112 may associate an audio file with a cell by anchoring the audio file as a value within the cell. For example, the audio file may be anchored within a cell based on a function in the formula bar of the cell that identifies the file locator (e.g., a globally unique name or URL) for the audio file (e.g., =GETAUDIO("http://www.music.com/90smix/song1.wav")). Alternatively, an audio file may be associated with a cell without using a globally unique name or URL by selecting an "Insert" operation in the toolbar and using a dialog filtered to sound types to find and insert the audio file. In that case, the formula for the cell may specify the audio file as: "=GETAUDIO(song1.wav)". Alternatively, the audio file may be identified without a formula, for instance, the name of the audio file may simply be listed without the "=GETAUDIO" operator, e.g., "song1.wav" or "<Audio> song1.wav".

Additionally, associate component 112 may associate a plurality of audio files with one or more cells of a spreadsheet. For instance, associate component 112 may associate a plurality of audio files with a cell by anchoring the plurality of audio files to the cell based on a function identifying the file locators (e.g., globally unique names or URLs) for each of the plurality of audio files. In other aspects, associate component 112 may associate a plurality of audio files with a cell based on a function identifying a folder in which the plurality of audio files is located. In some aspects, associate component 112 may associate the plurality of audio files with one another (e.g., in an array) in addition to associating the plurality of audio files with a cell and/or a spreadsheet. In other cases, the plurality of audio files may be associated in an array by a service. For instance, a single audio file (e.g., of a conversation between multiple individuals) may be sent to a service and an array of audio files may be returned (e.g., including an audio file for each individual's voice identified and extracted from the audio file). In other examples, a single audio file may be divided into multiple tracks (e.g., each track representing a particular loop or wave or sound from the original audio file) and associated in an array. As should be appreciated, other examples are possible and may be incorporated according to the methods and systems described herein.

In some cases, in order to indicate that an audio file is associated with a cell, a visual representation (e.g., speaker icon, play icon, waveform rendering, sliced waveform rendering, track name with metadata, special icon with metadata, etc.) may be provided for the audio file. For example, the visual representation may depict the actual waveform and may be interactive. That is, a user may scroll along the visual representation and begin listening to the audio file from any position along the waveform. Alternatively, the visual representation may not depict the actual waveform but may be a standard representation of a waveform and may be overlaid with a play icon. In this case, upon selection of the play icon, the audio file may be played from the beginning of the audio file. In aspects, the visual representation may be fit to a cell size, i.e., bounded by the cell border.

In other cases, associate component 112 may anchor a portion of the visual representation (e.g., a top left corner of the visual representation) to a portion of a cell (e.g., top left corner of the cell). In this case, the visual representation may not be fit to the cell size, but may be displayed smaller than the cell (e.g., inside the cell border with at least some white space) or displayed larger than the cell (e.g., extending beyond the cell border onto other cells). In still other cases, the visual representation may be provided as background for a cell and other data may be displayed over the visual representation (e.g., a title, topic, etc., of the audio file). Whether a visual representation is fit to a cell or not, the audio file that is anchored to a cell may move with the cell when the cell is relocated within the spreadsheet (e.g., in response to a sort or filter operation). In this way, a visual representation of an anchored audio file may behave in substantially the same or similar way as alphanumeric data (e.g., textual data, numeric data, formulas, and the like) and, thus, may behave predictably within the spreadsheet in response to operations performed on the spreadsheet.

In other examples, the associate component 112 may associate an audio file with the spreadsheet but may allow a visual representation of the audio file to float over the grid. When a visual representation of an audio file is allowed to float over the grid (e.g., over one or more cells of the spreadsheet), the visual representation may be displayed within the spreadsheet and the audio file may be played from within the spreadsheet (e.g., by activating a play control associated with the visual representation, or by launching a user interface by right-clicking or hovering over the visual representation, and the like). However, in this case, based on a user preference, the visual representation may or may not move with cells as they are relocated within the spreadsheet (e.g., in response to sort or filter operations). In some examples, although the visual representation of the audio file may be allowed to float, the audio file may be referenced (e.g., by globally unique name) in one or more functions within the spreadsheet such that one or more operations may be performed on the audio file and/or one or more operations may be performed on the spreadsheet based on attributes of the audio file. In this case, when cells are relocated the visual representation of the audio file may or may not move with the cells, but operations may be performed on the audio file and/or the spreadsheet based on the function referencing the audio file.

Similarly, whether or not a visual representation of an audio file is anchored, floating or even displayed within the spreadsheet, the audio file may be referenced (e.g., by globally unique name) in one or more functions such that one or more operations may be performed on the audio file and/or one or more operations may be performed on the spreadsheet based on attributes of the audio file. For instance, the audio file may be played when a condition of a function referencing the audio file is satisfied (e.g., play referenced audio file when revenue number hits "X" or play referenced audio file as explanation for cost forecast "Y," etc.).

In some aspects, a user may "change a state" of an audio file with respect to a cell at any time. For instance, a user may make a selection to convert a visual representation of an audio file from floating to anchored within a cell. In this case, the visual representation may be selected (e.g., by right click) and may be anchored to a selected cell. A user may also make a selection to convert a visual representation from anchored in a cell to floating (e.g., by "popping" the audio file out of a cell). In this case, the audio file may no longer be represented in the formula bar of the cell and may be displayed as dissociated from the cell (e.g., in another location within the spreadsheet). As should be appreciated, UI controls (e.g., provided in an audio toolbar, provided upon right click of a mouse, etc.) may allow the state of an audio file to be changed at any time.

In an example, a mobile version of associate component 112 may associate one or more audio recordings from a mobile device in a spreadsheet application. For instance, consider a lawyer preparing for a deposition. The lawyer may wish to dictate questions on his or her mobile device and may further wish to associate the questions with a spreadsheet in preparation for the deposition. For instance, the lawyer may open a mobile version of the spreadsheet application, may select a first cell in a first row of the spreadsheet, may dictate the first question (which may be encoded and stored as an audio file by the mobile device), and my insert the audio file in the selected cell. In some aspects, the mobile version of the spreadsheet application may automatically associate the audio file with the selected cell. The lawyer may then dictate a second question and insert it in a second cell in a second row of the spreadsheet, and so on. Thereafter, the spreadsheet application may transcribe each of the audio files and provide a text transcription of each audio file, with the text transcription in the same cell as the audio file or in a different cell. For instance, the spreadsheet application may automatically insert a new cell adjacent to the cell associated with the audio file and may insert the text transcription in the new cell. In this way, the lawyer may create a spreadsheet of questions by dictation that may be transcribed for later use in the deposition. As the dictations are associated with a spreadsheet, spreadsheet operations may be performed on the dictations, e.g., the lawyer may filter for dictations recorded on or after a certain date, for dictations including certain keywords, for dictations including certain speakers, etc.

In another example, the lawyer may receive a spreadsheet of questions and related information from an associate. In this case, each question may be provided in a different row and column headers may include, for instance, "question," "documents," "desired response," "potential cross examination," etc. In this example, the lawyer may select a cell in the documents column for the second question, may record the words "add title document" (which may be encoded and stored in an audio file by the mobile device), and may insert the audio file in the selected cell. Alternatively, the lawyer may add the audio file as a comment on the cell. In some cases, the lawyer may add more than one audio file to a cell (e.g., may insert a first audio file and later insert a second audio file with additional notes). The lawyer may make similar dictated notes and associate the audio files with cells relating to the same or other questions. The lawyer may then save the spreadsheet and forward it back to the associate. When the associate receives the spreadsheet, the lawyer's notes may be transcribed into text or played by the associate in order to take appropriate action for revising the spreadsheet. As should be appreciated, audio files may be associated with one or more cells of a spreadsheet by any suitable means and, in some examples, may be transcribed into text.

Hybrid component 114 may associate different types of data with a single cell. In some cases, hybrid component 114 may provide a visual representation of the audio file as background for the cell and may display the additional data over the visual representation. Alternatively, a visual representation of the audio file may be displayed in one portion of the cell and the additional data may be displayed in another portion of the cell (e.g., above, below, to either side, or wrapping the visual representation). As detailed above, an audio file may comprise audio data, which may be digitally encoded (or modulated) signals representative of sound waves in a machine-readable format for storing and/or playing the audio file. Additional data may include any type of data other than the audio file, e.g., textual data, numerical data, charts, images, etc. For example, additional data may include a text transcription of the audio file or may include information about the audio file (e.g., song name, song artist, recording date, duration, etc.).

In some cases, hybrid component 114 may associate the audio file with the additional data in a structured format, e.g., an array, record, or table, which is referred to herein as a "compound data type." In aspects, when a visual representation of the audio file is provided as background (or fill) for a cell, use of a compound data type may not be necessary to associate different types of data with the cell; however, when the visual representation of the audio file and the additional data are displayed in different areas of the same cell, use of a compound data type may provide advantages. For example, when the audio file and the additional data are associated with a cell using a compound data type, layout properties for the visual representation of the audio file and the additional data may also be organized in the structured format. In some cases, compound data types may even be nested within each other.

The structure of a compound data type may be leveraged in complex calculations, thereby providing a model for referencing and using different aspects of the data. For example, each component of a compound data type may be represented by a formula or a function. Such individual representation of components facilitates the creation of structures in a single cell where calculations can reference back to other components of the compound data type. For instance, any of the fields of the compound data type can be dereferenced and acted on. That is, a formula may be constructed to get the value of a special field ("=GetAttribute(<field name>)"), an operator may be used to get the value (e.g., the dot "." operator, "=A1.bitrate"), or a unique name may be used to get the value (e.g., if cell A1 has a unique name, "OctoberEarningsRecording.bitrate"). In this way, each field is available to the "calc chain" (e.g., a calculation engine for the spreadsheet) and/or formulas within a spreadsheet.

A compound data type may be an object structured to include or reference the audio file (e.g., audio data and audio attributes) and additional data (e.g., text transcription data, video data, charts, and the like). In some aspects, additional data may be described in terms of attribute-value pairs. In this case, the natural attribute-value descriptors may be leveraged for organizing the additional data within the structured format of a compound data type. In other examples, the additional data may not necessarily be represented by attribute-value pairs. For instance, the additional data may be a single numeric value that is the output of a formula (e.g., total revenue value, sum of a range of cell values, average value over a range of cell values, etc.). In still other examples, additional data may be represented as an array or vector of data, as well as any other primitive type (strings, numbers, etc.).

As should be appreciated, in some aspects, an audio file itself may be represented by a compound data type. For example, as described above, an audio file may comprise audio data (e.g., modulated data) and associated metadata (e.g., including audio attributes). More specifically, as described above, audio attributes may be described in terms of attribute-value pairs and/or attribute-type pairs and/or may be organized in any suitable structured format, e.g., an array of values, a record with an array of fields, a table, an array of vectors, etc. For example, some audio attributes may have a type and a value, e.g., for attribute "bitrate," values may include one of "96 kilobits per second (Kbps)," "64 Kbps," "128 Kbps," "320 Kbps," etc., while a type may be "variable bitrate, VBR" or "constant bitrate, CBR." Similarly, for attribute "channel," a type may be one of "stereo" or "mono," while a value may be one of: "channel 1," "channel 2," "channel 3," etc. Other audio attributes are more commonly associated with values, e.g., for attribute "resolution," values may be one of "8-bit" or "16-bit"; for attribute "sampling rate," values may be one of "44.1 kHz" or "48 kHz"; for attribute "duration," values may be in any appropriate unit, e.g., "21:04 minutes," "1:02 seconds," "1:04 hours," etc. Still other audio attributes may be primarily associated with a type, e.g., for attribute "codec," types may be one of: "MP3," "AAC," "OGG," "FLAC," etc. Thus, an audio file may be represented by a compound data type in which the audio data and the audio attributes are stored in (or referenced by) a structured format. In aspects, an audio file represented by a compound data type may be associated with a cell.

In further aspects, the audio file, including audio data (e.g., digitally modulated audio signals) and audio attributes (e.g., attribute-value pairs and/or attribute-type pairs corresponding to audio attributes, as described above), may be associated with additional data (e.g., data describing content of the audio file, a text transcription of the audio file, represented by arrays, vectors, etc.) in a single compound data type. For example, consider an audio file of a conversation. In this case, the audio file may include audio data (e.g., digitally modulated audio signals) for storing and playing the audio file and associated metadata including audio attributes (e.g., attribute-value pairs and/or attribute-type pairs) defining aspects of the audio file, such as bitrate, channel, volume, pitch, etc. In examples, additional data may describe or be related to the content of the audio file, such as sound recognition data (e.g., identifying a dog barking, a bird chirping, etc.) voice recognition data (e.g., identifying various speakers), which speaker talked the most, time stamps for statements made by each speaker, etc. In this case, the additional data may be represented by attribute-value pairs (e.g., content attributes). For instance, attribute "speaker 1" may have a value of "Charles"; attribute "speaker 2" may have a value of "Sarah"; attribute "duration 1" may have a value of "10:03 minutes"; and attribute "duration 2" may have a value of "3:07 minutes"; etc.

Further still, the additional data may be described by formatting attributes that may be represented by attribute-value pairs. For example, where the additional data is a text transcription of an audio file, an attribute "font size" may have a value "11 pt.," either automatically or by user selection; an attribute "font color" may have a value "red," either automatically or by user selection; an attribute "font" may have a value "Calibri," either automatically or by user selection; etc. Furthermore, layout attributes may define a relative arrangement and/or dynamic display of a visual representation of an audio file, audio attributes and/or additional data. For instance, layout attributes may define how to display data (e.g., visual representation of the audio file displayed above, below, to the left or the right of additional data, etc.) and/or which data should be dynamically displayed as a cell is resized (e.g., audio icon displayed in small cell, with more data progressively displayed as the cell is enlarged). Layout attributes may also be defined in terms of attribute-value pairs, e.g., an attribute "alignment" may have value "top" or "left"; an attribute "progressive display" may have numerical values in order of priority such as 1-10, and the like.

Based on the above examples, hybrid component 114 may create a compound data type including the audio data (e.g., digitally modulated audio signals), audio attributes (e.g., attribute-value pairs describing the audio file), additional data (e.g., including attribute-value pairs, arrays, vectors, etc., corresponding to content and/or formatting of the additional data) and/or layout attributes (e.g., attribute-value pairs describing relative alignment or progressive display of the visual representation and additional data) in a structured format. In some aspects, rather than the compound data type including the actual data representing the audio data, audio attributes, additional data (including content and/or formatting attributes) and/or layout attributes, the compound data type may include an array of fields with references or pointers to the actual data, which may be stored as a record in any suitable database or storage location. As should be appreciated, while alphanumeric data has been discussed above, different types of additional data (e.g., chart data, video data, image data, etc.) may be described by different sets of attribute-value pairs but may also be represented within the structured format of a compound data type.

In aspects, when a compound data type is associated with a cell, all or some portion of the data represented by the compound data type may be displayed within the cell. For example, a visual representation of an audio file (e.g., icon, waveform representation, etc.) may be displayed in the same cell with additional data describing the content of the audio file (e.g., data depicting the speakers, speaking duration, text transcription of the conversation, etc.). In some aspects, while audio attributes may be included in the compound data type, the audio attributes may not be displayed in the cell with the visual representation and additional data. Rather, in aspects, audio attributes may be retrieved from the compound data type and displayed upon a user selection (e.g., right click on the visual representation of the audio file). As will be described further below, UX component 122 may display UI controls in a ribbon, toolbar, popup menu, etc., for listening to the audio file (e.g., play, fast forward, pause, rewind, etc.), viewing or manipulating audio data (e.g., for audio processing), viewing or manipulating audio attributes (e.g., pitch, volume, speed, etc.), selecting audio attributes for display (e.g., volume), selecting layouts for display of the visual representation with the additional data in a cell (e.g., visual representation displayed adjacent text on left or right, visual representation displayed above or below text, text wrapping visual representation, text displayed over visual representation, and the like).

Transcription component 116 may operate in various ways to convert an audio file into alphanumeric or symbolic data and/or to create an audio file from alphanumeric or symbolic data. In some aspects, transcription component 116 may be hosted by a service in communication with spreadsheet application 110. In other aspects, transcription component 116 may execute locally. For example, an audio file of speech may be converted into a text transcription, which is a textual representation of each word or sound in the audio file. Alternatively, an audio file of music may be converted into a musical transcription, including musical notes, bars, frames, and/or musical notations, representing the music of the audio file. Conversely, a textual document may be converted into an audio file, e.g., spoken words may be generated that correspond to the text of the document. Additionally, a musical score may be converted into an audio file, e.g., sound waves representative of the musical score. Moreover, algorithms may be used to convert raw numerical data into an audio file, such as converting different numbers or events to sounds with different pitch. Moreover, additional processing may be enabled beyond a simple transcription from note to note; for example, transposing or auto-tuning may be provided, which require additional rules to be applied on a per 'note' and/or 'phrase' basis and mapping to an appropriate 'scale' for playback.

In still further aspects, e.g., for low vision users, transcription (e.g., text-to-speech) of data within cells of the spreadsheet may be performed and the data may be "played" for the user at any time. In this regard, a spreadsheet may be converted into speech on a cell-by-cell basis, by groups of cells, or globally across the spreadsheet. This functionality marks a significant advance over traditional screen readers. For instance, an audio file may be created to convert data within a cell to speech and the audio file may be associated with the cell. In this case, both the original data and the audio file may be associated with a single cell and a compound data type may be created to store the different types of data, as detailed above. In some aspects, an audio file may be created for each cell containing data within the spreadsheet. To further improve user experience, particularly for low vision users, the spreadsheet may be customized to associate sounds with colors, numbers, trends, or any other aspect of a spreadsheet.

Similarly, by transcribing alphanumeric or other data into an audio file and associating the audio file with a cell, a spreadsheet application becomes able to read its own data. For instance, when a condition is met within the spreadsheet (e.g., a revenue number hits a threshold value, or orders for a product hit a threshold number, etc.), an audio file may be generated and sent in an email, voicemail, text, etc., or may be associated with the spreadsheet such that the audio file plays the next time the spreadsheet application is opened. The audio file may be a notification (e.g., revenue hit "x"), a reminder (e.g., orders hit 500 units, remember to order boxes for shipping), an encouragement (e.g., "Way to go!" sent to a sales team upon hitting sales goal), or any other message. In this way, a functionality of a digital assistant may be implemented using spreadsheet logic. In further aspects, transcription component 116 may be capable of converting an audio file into any suitable data format and for converting a data format into any suitable audio file.

In aspects, attribute component 118 may retrieve parameters for each audio file associated with a spreadsheet. As detailed above, parameters retrieved for an audio file may include audio data and/or associated audio attributes. In some aspects, attribute component 118 may retrieve parameters from a compound data type. For instance, attribute component 118 may retrieve audio data, audio attributes, additional data, and/or layout attributes from a compound data type. In aspects, attribute component 118 may retrieve parameters for an audio file and/or additional data at any time, for example, in response to a selection to associate the audio file with a spreadsheet, in response to a selection to manipulate the audio file, in response to a selection to perform a spreadsheet operation, and the like.

Operation component 120 may perform operations on audio files associated with cells of a spreadsheet and/or may perform operations on a spreadsheet based on attributes of audio files associated with one or more cells. For example, a user may select an operation to apply to a visual representation of an audio file (e.g., "fit to cell," "fill cell," etc.). For example, in order to fit a visual representation to a cell, attributes of the visual representation (e.g., height, width) may automatically be adjusted to coincide with a size of a cell. In some examples, a visual representation of an audio file may be fit (or sized) to coincide with both a cell height and a cell width (e.g., for "fit to cell" or "fill cell"); alternatively, the visual representation may be fit to coincide with one of a cell height (e.g., "fit vertically") or a cell width (e.g., "fit horizontally"). Similarly, when a cell is resized, operation component 120 may resize a visual representation of an audio file associated with the resized cell, either automatically or by a user selection. As should be appreciated, the above examples are not intended to be exhaustive and a visual representation may be fit to a cell, resized with a cell, or applied as fill by any suitable means, either automatically or by user selection.

Alternatively, operation component 120 may fit the cell to a visual representation of an audio file such that the cell conforms to a size of the visual representation. In this case, cell attributes (e.g., a cell height and/or a cell width) may automatically be adjusted to coincide with a size of the visual representation. Furthermore, other cells within a row and/or a column associated with the re-fit cell may also conform to the height and/or width dimensions of the visual representation. As should be appreciated, the examples described above are not intended to be exhaustive and a cell may be fit to a visual representation by any suitable means, either automatically or by user selection.

In other aspects, audio attributes, audio data, etc., may be surfaced in a user interface (e.g., by UX component 122) and operation component 120 may perform operations in response to a user selection. For example, operation component 120 may receive a selection to change a state of an audio file. As used herein, a "state of an audio file" may refer to a type of association of the audio file with a cell and/or spreadsheet, e.g., anchored, floating, arrayed, background, etc. Changing the state of an audio file may involve converting the audio file from one state to another, e.g., from anchored to floating, from arrayed to independent, from background to foreground, from background to independent, from floating to anchored, and the like.

Operation component 120 may also perform any number of operations on audio data and/or audio attributes. For example, operation component 120 may allow operations on an audio file, such as play, pause, stop, fast forward, rewind, etc. Additionally, operation component 120 may allow operations on audio attributes, such as adjusting pitch, volume, speed, channel, resolution, and the like. Additionally or alternatively, operation component 120 may allow any number of operations on audio data, e.g., allowing for audio processing of modulated data, such as splicing of an audio file, changing a compression format, etc. The examples described are not intended to be exhaustive and any number of operations may be performed on audio files associated with cells by any suitable means, either automatically or by user selection.

Operation component 120 may further allow operations on a spreadsheet based on attributes of audio files associated with a range of cells. For example, operations may include sort, filter, and conditional formatting, as well as data cleaning operations, ETL (which stands for extract, transform, load, e.g. Power Query), and modelling (e.g. Power Pivot). In further examples, in response to receiving an indication to perform a sort or filter operation on a range of cells within a spreadsheet, operation component 120 may relocate cells within the range of cells based on audio attributes, e.g., based on duration, volume, pitch, channel, and the like. Additionally or alternatively, operation component 120 may perform conditional formatting on the spreadsheet based on audio attributes. For example, a heat map may be displayed over cells associated with audio files such that cells associated with audio files having a higher pitch may be turned redder, while cells associated with audio files having a lower pitch may be turned greener. In aspects, the conditional formatting may be customized by a user based on any selected audio attribute. Mapping conditional formatting to pitch is another example of structured data being used as an argument to an audio function. As should be appreciated, any number of audio attributes may be associated with an audio file and operations may be performed on the spreadsheet based on any audio attribute surfaced (or identified) by attribute component 118, or otherwise.

UX component 122 may communicate with operation component 120 to provide one or more user interfaces for exposing available operations for manipulating audio data and/or audio attributes. As used herein, the term "expose" refers to providing access for user selection and/or input. Selections and/or inputs for operations may be received by gesture, touch, mouse input, keyboard input, etc. For example, UI controls may be provided for listening to an audio file from within a spreadsheet, e.g., UI controls such as "play," "fast forward," "stop," "rewind," and "pause." Additionally, UX component 122 may provide UI controls for selecting fit and resize operations for performing on a visual representation of an audio file, as described above. UI controls may also be provided for changing a state of an audio file, for example, from anchored to floating or, conversely, from floating to anchored, and the like. Additionally or alternatively, a visual representation of an audio file may be "popped out" from background to being displayed independently in a cell. Further, UI controls may be provided for manipulating audio data and/or audio attributes. For instance, UI controls may be provided for manipulating audio data, e.g., for splicing of an audio file, changing a compression format, etc., and UI controls may be provided for manipulating audio attributes, e.g., adjusting pitch, volume, speed, channel, resolution, and the like. As should be appreciated, UX component 122 may provide any number of user interfaces (e.g., dropdown menus, popup menus, ribbons, toolbars, etc.) for exposing operations to manipulate audio data and/or audio attributes.

For cells associated with more complex objects, e.g., an array of audio files or one or more audio files with additional data, UX component 122 may provide additional functionality and UI controls. For instance, UI controls may be provided for selecting a layout (or alignment) between a visual representation of an audio file and additional data within a single cell, e.g., a visual representation may be displayed above, below, to the right or left of, or wrapped by additional data, etc. Additionally, UX component 122 may display various views of data associated with a compound data type, e.g., display of data may vary based on cell size and/or various user interfaces may be provided. For instance, a minimal amount of data may be displayed in a small cell (e.g., an icon representation of the audio file), but successively more data may be displayed as the cell is enlarged (e.g., waveform representation of audio file, names of parties to a conversation, a text transcription of the audio file, various audio attributes of the audio file, etc.). Additionally or alternatively, UX component 122 may provide a popup window for displaying data associated with the compound data type and/or a settings tool bar for manipulating data associated with the compound data type. As should be appreciated, UX component 122 may retrieve and surface more or less data associated with a compound data type based on user preference or selection.

Similarly, where multiple audio files are associated with a single cell, UX component 122 may provide a UI element for displaying an array of audio files. For example, in a default collapsed view (e.g., collapsed UI element), a visual representation of one of the array of audio files may be displayed within the cell. In some aspects, in the collapsed view, UX component 122 may provide a timer to cycle display of a visual representation for each audio file within the cell. The collapsed UI element may further include a visual indication that multiple audio files are associated with the cell (e.g., a stack indicator, scroll control, etc.). In response to selection of a UI control (e.g., right click, button, menu, etc.), the collapsed view may expand to reveal visual representations for each of the array of audio files. Visual representations for the array of audio files may be displayed within an expanded UI element in any suitable arrangement (e.g., linear, carousel, grid, etc.) for viewing and interacting with the array of audio files. For instance, an audio file may be selected and removed from the array of audio files associated with a first cell and cut/pasted or drag/dropped into a second cell, or an audio file may be deleted from the array altogether. In some cases, the whole array may be "spilled" into a range of cells, e.g., with each audio file spilling into (or being associated with) a different cell of the range of cells. Additionally, a new audio file may be added to an array of audio files by opening the expanded UI element (e.g., by right click activation) and by inserting the new audio file into a selected position within the array. As detailed above, any number of different user interfaces may be provided by UX component 122 for viewing and/or manipulating audio data, audio attributes and/or additional data.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
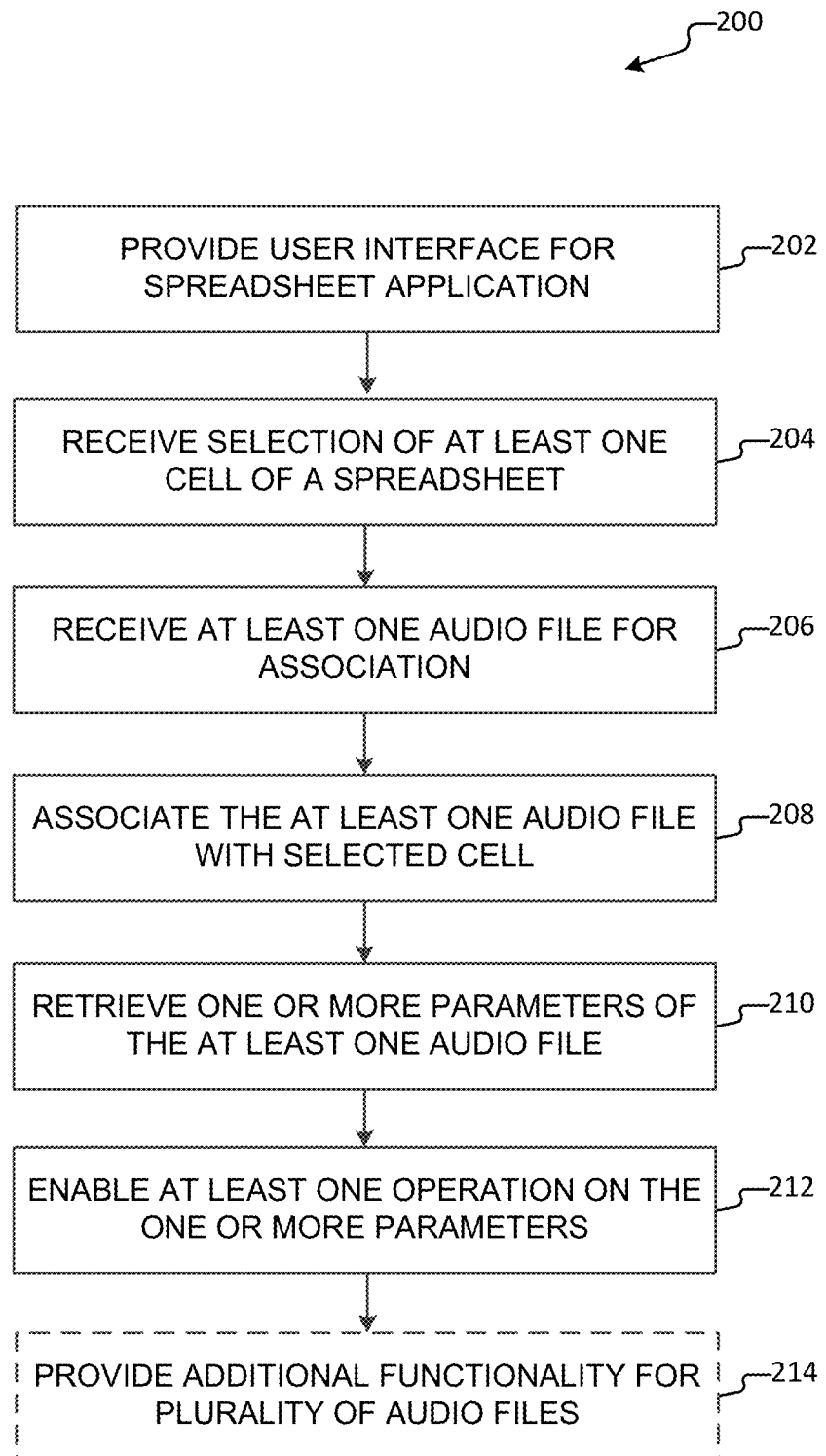
FIG. 2 illustrates a method for associating one or more audio files with one or more cells of a spreadsheet, according to an example embodiment.

FIG. 2 illustrates a method for associating one or more audio files with one or more cells of a spreadsheet, according to an example embodiment.

Method 200 begins with provide interface operation 202, where a spreadsheet application may provide (or cause to be provided) a user interface to a user. For example, a UX component (e.g., UX component 122) may facilitate a user experience (UX) by providing the user interface of a spreadsheet application (e.g., spreadsheet application 110) via a display. Selections and/or inputs may be received by the user interface based on gestures, touch, mouse movements, keyboard input, and the like. The user interface may operate in conjunction or communication with one or more other components of the spreadsheet application (e.g., associate component 112, hybrid component 114, transcription component 116, attribute component 118, and operation component 120) to associate one or more audio files with one or more cells of the spreadsheet.

At select cell operation 204, at least one cell of a spreadsheet may be selected, either automatically (e.g., based on a function) or by user selection. That is, in some aspects, operations may call (or select) a cell without requiring user input, e.g., operations such as 'data refresh,' 'import from such and such data source,' 'copy paste,' etc. In other aspects, a spreadsheet application (e.g., spreadsheet application 110) may provide the spreadsheet to a user, the spreadsheet including one or more sheets, each sheet having a plurality of rows and columns of cells. Cells may be selected by highlighting or otherwise identifying the cell or range of cells using a gesture, touch, mouse click, keyboard input, and the like. When a single cell is selected, the cell may be identified in a toolbar of the user interface by a cell identifier that specifies a location of the cell within the spreadsheet. For example, a cell identifier of "A1" specifies that the cell is located in column A, row 1 of the spreadsheet, while a cell identifier of "B5" specifies that the cell located in column B, row 5 of the spreadsheet. The cell identifier may further be displayed adjacent to a formula bar (or "fx bar") identifying the contents of the cell in the toolbar of the user interface. When a range of cells is selected, the cell at the top left corner of the range may be displayed by a cell identifier next to the formula bar, with the range of cells being represented by a range identifier including cell identifiers for the cell at the top left corner and the cell at the bottom right corner (e.g., A1:C5).

At select audio file operation 206, a selection or indication to associate at least one audio file may be received for association with the at least one cell, either automatically (e.g., based on a function) or by user selection. That is, in some aspects, operations may call (or select) an audio file for association with a cell without requiring user input, e.g., operations such as 'data refresh,' 'import from such and such data source,' 'copy paste,' etc. In other aspects, a UX component (e.g., UX component 122) may provide a user interface for receiving the selection to associate the at least one audio file by a gesture, touch, mouse movement, keyboard input, and the like. In some aspects, in response to a selection of a cell (or a range of cells), a menu may be provided for inserting or associating various objects (including audio files) with the selected cell (or range of cells). In still other aspects, a user may select a textual document (or a range of values or a musical score), convert the textual document (or the range of values or the musical score) to an audio file (e.g., by text-to-speech transcription, a value-to-sound conversion algorithm, or musical transcription), may select the at least one cell and associate the audio file with the selected cell. In still further aspects, a user may indicate an intention to associate an audio file with a selected cell by manually entering a function that references the audio file into a formula bar associated with the selected cell. As should be appreciated, the user interface may receive an indication to associate the at least one audio file with the selected cell by any suitable means.

At associate audio file operation 208, the at least one audio file may be associated with the selected cell of the spreadsheet. Associate audio file operation 208 may be performed by an associate component (e.g., associate component 112) of a spreadsheet application (e.g., spreadsheet application 110). As used herein, the term "associate" may include any form of linking one or more audio files to one or more cells within a spreadsheet. In aspects, an audio file that is "associated" with a cell may be treated as a value within the cell. In aspects, upon a selection to associate the audio file with the selected cell, a menu may be provided with various options for identifying a file locator for the audio file. For example, the menu may provide for browsing a local file structure or a remote storage location to identify a URL for the audio file. Alternatively, a globally unique name for the audio file may be identified. In further aspects, a menu may provide selections for directly embedding the audio file into the selected cell, for anchoring the audio file to the cell or for referencing the audio file in a cell.

For example, a user may manually embed the at least one audio file in the selected cell by drag/drop or copy/paste functions. In this case, a name of the audio file or, rather than a name, an interactive audio file icon may be displayed in the formula bar. Additionally, a user may anchor the audio file to the selected cell by entering a file locator for the audio file within a function, e.g., fx=GETAUDIO("C:\Music\favorites\song1.wav") or fx=GETAUDIO("http://www.music.com/90smix/song1.wav") or by entering a unique name that is global to the spreadsheet, e.g., fx=GETAUDIO("song1.wav"). For example, a unique name for an audio file may be referenced within a formula of the selected cell for performing an operation upon satisfaction of a condition (e.g., when revenue hits "X", play referenced audio file). Alternatively, a user may associate an audio file with a cell by selecting an "Insert" operation in the toolbar and using a dialog filtered to audio types to find and insert the audio file. In that case, the formula for the cell may be "=GETAUDIO(song1.wav)". Alternatively, an audio file may be identified without a formula, for instance, the name of the audio file may simply be listed without the "=GETAUDIO" operator, e.g., "song1.wav" or "<Audio> song1.wav". When more than one audio file is selected for association with a cell, the file locators for each audio file may be represented within the function associated with the selected cell, e.g., fx=GETAUDIO("C:\Music\favorites\song1.wav", "http://www.music.com/90smix/song1.wav").

In some aspects, when the at least one audio file is anchored within the selected cell, a visual representation of the audio file may be displayed within the cell border and/or may be allowed to extend beyond the cell border to overlay additional cells of the spreadsheet. The visual representation may also move with the selected cell when operations are performed on the spreadsheet. Additionally, fit and/or resize operations may be performed on the visual representation, either automatically or by user selection. In other aspects, the at least one audio file may be associated by reference to a selected cell (e.g., by referencing the globally unique name of the audio file within a function associated with the selected cell) such that operations may be performed on the audio file and/or operations may be performed on the spreadsheet based on attributes of the audio file. However, in this case, the visual representation of the audio file may or may not move with the selected cell when operations are performed on the cell (e.g., sort, filter, etc.) but may float over the grid within the spreadsheet. In fact, in some cases, the visual representation may not be displayed within the spreadsheet at all, but the audio file may merely be referenced within a function. As should be appreciated, one or more audio files may be associated with one or more cells of a spreadsheet by any suitable means such that the one or more audio files behave within the spreadsheet according to a user preference, which may be specified upon associating the one or more audio files or at some later time.

At retrieve parameters operation 210, audio data and/or audio attributes (collectively "parameters") may be retrieved for the at least one audio file associated with the selected cell. Retrieve parameters operation 210 may be performed by an attribute component (e.g., attribute component 118) of a spreadsheet application (e.g., spreadsheet application 110). In some aspects, audio data may be retrieved from the audio file and audio attributes may be retrieved from metadata appended to the audio file. In other aspects, parameters (e.g., audio data, audio attributes, content attributes, additional data, layout attributes, etc.) may be retrieved from a data structure of a compound data type. As should be appreciated, once an audio file is associated with the selected cell, any number of parameters may be retrieved for the associated audio file. In at least some aspects, the retrieved parameters may further be surfaced in a user interface or otherwise for manipulation by a user.

At enable operation 212, at least one operation may be enabled on one or more parameters of the at least one audio file. In aspects, enable operation 212 may be performed by an operation component (e.g., operation component 120) of a spreadsheet application (e.g., spreadsheet application 110). A user interface may provide options for sizing a visual representation of the audio file and/or for sizing the selected cell. For example, a user may select an option for fitting the visual representation to a size of the cell or for fitting the selected cell to the size of the visual representation. In some cases, by default, the size of a cell (e.g., as defined by a cell height and a cell width) may automatically be fit to the size of the visual representation of an audio file. In response to fitting the size of the selected cell to the visual representation, sizes of additional cells within a row and/or a column associated with the selected cell may also be adjusted. Additionally, options may be provided for resizing a visual representation when a cell is resized, for displaying more or less data of a compound data type when a cell is resized, and the like.

As should be appreciated, at enable operation 212, additional operations may also be enabled. For example, the additional operations may include an option to change a state of an audio file, e.g., from anchored to floating, from arrayed to spilled, from floating to anchored, and the like. Options may also be provided for customizing various audio attributes. For instance, options for manipulating audio attributes such as pitch, volume, channel, speed, and the like, may be provided in a user interface. The above examples are offered for purposes of describing the aspects herein and should not be considered limiting.

Enable operation 212 may further enable spreadsheet operations to be performed based on audio attributes and/or content attributes of the at least one audio file associated with the selected cell. For example, a range of cells may be sorted or filtered based on audio attributes of the at least one audio file (e.g., sorted or filtered based on pitch, volume, creation date, file name, etc.) and/or content attributes (e.g., names of speakers, word used most in conversation, etc.). As should be appreciated, any number of operations performed on the spreadsheet may be performed based on audio attributes and/or content attributes of the associated audio file.

At optional provide operation 214 (identified by dashed lines), additional functionality may be provided when a plurality of audio files is associated with the selected cell. Optional provide operation 214 may be performed by a UX component (e.g., UX component 122) of a spreadsheet application (e.g., spreadsheet application 110). This additional functionality may be provided in response to a selection to associate a plurality of audio files with a selected cell (e.g., in a popup menu) and/or may be provided in a toolbar, ribbon, or otherwise, within the user interface. In some aspects, display options for visual representations of the plurality of audio files may be provided, e.g., display configurations such as linear, carousel, grid, etc. In some cases, while the plurality of audio files may be associated with a single cell, display of visual representations for the plurality of audio file may overlay additional cells of the spreadsheet. For example, in a linear configuration, visual representations may be displayed horizontally (e.g., overlaying portions of a row or rows adjacent to or near the associated cell(s)) or may be displayed vertically (e.g., overlaying portions of a column or columns adjacent to or near the associated cell(s)). In a grid or carousel configuration, visual representations may overlay portions of a block of cells (e.g., including both rows and columns) adjacent to or near the associated cell(s). As should be appreciated, other configurations for displaying visual representations for a plurality of audio files are possible.

In further aspects, at optional provide operation 214, a user interface (UI) element may be provided by a UX component (e.g., UX component 122) in order to display, interact with and/or manipulate the plurality of audio files. For example, the UI element may enable a collapsed view and an expanded view of visual representations for the plurality of audio files. In the collapsed view (collapsed UI element), less than all of the audio files may be represented within the selected cell at any one time. The collapsed view may further provide a visual indication that multiple audio files are associated with the selected cell (e.g., a stack indicator, scroll control, etc.). In some aspects, the collapsed UI element may further include a timer such that a visual representation of each audio file may cycle within the selected cell. To switch to an expanded view, a UI control may be selected (e.g., by right click, button, menu, etc.) and the collapsed view may expand to reveal all of the plurality of audio files. In the expanded view, visual representation for the plurality of audio files may be displayed in any suitable arrangement (e.g., linear, carousel, grid, etc.) and may overlay additional cells of the spreadsheet for viewing and interacting with the plurality of audio files. A user may interact with the expanded view by translating through the plurality of audio files to view, add, delete, edit, or otherwise manipulate audio files within the array.

As should be appreciated, operations 202-214 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3:
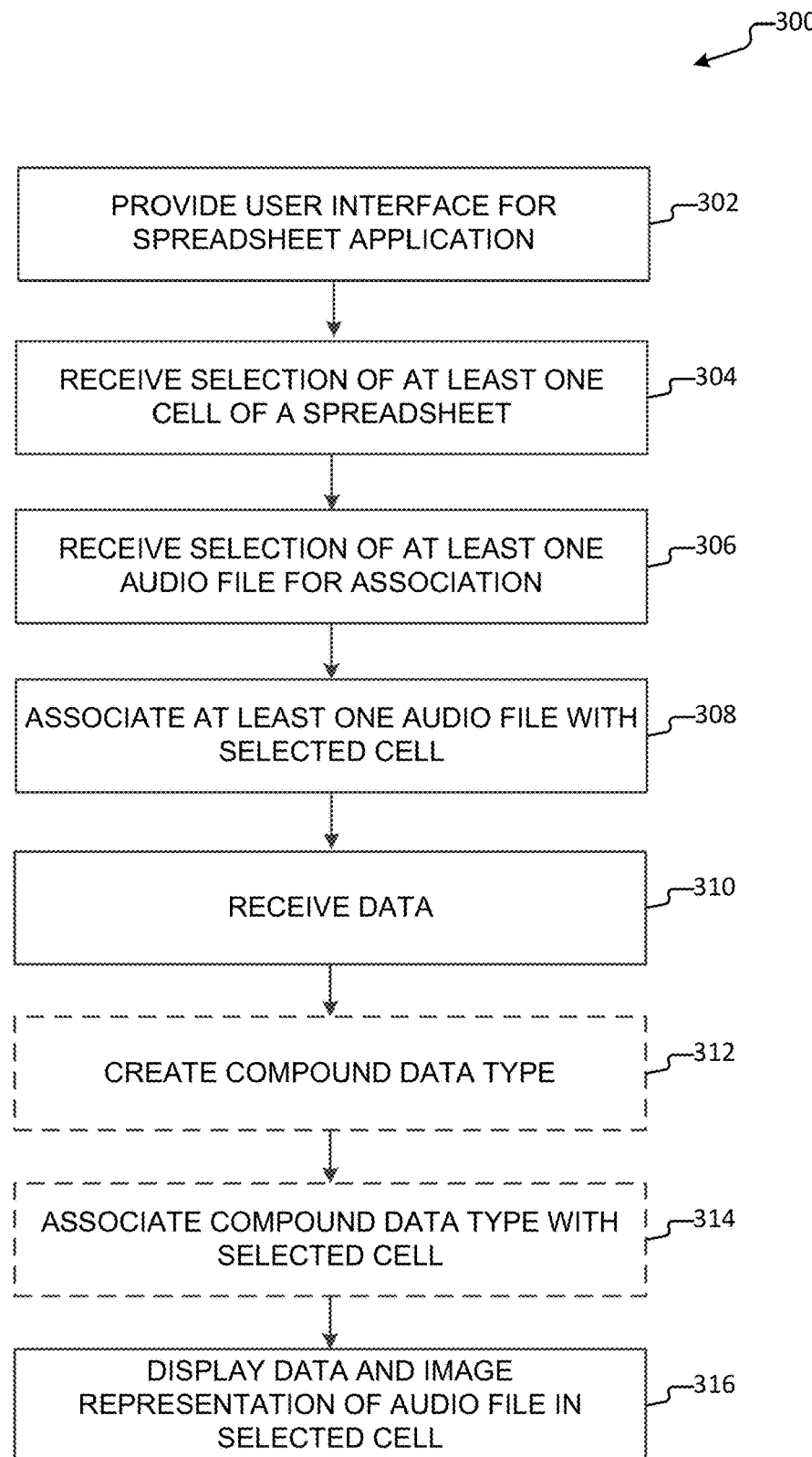
FIG. 3 illustrates a method for associating one or more audio files and additional data with one or more cells of a spreadsheet, according to an example embodiment.

FIG. 3 illustrates a method for associating one or more audio files and additional data with one or more cells of a spreadsheet, according to an example embodiment.

Method 300 begins with provide interface operation 302, where a spreadsheet application may provide (or cause to be provided) a user interface to a user. For example, similar to provide interface operation 202, a UX component may facilitate a user experience (UX) by providing a user interface (UI) of a spreadsheet application via a display. Selections and/or inputs may be received by the user interface based on gestures, touch, mouse movements, keyboard input, and the like. Additionally, the user interface may operate in conjunction or communication with one or more other components of the spreadsheet application (e.g., associate component 112, hybrid component 114, transcription component 116, attribute component 118, and operation component 120) to associate one or more audio files and additional data with one or more cells of the spreadsheet.

At select cell operation 304, similar to select cell operation 204, at least one cell may be selected, either automatically (e.g., based on a function) or by user selection. In some aspects, operations may call (or select) a cell without requiring user input, e.g., operations such as 'data refresh,' import from such and such data source', 'copy paste,' etc. In other aspects, a spreadsheet application may provide a spreadsheet to a user, the spreadsheet including one or more sheets, each sheet having a plurality of rows and columns of cells. Cells may be selected by highlighting or otherwise identifying the cell or range of cells using a gesture, touch, mouse click, keyboard input, and the like. For instance, when a single cell is selected, the cell may be identified in a toolbar of the user interface by a cell identifier that specifies a location of the cell within the spreadsheet. The cell identifier may further be displayed adjacent to a formula bar (or "fx bar") identifying the contents of the cell. Alternatively, when a range of cells is selected, the cell at the top left corner of the range may be displayed by a cell identifier next to the formula bar, with the range of cells being represented by a range identifier including the cell identifiers for the cell at the top left corner and the cell at the bottom right corner.

At select audio file operation 306, similar to select audio file operation 206, a selection or indication to associate at least one audio file with the selected cell may be received, either automatically (e.g., based on a function) or by user selection. That is, in some aspects, operations may call (or select) at least one audio file for association with a cell without requiring user input, e.g., operations such as 'data refresh,' 'import from such and such data source,' 'copy paste,' etc. In other aspects, a UX component may provide a user interface for receiving the selection to associate the audio file by a gesture, touch, mouse movement, keyboard input, and the like. In some aspects, in response to a selection of a cell, a menu may be provided for inserting or associating various objects (including audio files) with the selected cell. In other aspects, a user may indicate an intention to associate one or more audio files with a selected cell by manually entering a function referencing the one or more audio files into a formula bar associated with the selected cell. In still other aspects, a user may select a textual document (or a musical score), convert the textual document (or the musical score) to an audio file (e.g., by text-to-speech transcription or musical transcription), may select the at least one cell and associate the audio file with the selected cell. In still further aspects, a user may open a mobile version of the spreadsheet application, may select the at least one cell and may record a sound using a microphone on the mobile device. In this case, an audio file representative of the recorded sound may automatically be selected for association with the cell. In other cases, a user may record a sound first and then open the mobile spreadsheet application to associate the recorded sound with a cell of the spreadsheet. As should be appreciated, the user interface may receive an indication to associate one or more audio files with one or more cells by any suitable means.

At associate audio file operation 308, similar to associate audio file operation 208, the at least one audio file may be associated with the selected cell of the spreadsheet. In aspects, upon a selection to associate an audio file with the selected cell, a menu may be provided with various options for identifying a file locator for the audio file. For example, the menu may provide for browsing a local file structure or a remote storage location to identify a URL for the audio file. Alternatively, a globally unique name for the audio file may be identified. In further aspects, a menu may provide selections for anchoring the audio file to the cell or for referencing the audio file in a cell. As described above, an audio file may be associated with a cell by any suitable means.

At receive data operation 310, data may be received in addition to the at least one audio file selected for association with the cell. In some aspects, a UX component of a spreadsheet application may provide a user interface for receiving the additional data (e.g., by attachment, direct entry into a text box, copy/paste, drag/drop, etc.). In other aspects, the additional data may be a text transcription or a musical transcription of the audio file received from a transcription component of the spreadsheet application. In still other aspects, the additional data may be input into the selected cell (or the formula bar associated with the selected cell), or the additional data may be a numeric value resulting from a function associated with the selected cell. In some cases, the additional data may include alphanumeric data (e.g., textual data, numeric data, formulas, and the like). Alternatively, additional data may include charts, videos, audio files, or any other type of data. As should be appreciated, the additional data may comprise any data in any format.

In some aspects, the additional data may describe or be related to the content of the at least one audio file and may be represented by attribute-value pairs (e.g., content attributes). For instance, referring back to the example of an audio file of a recorded conversation, additional data may include attribute-value pairs such as "speaker 1—Charles"; "speaker 2—Sarah"; "duration 1—10:03 minutes"; and "duration 2—3:07 minutes"; etc. As well, the additional data may be described by formatting attributes that may be represented by attribute-value pairs, e.g., "font size—11 pt."; "font color—red"; "font—Calibri"; etc. In other aspects, the additional data may not necessarily be represented by attribute-value pairs. For instance, the additional data may be a single numeric value that is the output of a formula (e.g., total revenue value, sum of a range of cell values, average value over a range of cell values, etc.). In still other aspects, additional data may be represented as an array or vector of data, as well as any other primitive type (strings, numbers, etc.). Additionally, layout attributes may define a relative arrangement and/or dynamic display of audio data, audio attributes and additional data. For instance, layout attributes may also be defined by attribute-value pairs, e.g., "alignment—top" or "progressive display—1", etc.

At optional create operation 312 (identified by dashed lines), a compound data type may be created to include the selected one or more audio files and the additional data. For example, a hybrid component (e.g., hybrid component 114) of a spreadsheet application (e.g., spreadsheet application 110) may associate the additional data and the one or more audio files in a structured manner, such as an array, record, or table. As noted above, in some cases, the additional data may include content attributes (which may be described in terms of attribute-value pairs) and may be defined by formatting attributes (which may also be described in terms of attribute-value pairs). Additionally, audio attributes may be represented in terms of attribute-value pairs and/or attribute-type pairs. In this case, a compound data type may be created, including the audio data (e.g., modulated data) with audio attributes (e.g., described by attribute-value pairs and/or attribute-type pairs), additional data (e.g., including content attributes and/or formatting attributes described by attribute-value pairs) and/or layout attributes (e.g., described in terms of attribute-value pairs) in a structured format. In some aspects, the compound data type may not include actual data representing one or more of the audio data, audio attributes, additional data and/or layout attributes, but the compound data type may include an array of fields with references or pointers to the actual data, which may be stored as a record in any suitable database or otherwise. As should be appreciated, different types of data (e.g., chart data, video data, image data, etc.) may be described by different sets of attribute-value pairs, but may also be represented within the structured format of a compound data type.

At optional associate operation 314 (identified by dashed lines), similar to associate audio file operations 208 and 308, the compound data type may be associated with the selected cell of the spreadsheet. In some aspects, optional associate operation 314 may replace associate audio file operation 308. That is, in some cases, the audio file may not be associated with the selected cell prior to receiving additional data, but both the audio file and the additional data may be associated with the selected cell at the same time as a compound data type. As detailed above, the term "associate" may include any form of linking the compound data type to the selected cell (or a range of cells) within a spreadsheet. In aspects, a compound data type that is "associated" with a cell may be treated as a plurality of values within the cell.

For example, the compound data type may be anchored within the selected cell (or a range of cells). In this case, file locator for the compound data type may be inserted into the formula bar associated with the selected cell or range of cells. When a compound data type is anchored to a cell, the compound data type (i.e., the audio file and the additional data represented by the compound data type) may move with the cell (or range of cells) when operations are performed on the spreadsheet. In further aspects, the compound data type may be referenced within the selected cell but may be allowed to float over the grid. In this case, operations may be performed on the compound data type and/or operations may be performed on the spreadsheet based on the compound data type, but a visual representation of the audio file and the additional data may or may not move with the selected cell. As should be appreciated, a compound data type may be associated with a cell or a range of cells by any suitable means.

At display operation 316, the additional data and a visual representation of the at least one audio file may be displayed. For example, when a visual representation of the audio file is associated as fill (or background) for a cell or a range of cells, the additional data may be displayed over the visual representation. In some cases, a contrast between the visual representation and the additional data may be manipulated to optimize visibility of the additional data, either automatically or by user selection. Alternatively, when the visual representation is not associated as fill for the selected cell, the additional data and the visual representation may be arranged within the cell in any suitable alignment or layout. As should be appreciated, the additional data and the visual representation may be displayed according to any suitable alignment or layout, either automatically or based on user selection.

Additionally, at display operation 316, a visual representation of the audio file and the additional data may be fit to the cell size or the selected cell may be fit to a size appropriate for the visual representation and the additional data. In some cases, the amount of data associated with the compound data type that is displayed may be based on the cell size, and as a cell is resized, the amount of data displayed may dynamically change. Alternatively, a visual representation of the audio file and the additional data may be allowed to overlay additional cells of the spreadsheet. The above examples are provided for purposes of explanation only and should not be understood as limiting.

As should be appreciated, operations 302-316 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 4:
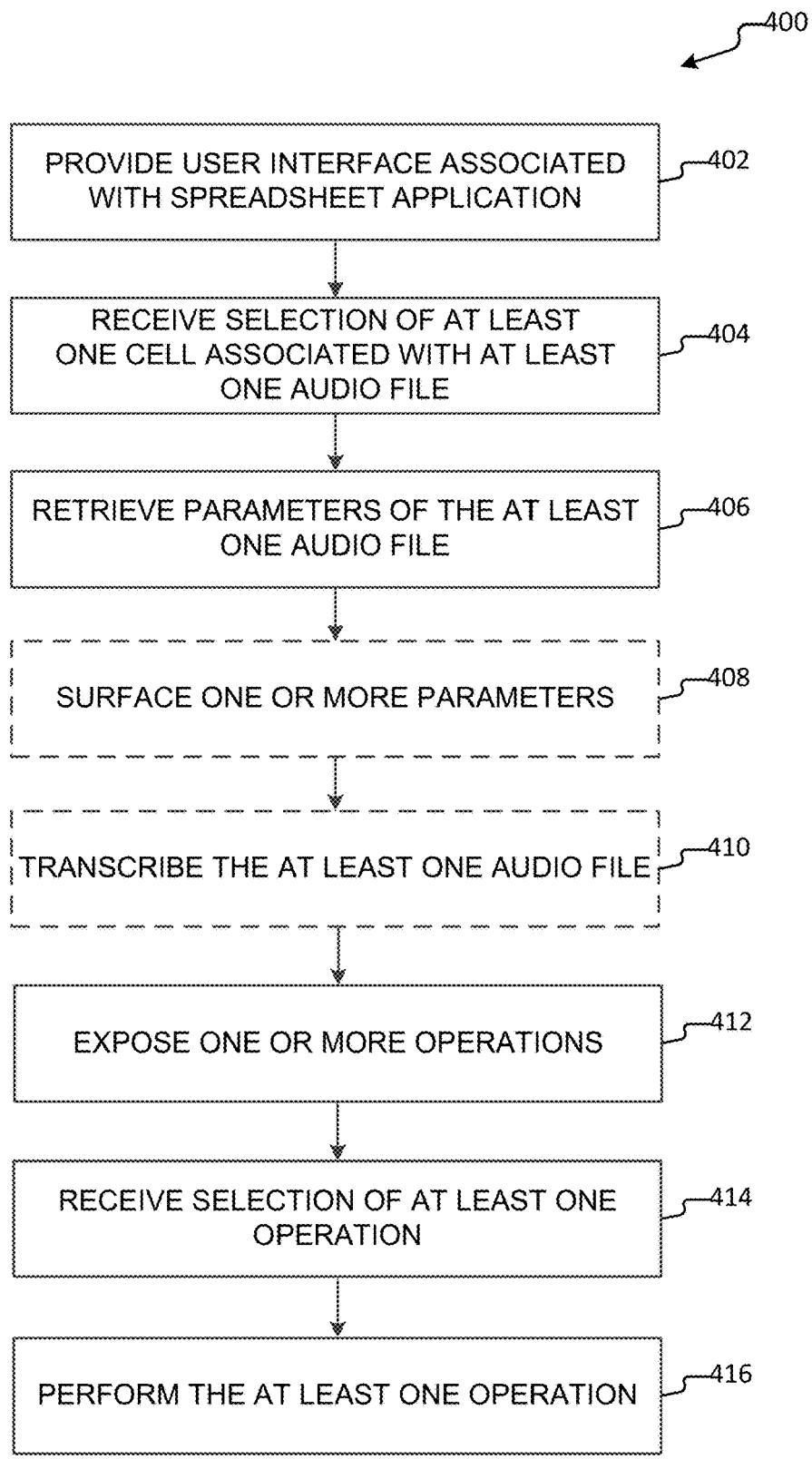
FIG. 4 illustrates a method for exposing one or more operations based on one or more audio files associated with cells of a spreadsheet, according to an example embodiment.

FIG. 4 illustrates a method for exposing one or more operations based on one or more audio files associated with cells of a spreadsheet, according to an example embodiment.

Method 400 begins with provide interface operation 402, where a spreadsheet application may provide (or cause to be provided) a user interface to a user. For example, similar to provide interface operations 202 and 302, a UX component may facilitate a user experience (UX) by providing a user interface (UI) of a spreadsheet application via a display. Selections and/or inputs may be received by the user interface based on gestures, touch, mouse movements, keyboard input, and the like. Additionally, the user interface may operate in conjunction or communication with one or more other components of the spreadsheet application (e.g., associate component 112, hybrid component 114, transcription component 116, attribute component 118, and operation component 120) to manipulate one or more audio files associated with one or more cells of a spreadsheet.

At select cell operation 404, at least one cell having at least one associated audio file may be selected, either automatically (e.g., based on a function) or by user selection. In some aspects, operations may call (or select) a cell without requiring user input, e.g., operations such as 'data refresh,' 'import from such and such data source', 'copy paste,' etc. As detailed above, in other aspects, a spreadsheet application may display a spreadsheet to a user, the spreadsheet including one or more sheets, each sheet having a plurality of rows and columns of cells. Cells having one or more associated audio files may be selected by highlighting or otherwise identifying the cell or range of cells using a gesture, touch, mouse click, keyboard input, and the like. When a single cell is selected, the cell may be identified next to a formula bar of the user interface by a cell identifier that specifies a location of the cell within the spreadsheet. When a range of cells is selected, the cell at the top left corner of the range may be displayed by a cell identifier next to the formula bar, with the range of cells being represented by a range identifier including cell identifiers for the cell at the top left corner and the cell at the bottom right corner.

At retrieve parameters operation 406, one or more parameters may be retrieved for the at least one audio file associated with the selected cell or range of cells. In aspects, retrieve parameters operation 406 may be performed by an attribute component of a spreadsheet application. For example, in response to selecting a cell having at least one associated audio file, audio data and/or audio attributes associated with the audio file may be identified. As noted above, an audio file may be defined by audio data (e.g., modulated data for reproducing recorded sound) and audio attributes (e.g., pitch, volume, resolution, bitrate, codec, creation date and/or time, file name, duration, file size, etc.). In aspects, audio attributes may be appended as metadata to an audio file comprising audio data. In this case, audio data may be extracted (e.g., retrieved) from an audio file and audio attributes may be extracted (e.g., retrieved) from metadata associated with the audio file.

In some cases, a compound data type may be associated with the selected cell. In this case, retrieve parameters operation 406 may retrieve one or more parameters for the associated audio file and/or additional data from the compound data type. For instance, audio data (e.g., modulated data for reproducing recorded sound), audio attributes (e.g., pitch, volume, resolution, bitrate, codec, creation date and/or time, file name, duration, file size, etc.), additional data (e.g., data describing the content of the audio file), formatting attributes (e.g., formatting for the additional data) and/or layout attributes (e.g., regarding layout between the visual representation and additional data) may be retrieved from the compound data type.

At optional surface parameters operation 408 (identified by dashed lines), the audio data, audio attributes, additional data (e.g., including content and/or formatting attributes) and/or layout attributes (e.g., collectively "parameters") retrieved may be "surfaced" such that the parameters may be presented to a user in a readable format. In aspects, a user interface may be provided for presenting some or all of the identified parameters. For instance, a settings toolbar (e.g., settings toolbar 1018) may be provided that includes a number of tabs for viewing and manipulating various audio attributes. In one example, an audio settings tab may display audio attributes such as "pitch," "volume," "speed," "channel," etc. In another example, an audio processing tab may display audio attributes such as "codec," "bitrate," as well as an option to "splice" the audio file. In other examples, tabs associated with the settings toolbar may provide other audio attributes, such as "resolution," "creation date/time," "file size," "duration," and the like. In some cases, e.g., where both an audio file and additional data are associated with a single cell, the settings toolbar may display content and/or formatting attributes for the additional data such as voice recognition data, sound recognition data, duration for each speaker in a conversation, audio clips for each speaker, time stamps for each speaker, etc. Additionally, layout attributes between a visual representation of the audio file and the additional data may be displayed, such as contrast, alignment, background opacity or transparency, and the like. As should be appreciated, any parameter identified by retrieve parameters operation 406 may be displayed in any suitable interface.

At optional transcribe operation 410 (identified by dashed lines), the at least one audio file may be transcribed, e.g., by a transcription component of a spreadsheet application. For example, the audio file may be converted into alphanumeric or symbolic data, either automatically or by user selection. In some aspects, the audio file may be transcribed by a service in communication with spreadsheet application 110. In other aspects, the audio file may be transcribed locally. An audio file of speech may be converted into a text transcription, including a textual representation of each word or sound in the audio file; alternative, an audio file of music may be converted into a musical transcription, including musical notes, bars, frames, and/or musical notations, representing the music of the audio file. In further aspects, the audio file may be converted into any suitable data format.

At expose operation 412, one or more operations may be exposed to a user. The one or more operations may include operations for manipulating parameters of the audio file (or additional data) and/or operations for performing manipulations of the spreadsheet based at least in part on the one or more parameters. For example, UI controls (e.g., +/− controls) or input fields may be provided for manipulating the one or more parameters, e.g., the audio attributes detailed above. In this regard, a user may directly input values to adjust audio attributes up or down based on user preference. For instance, with reference to audio attributes displayed by the settings tab, the values for "pitch," "volume," "speed," and/or "channel," may be adjusted by direct input and/or adjusted up or down using +/− controls. Additionally or alternatively, a "reset" button may be provided to return adjusted parameters back to an original version of the audio file. As should be appreciated, the above examples of parameters are not exhaustive and any parameter may be surfaced and adjusted based on one or more exposed operations.

In further examples, at expose operation 412, one or more operations for manipulating the spreadsheet based at least in part on the retrieved parameters may be exposed to a user. For example, in response to selection of a range of cells, a user interface may provide options for filtering or sorting the range of cells based on one or more parameters of associated audio files. For example, the range of cells may be sorted based on audio attributes such as durations of associated audio files (e.g., "Sort Longest to Shortest" or "Sort Shortest to Longest"), pitches of associated audio files (e.g., "Sort Highest to Lowest" or "Sort Lowest to Highest"), creation dates of associated audio files (e.g., "Sort Newest to Oldest" or "Sort Oldest to Newest"), one or more speakers in the audio files (e.g., alphabetically by speaker), and the like. Options for filtering the range of cells may similarly be based on one or more parameters of associated audio files. As described above, an audio file may be defined by audio data (e.g., modulated data) and audio attributes (e.g., pitch, volume, speed, channel, creation date and/or time, file name, file size, etc.). In aspects, the range of cells may be sorted based on any identifiable audio attribute of associated audio files.

At receive selection operation 414, a selection of one or more operations may be received. For instance, a selection may be received for manipulating any of the parameters identified herein (e.g., the audio attributes detailed above). In this case, a user may select to adjust a setting, perform audio processing functions, adjust a value of an audio attribute, view or manipulate additional data, and the like. Additionally or alternatively, a selection may be received to perform an operation on a range of cells based at least in part on parameters of audio files associated with the range of cells, as described above. A selection may be received as direct input, activation of a control, or otherwise. The selection may be received in the form of a gesture, touch, mouse click, keyboard input, or otherwise. As should be appreciated, a selection to perform one or more operations on an audio file or additional data associated with a cell, or one or more operations on a range of cells based on parameters of associated audio files, may be received by any suitable means.

At perform operation 416, one or more operations may be performed. For instance, an operation may be performed on an audio file and/or additional data associated with a selected cell. Alternatively, an operation on a range of cells may be performed based on parameters of audio files and/or additional data associated with the range of cells. Indeed, any of the operations described herein may be selected and performed. In aspects, a cell preview may further be provided such that changes may be viewed as they are implemented. Based on the preview, a user may "accept" changes before they are implemented. In this regard, a user may manipulate display of a visual representation and/or additional data associated with a cell, manipulate one or more parameters associated with an audio file, manipulate the spreadsheet based on parameters of the audio file, etc.

As should be appreciated, operations 402-416 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 5A:
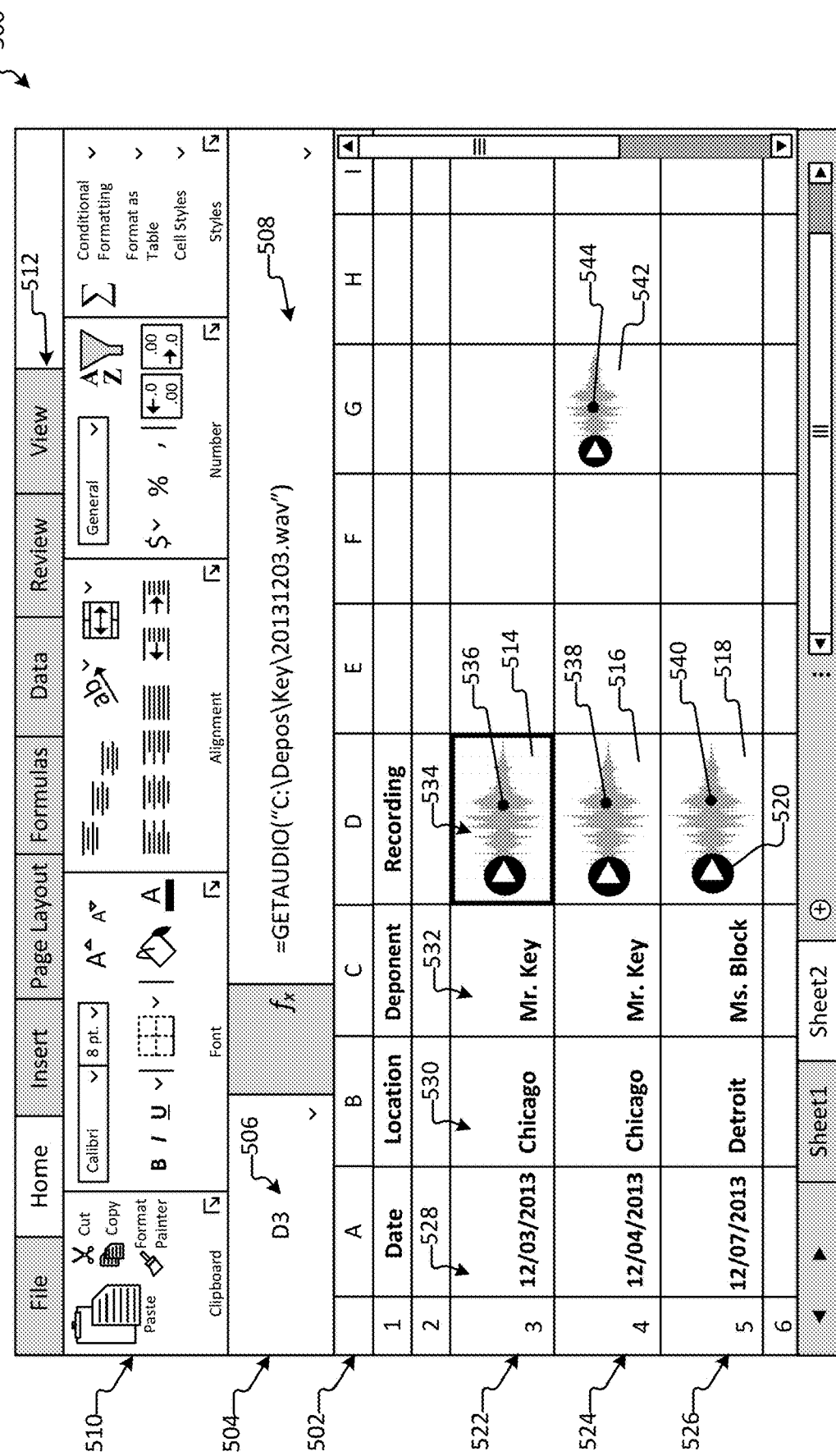
FIG. 5A illustrates an interface showing one or more audio files associated with one or more cells of a spreadsheet, according to an example embodiment.

FIG. 5A illustrates an interface showing one or more audio files associated with one or more cells of a spreadsheet, according to an example embodiment.

As illustrated, an interface 500 of a spreadsheet application is provided. Interface 500 includes a spreadsheet 502, a navigation ribbon 504 (including a cell identifier 506 and a formula bar 508), and a toolbar 510. Interface 500 further includes a plurality of tabs 512 for accessing various aspects and operations of the spreadsheet application. As illustrated, cell D3 is selected, as indicated by thickened and/or colored outlining of the cell border of cell D3. However, a selection of a cell may be indicated by any suitable means, such as highlighting, shading, perceived three-dimensional enlargement, and the like. As shown, a cell identifier 506 (e.g., "D3") for the selected cell is displayed in navigation ribbon 504. Additionally, formula bar 508 displays a function calling a file locator, e.g., fx=GETAUDIO("C:\Depos\Key\20131203.wav",) for the audio file (i.e., audio file 514) displayed within cell D3.

In some aspects, upon hovering over an audio file, various audio attributes associated with the audio file may be displayed (e.g., in a popup window) (not shown). For example, upon hovering over audio file 514, a popup window may display the following audio attributes (not shown): name: depol; type: WAV; size: 1.13 MB; created: Dec. 3, 2013; duration: 04:57.

As further illustrated, a visual representation 536 of audio file 514 is displayed in cell D3. As detailed above, a visual representation of an audio file may be provided as any suitable identifier of an audio file, e.g., a waveform rendering (shown), a speaker icon (not shown), a play icon (not shown), a special icon with metadata (not shown), a file name (not shown), etc. In this case, visual representation 536 is "fit" to cell D3, e.g., visual representation 536 is bounded by the cell border of cell D3. Additionally, as compared to default-sized cells A1-A3 and B1-B3, cell D3 has been resized such that both a cell height and a cell width have been increased to accommodate visual representation 536. Similarly, each cell associated with column D (i.e., column 534) and rows 3-5 (rows 522, 524 and 526, respectively) has been resized to increase a cell height and a cell width so as to accommodate visual representation 536 in cell D3, visual representation 538 in cell D4, and visual representation 540 in cell D5.

FIG. 5A also illustrates a play control 520 displayed over visual representation 540 of audio file 518. In response to activating play control 520, audio file 518 may be played. Similarly, play controls are displayed over visual representations 536 and 538 for playing audio files 514 and 516, respectively. As further illustrated by FIG. 5A, additional data describing audio files 514, 516 and 518 is stored in cells within adjacent rows and/or columns. For example, in column A (i.e., column 528), cells A3, A4 and A5 contain data regarding the deposition "dates" of the depositions recorded in audio files 514, 516, and 518, respectively. In column B (i.e., column 530), cells B3, B4 and B5 contain data regarding the "location" of the depositions recorded in audio files 514, 516 and 518, respectively. In column C (i.e., column 532), cells C3, C4 and C5 contain data regarding the "deponent" of the depositions recorded in audio files 514, 516 and 518, respectively.

In further aspects, as illustrated by FIG. 5A, an audio file in one cell may be referenced by another cell. For instance, the function associated with cell G4 may be "fx=D3". In this case, the audio file 514 represented in cell D3 is associated with cell G4 as audio file 542. As illustrated, visual representation 544 of audio file 542 is "fit horizontally" and aligned at the top of cell G4. As shown, audio file 514 in cell D3 is located by a URL in local storage (e.g., "C:\Depos\Key\20131203.wav"). Based on the function in cell G4 (e.g., "=D3"), the audio file 542 associated with visual representation 544 is located by the same URL. In still further aspects, an audio file in a cell may be referenced in a function and may be displayed and/or played only when a condition of the function is satisfied.

As should be appreciated, the various devices, components, etc., described with respect to FIG. 5A are not intended to limit the systems and methods to the particular components described. Accordingly, additional topology configurations may be used to practice the methods and systems herein and/or some components described may be excluded without departing from the methods and systems disclosed herein.

Figure 5B:
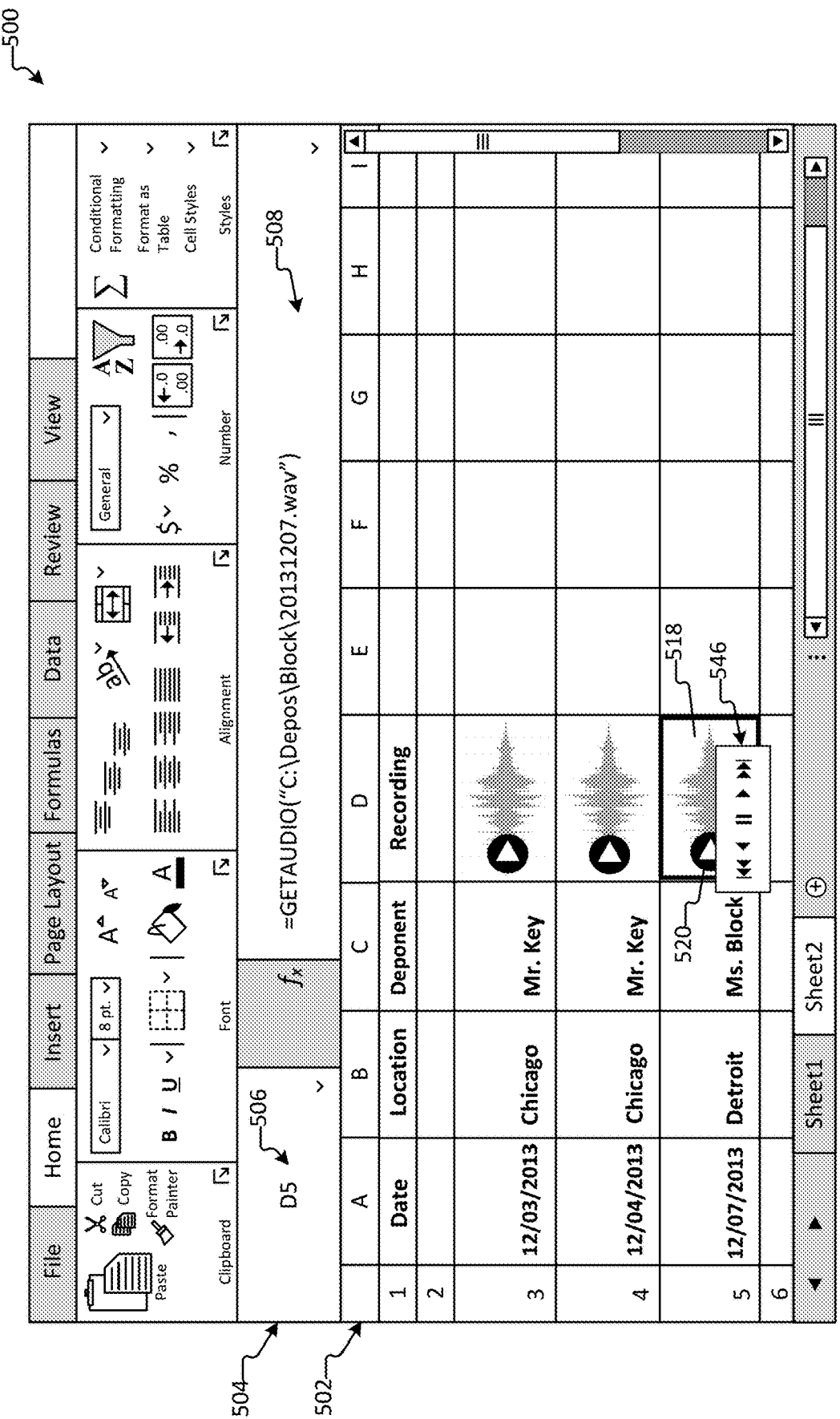
FIG. 5B illustrates an interface showing play controls for listening to one or more audio files associated with one or more cells of a spreadsheet, according to an example embodiment.

FIG. 5B illustrates an interface showing play controls for listening to one or more audio files associated with one or more cells of a spreadsheet, according to an example embodiment.

Similar to FIG. 5A, FIG. 5B shows interface 500 of a spreadsheet application including spreadsheet 502 and navigation ribbon 504, which includes cell identifier 506 and formula bar 508. As illustrated, cell D5 is selected, as indicated by thickened and/or colored outlining of the cell border of cell D5. As shown, a cell identifier 506 (e.g., "D5") for the selected cell is displayed in navigation ribbon 504. Additionally, formula bar 508 displays a function calling a file locator, e.g., fx=GETAUDIO("C:\Depos\Block\20131207.wav"), for the audio file (i.e., audio file 518) displayed within cell D5. In some aspects, in response to hovering over play control 520, play bar 546 may be displayed. As illustrated, play bar 546 provides additional controls for listening to audio file 518. For instance, in order from left to right, icons for "fast rewind" (or "skip back"), "rewind," "pause," "play," and "fast forward" (or "skip forward") are displayed on play bar 546. In aspects, play bar 546 may provide any suitable controls for listening to audio file 518 and the displayed controls are not intended to limit the systems or methods described herein.

As should be appreciated, the various devices, components, etc., described with respect to FIG. 5B are not intended to limit the systems and methods to the particular components described. Accordingly, additional topology configurations may be used to practice the methods and systems herein and/or some components described may be excluded without departing from the methods and systems disclosed herein.

Figure 5C:
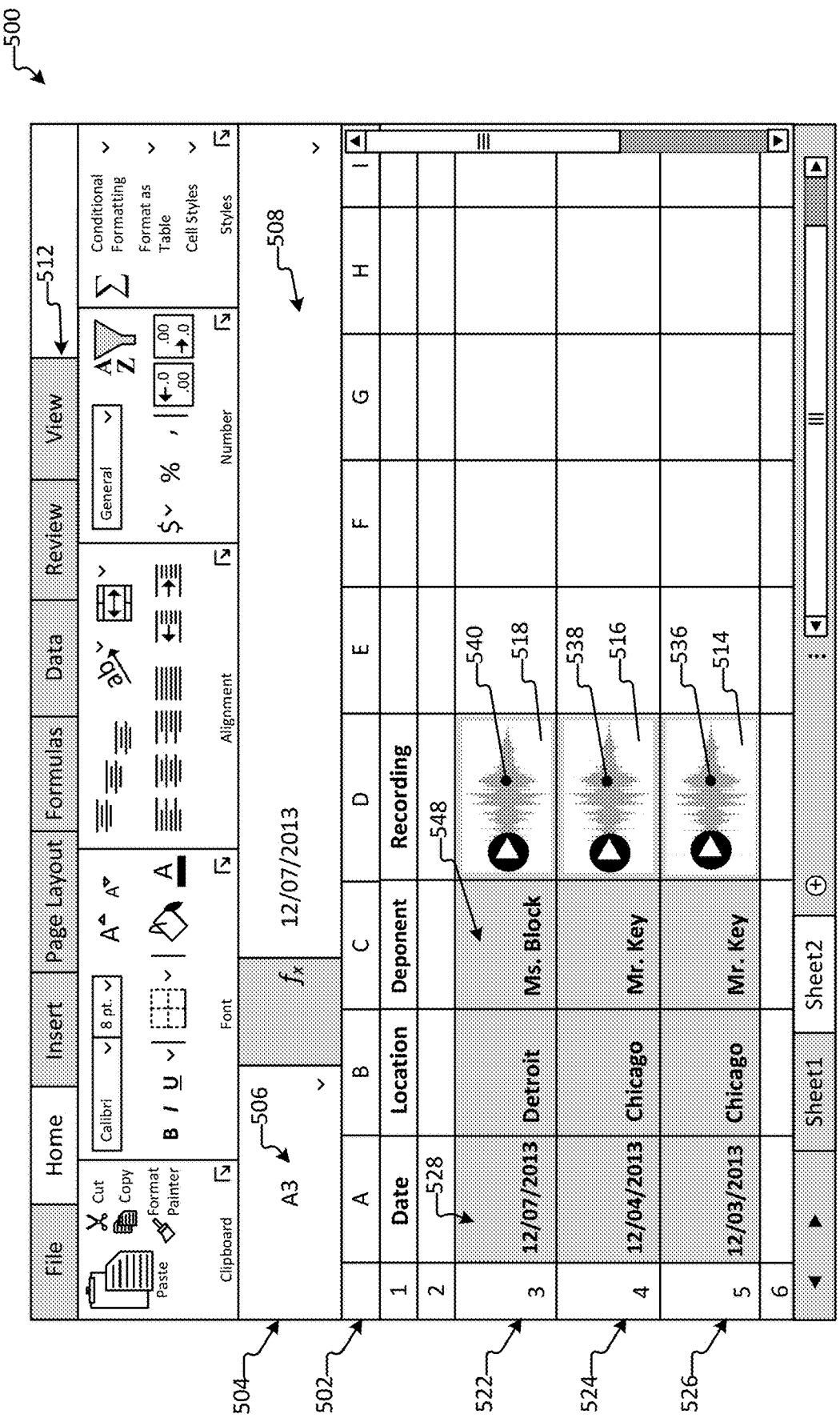
FIG. 5C illustrates an interface showing an outcome of a spreadsheet operation performed on a range of cells associated with a plurality of audio files in a spreadsheet, according to an example embodiment.

FIG. 5C illustrates an interface showing an outcome of a spreadsheet operation performed on a range of cells associated with a plurality of audio files in a spreadsheet, according to an example embodiment.

Similar to FIGS. 5A-5B, FIG. 5C shows interface 500 of a spreadsheet application including spreadsheet 502 and navigation ribbon 504, which includes cell identifier 506 and formula bar 508. In this case, a range of cells 548 (e.g., A3:D5) is shown as selected (e.g., by shading) and the cell at the top left corner of the range (i.e., cell A3) is identified by cell identifier 506 (e.g., "A3") in the navigation pane 504. Additionally, the contents of cell A3 (e.g., date "Dec. 7, 2013") is displayed in formula bar 508.

As detailed above, when audio files are associated with cells of a spreadsheet application, operations performed on the spreadsheet, e.g., sort and filter operations, may also operate on the audio files. As illustrated, a sort operation was performed on range 548 in which the data associated with cells in column 528 (i.e., cells A3, A4 and A5) was reverse chronologically sorted and reordered such that the date "Dec. 7, 2013" is now displayed in the top row of the range (e.g., row 522) above the date "Dec. 4, 2013," which is displayed above the date "Dec. 3, 2013." As further illustrated, after performing the sort operation, data and audio files associated with cells A3:D5 within the range 548 maintained relationships within their respective rows.

For example, cells including data relating to the date "Dec. 7, 2013" were also reordered to the top row (e.g., row 522) of the range 548. That is, the cell including alphanumeric data "Detroit," the cell including alphanumeric data "Ms. Block," and the cell including audio file 518 have also been reordered from row 526 to row 522 in response to the sort operation. Similarly, the cell including date "Dec. 3, 2013," the cell including alphanumeric data "Chicago," the cell including alphanumeric data "Mr. Key," and the cell including audio file 514 have been reordered from row 522 to row 526 in response to the sort operation. As should be appreciated, previous ordering of the data in cell A4 with respect to data within cells A3 and A5, as well as reverse chronological reordering of the data within cells A3-A5, place date "Dec. 4, 2013" within row 524 in both cases. Accordingly, the cell including alphanumeric data "Chicago," the cell including alphanumeric data "Mr. Key," and the cell including audio file 516 remain in row 524 following the sort operation.

Thus, as illustrated by FIG. 5C and disclosed herein, audio files associated with cells of a spreadsheet move with the cells when operations are performed on the spreadsheet. In this regard, audio files may move with associated cells and behave predictably (i.e., maintain established relationships with the data in other cells) when operations are performed on the spreadsheet.

As should be appreciated, the various devices, components, etc., described with respect to FIG. 5C are not intended to limit the systems and methods to the particular components described. Accordingly, additional topology configurations may be used to practice the methods and systems herein and/or some components described may be excluded without departing from the methods and systems disclosed herein.

Figure 5D:
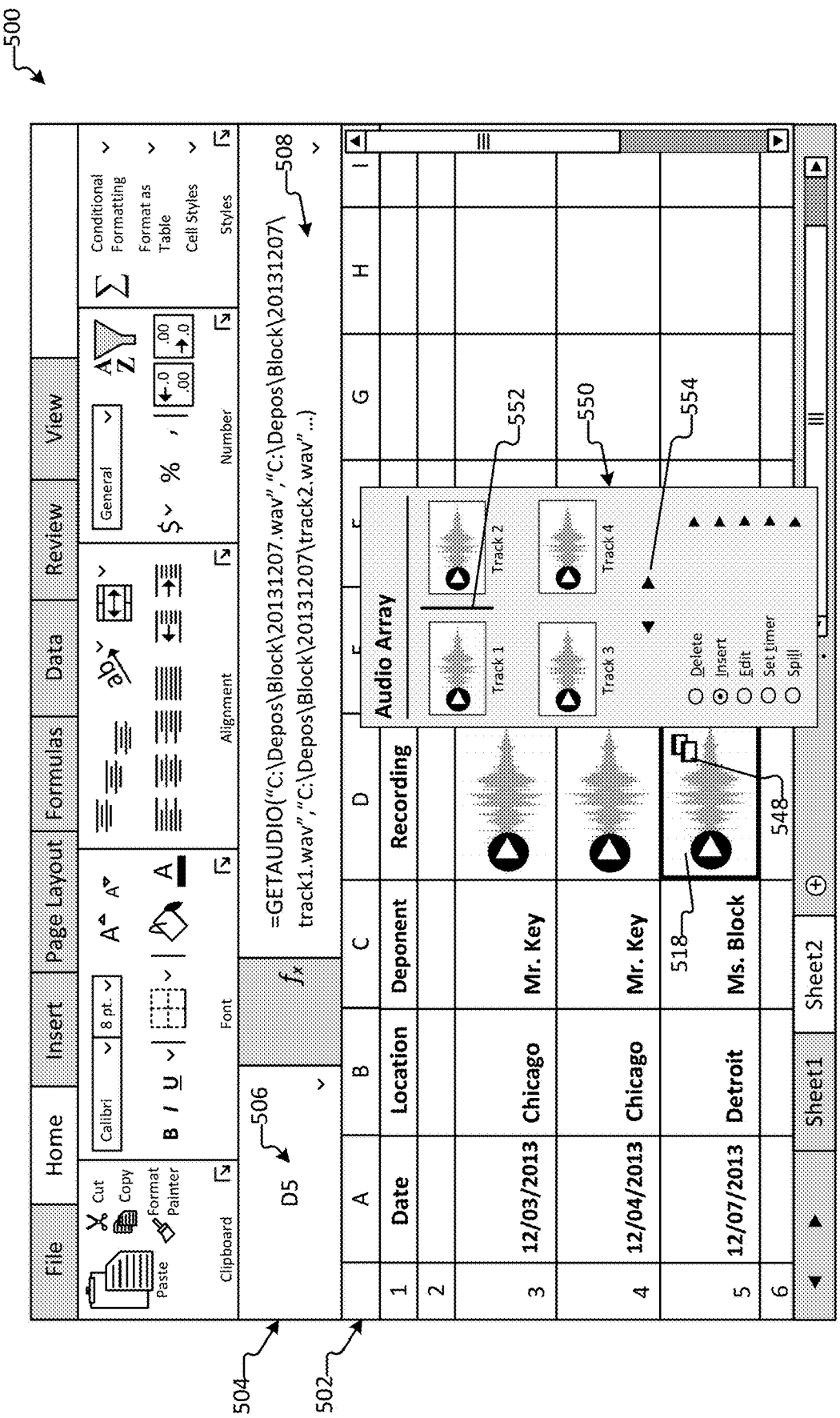
FIG. 5D illustrates an interface showing a UI element for viewing and interacting with a plurality of audio files associated with a cell in a spreadsheet, according to an example embodiment.

FIG. 5D illustrates an interface showing a UI element for viewing and interacting with a plurality of audio files associated with a cell in a spreadsheet, according to an example embodiment.

Similar to FIGS. 5A-5C, FIG. 5D shows interface 500 of a spreadsheet application including spreadsheet 502 and navigation ribbon 504, which includes cell identifier 506 and formula bar 508. As illustrated, cell D5 is selected, as indicated by thickened and/or colored outlining of the cell border of cell D5. As shown, a cell identifier 506 (e.g., "D5") for the selected cell is displayed in navigation ribbon 504. Additionally, formula bar 508 displays a function calling a plurality of audio files, e.g., fx=GETAUDIO("C:\Depos\Block\20131207.wav",
"C:\Depos\Block\20131207\track1.wav",
"C:\Depos\Block\20131207\track2.wav",
"C:\Depos\Block\20131207\track3.wav",
"C:\Depos\Block\20131207\track4.wav"), associated with cell D5.

FIG. 5D illustrates audio file 518 with stack identifier 548. As detailed above, stack identifier 548 indicates that a plurality of audio files is associated with cell D5. In some aspects, the stack identifier 548 may be activated to launch user interface 550 for displaying and/or interacting with each of the plurality of audio files. As illustrated, user interface 550 displays each of the plurality of audio files associated with cell D5 in a grid configuration. As detailed above, user interface 550 may display the plurality of audio files in any suitable configuration, e.g., linear, carousel, etc. User interface 550 may further provide options for performing operations on the plurality of audio files. For instance, a "Delete" option may be provided for removing one or more audio files from the array. In aspects, in response to selection of the "Delete" option, a secondary interface may open for selecting one or more of the audio files for removal from the array and, in some cases, a confirmation to remove the selected one or more audio files. User interface 550 may also provide an "Insert" option for adding one or more audio files to the array. Translation control 554 enables a user to translate through the audio files to a position (identified by place marker 552) for inserting a new audio file. In aspects, in response to selection of the "Insert" option, a secondary interface may open for finding and associating file locator(s) for the new audio file(s) with the selected cell.

User interface 550 may further provide an "Edit" option for manipulating one or more audio files of the array. In aspects, in response to selection of the "Edit" option, a secondary formatting interface may open for surfacing one or more audio attributes for the plurality of audio files, for example, similar to settings toolbar 1018 illustrated by FIG. 10. Additionally, the secondary formatting interface may expose one or more operations, enabling a user to manipulate audio data and/or audio attributes of the plurality of audio files. User interface 550 may also include a "Set timer" option for cycling display of a visual representation for each of the plurality of audio files one at a time within cell D5. In aspects, the timer may cycle on a default schedule in response to selection of the "Set timer" option. Alternatively, in response to selection of the "Set timer" option, a secondary timer interface may open to set a custom cycle time. In some aspects, the "Set timer" option may also provide animation features for cycling, such as fade out and the like.

In still further aspects, a "Spill" option may be provided by user interface 550. The Spill option may allow a user to "spill" the array of audio files into separate cells. For example, upon selection of the Spill option, a secondary interface may open for selecting a range of cells into which the array of audio files should be spilled. In aspects, each audio file of the array of audio files may be spilled and then associated with a cell among the range of selected cells. In alternative options (not shown), a range of cells having associated audio files may be selected and an option to condense the audio files into an array for association with a single cell may be provided. The above examples of options for viewing and interacting with a plurality of audio files are not intended to be exhaustive and should not be understood to be limiting.

As should be appreciated, the various devices, components, etc., described with respect to FIG. 5D are not intended to limit the systems and methods to the particular components described. Accordingly, additional topology configurations may be used to practice the methods and systems herein and/or some components described may be excluded without departing from the methods and systems disclosed herein.

Figure 6A:
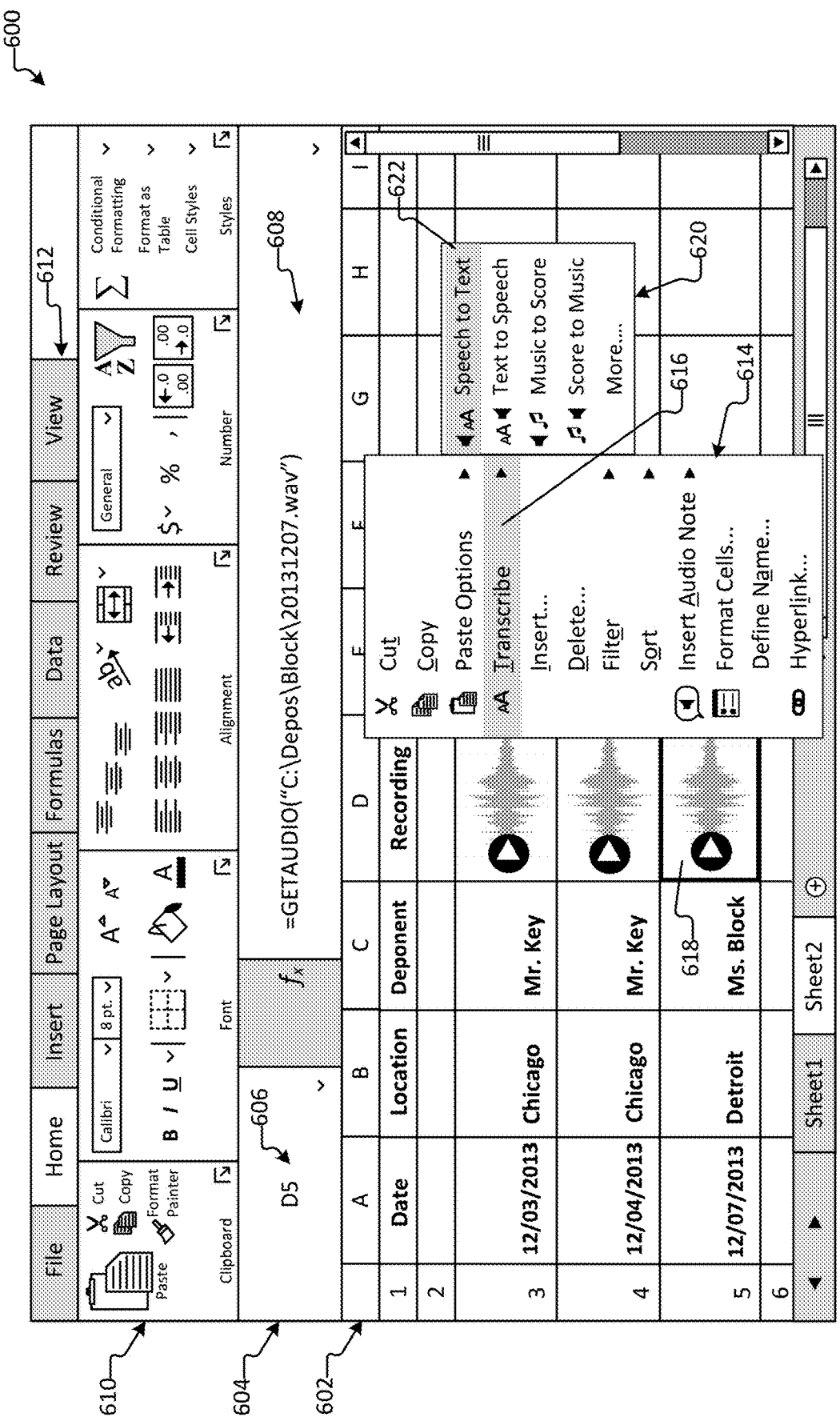
FIG. 6A illustrates an interface showing a popup menu for performing transcription, according to an example embodiment.

FIG. 6A illustrates an interface showing a popup menu for performing transcription, according to an example embodiment.

As illustrated, an interface 600 of a spreadsheet application is provided. Interface 600 includes a spreadsheet 602, a navigation ribbon 604 (including a cell identifier 606 and a formula bar 608), and a toolbar 610. Interface 600 further includes a plurality of tabs 612 for accessing various aspects and operations of the spreadsheet application. As illustrated, cell D5 is selected, as indicated by thickened and/or colored outlining of the cell border of cell D5. However, a selection of a cell may be indicated by any suitable means, such as highlighting, shading, perceived three-dimensional enlargement, and the like. Cell D5 may be selected by clicking the cell, placing a cursor in the cell, touching the cell, etc., for purposes of entering data (e.g., formulas, textual data, numeric data, etc.) or objects (e.g., images, charts, videos, audio files, compound data types, and the like) into the cell. As shown, a cell identifier 606 (e.g., "D5") for the selected cell is displayed in navigation ribbon 604. Additionally, formula bar 608 displays a function calling a file locator, e.g., fx=GETAUDIO("C:$\sqrt[3]{}$Depos\Block\20131207.wav"), for the audio file (i.e., audio file 618) displayed within cell D5.

In aspects, upon selecting a cell including an associated audio file (e.g., audio file 618), a popup menu 614 (or other interface) may be provided for manipulating the audio file or other data in the selected cell. In other aspects, popup menu 614 may be provided in response to additional input (e.g., right click, hover over, etc.). Popup menu 614 may provide any number of options for adding content and/or manipulating data or objects associated with a selected cell. As illustrated, popup menu 614 provides options including "Cut," "Copy" and "Paste." In this case, data or objects may be cut from a cell, copied in a cell and/or pasted to a cell.

Additionally, popup menu 614 provides transcribe option 616, which is selected as evidenced by shading. As detailed above, a transcription component (e.g., transcription component 116) associated with a spreadsheet application (e.g., spreadsheet application 110) may operate in various ways to convert an audio file into alphanumeric or symbolic data and/or to create an audio file from alphanumeric or symbolic data. In response to selection of transcribe option 616, a secondary popup menu 620 may be displayed. Secondary popup menu 620 may provide a number of options for transcription, for example, "Speech to Text," "Text to Speech," "Music to Score," or "Score to Music," etc. As illustrated, the "Speech to Text" option 622 has been selected (e.g., evidenced by shading). For example, an audio file including speech may be converted into a text transcription (e.g., "Speech to Text"), which is a textual representation of each word or sound in the audio file. Conversely, a textual document may be converted into an audio file (e.g., "Text to Speech"), e.g., spoken words may be generated that correspond to the text of the document. In further aspects, an audio file of music may be transcribed into a musical score (e.g., "Music to Score"), including musical notes, bars, frames, and/or musical notations, representing the music of the audio file. Alternatively, a musical score may be converted by optical character recognition (OCR) into an audio file (e.g., "Score to Music") encoding data for producing sound waves representative of the musical score.

Alternatively, a function may calculate a translation from musical score for piano to a musical score for saxophone (e.g., a scale and note translation may result in new values for each note in the music, where the 'result' is the new score). In further aspects, e.g., for low vision users, data within cells of the spreadsheet may be transcribed (e.g., "Text to Speech") and the data may be "played" for the user at any time. In this regard, a spreadsheet may be converted into speech on a cell-by-cell basis, by groups of cells, or globally across the spreadsheet. To further improve user experience, particularly for low vision users, the spreadsheet may be customized to associate sounds with colors, numbers, trends, or any other aspect of a spreadsheet. Similarly, by transcribing alphanumeric or other data into an audio file (e.g., "Text to Speech") and associating the audio file with a cell, a spreadsheet application becomes able to read its own data. For instance, when a condition is met within the spreadsheet (e.g., a revenue number hits a threshold value, or orders for a product hit a threshold number, etc.), an audio file may be generated and sent in an email, voicemail, text, etc., or may be associated with the spreadsheet such that the audio file plays the next time the spreadsheet application is opened. The audio file may be a notification (e.g., revenue hit "x"), a reminder (e.g., orders hit 500 units, remember to order boxes for shipping), an encouragement (e.g., "Way to go!" sent to a sales team upon hitting sales goal), or any other message. As should be appreciated, transcription may include converting an audio file into alphanumeric or symbolic data and/or creating an audio file from alphanumeric or symbolic data according to any suitable means.

Additionally, popup menu 614 includes an option to "Insert." The "Insert" option may enable a user to associate data, audio files or other objects with a selected cell. In a first example, upon selection of the "Insert" option, a menu may provide for associating an audio file by browsing a file structure to identify a file locator for an audio file. In a second example, e.g., where at least one audio file is already associated with the cell, upon selection of the "Insert" option, a UI element may open that displays the at least one audio file already associated with the cell. The UI element may further enable a user to scroll through a plurality of associated audio files and add an audio file in a selected position within the plurality of associated audio files. In a third example, where data and/or an audio file are already associated with the cell, upon selection of the "Insert" option, a UI element may open that enables a user to add data and/or an audio file (or other object) to the selected cell. In some cases, a compound data type may be created to insert the additional data and/or audio file to the selected cell. Alternatively, a compound data type may already exist and the additional data and/or audio file may be added to the compound data type. As should be appreciated, additional examples are possible and the above examples are offered for purposes of explanation and should not be understood as limiting.

Popup menu 614 further includes a "Delete" option. In contrast to the "Insert" option, the "Delete" option may enable a user to delete data, audio files or other objects from the selected cell. The menus described above with respect to the "Insert" option may similarly apply to the "Delete" option. In addition, popup menu 614 may provide "Filter" and "Sort" options, described further below with respect to FIG. 8. An "Insert Audio Note" option may enable a user to create and associate an audio note with a cell, described further below with respect to FIGS. 7A-7B.

Popup menu 614 may further provide a "Format Cells" option. The "Format Cells" option may enable a user to adjust an alignment of data, a visual representation of an audio file or another object within a selected cell. For instance, the data may be right, left or center justified. Additionally or alternatively, the "Format Cells" option may enable a user to adjust an alignment between a visual representation of an audio file and additional data or another object. For example, the additional data may be provided above, below, on either side, or wrapping a visual representation of an audio file. In some examples, the "Format Cells" operation may allow a visual representation of an audio file to become background or fill for a cell, allowing additional data to be displayed on top of the visual representation within the cell. The "Format Cells" option may further provide any number of other options, e.g., including options for adjusting a cell border, a cell fill, font of alphanumeric data, formatting of numeric data, and the like.

In further aspects, popup menu 614 may provide a "Define Name" option, which may enable a globally unique name to be assigned to an audio file or other object. In some aspects, the globally unique name may be associated as metadata to an audio file and may serve as a file locator for the audio file. For instance, the globally unique name may be referenced within a function of a cell in order to perform operations on an audio file (e.g., play the audio file when a condition of the function is met, perform operations on audio attributes, etc.) and/or to perform operations on the spreadsheet based on attributes of the audio file, and the like. Popup menu 614 may further provide a "Hyperlink" option for inserting a hyperlink to a file, a webpage, or otherwise. As should be appreciated, the options of popup menu 614 described above are not exhaustive and should not be considered to be limiting. Indeed, any number of options may be provided by popup menu 614.

As should be appreciated, the various devices, components, etc., described with respect to FIG. 6A are not intended to limit the systems and methods to the particular components described. Accordingly, additional topology configurations may be used to practice the methods and systems herein and/or some components described may be excluded without departing from the methods and systems disclosed herein.

Figure 6B:
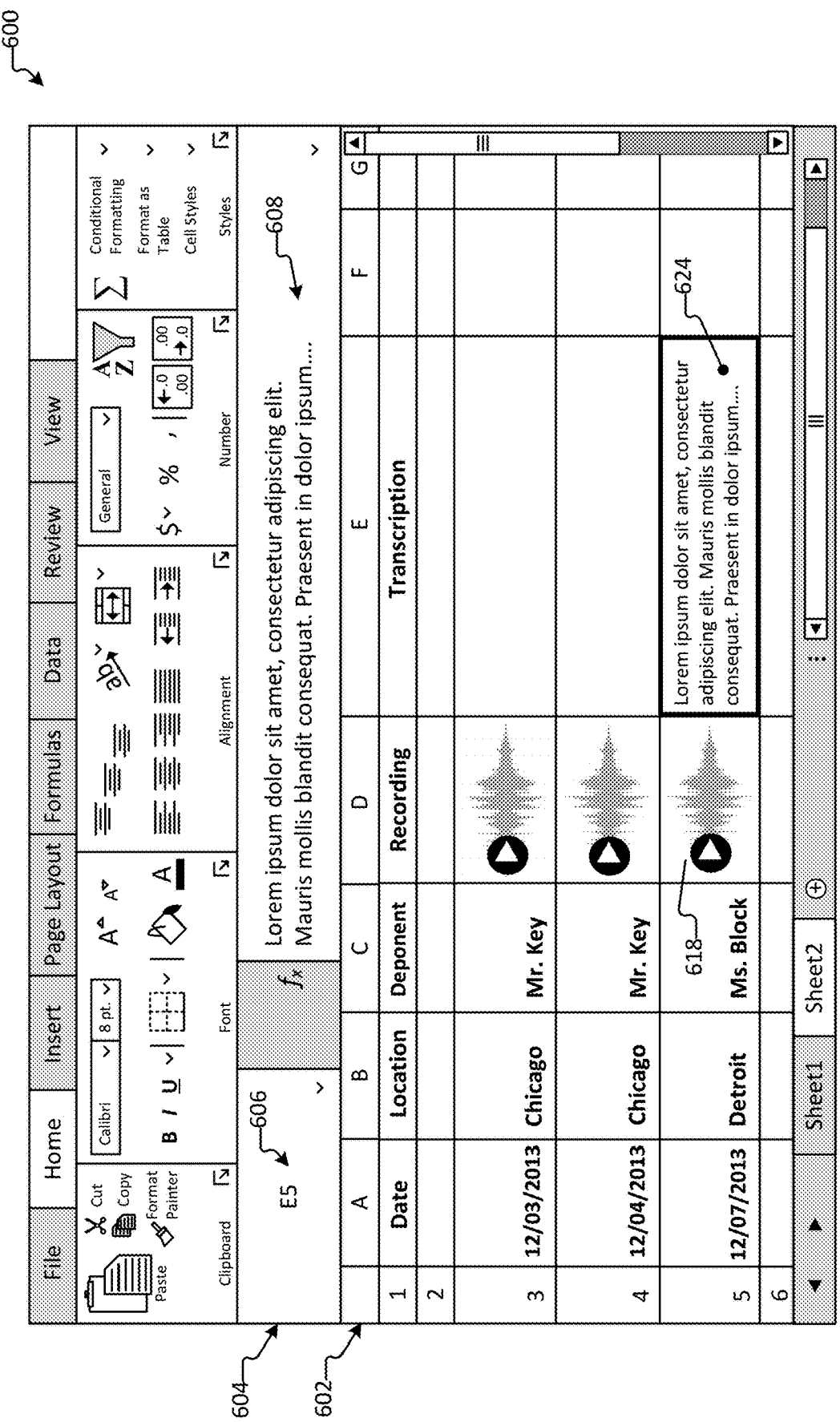
FIG. 6B illustrates an interface showing a text transcription of an audio file, according to an example embodiment.

FIG. 6B illustrates an interface showing a text transcription of an audio file, according to an example embodiment.

Similar to FIG. 6A, FIG. 6B shows interface 600 of a spreadsheet application including spreadsheet 602 and navigation ribbon 604, which includes cell identifier 606 and formula bar 608. As illustrated, cell E5 is selected, as indicated by thickened and/or colored outlining of the cell border of cell E5. As shown, a cell identifier 606 (e.g., "E5") for the selected cell is displayed in navigation ribbon 604. Additionally, formula bar 608 displays at least a portion of the textual content of cell E5 (e.g., "Lorem ipsum dolor sit amet, consectetur adipiscing elit . . . ").

As described with reference to FIG. 6A, cell D5 may have been selected and, in response to selection of transcribe option 616 (i.e., a "Transcribe") and option 622 (i.e., "Speech to Text"), an audio file 618 associated with cell D5 may be transcribed. In some cases, a text transcription of audio file 618 may be generated and associated with cell D5, e.g., within a compound data type as described above. Alternatively, a second cell may be selected and the text transcription of the audio file 618 may be associated with the second cell. In some aspects, the second cell may be selected by a user; in other aspects, the second cell may automatically be selected (e.g., a cell adjacent to the first cell may automatically be selected. As illustrated, text transcription 624 has been generated and associated with cell E5 (second cell). In still further aspects, a text transcription of an audio file may be provided in a bubble, balloon, or otherwise (not shown), and in some cases, may be identified by an icon that may be activated to display the text transcription (not shown).

Figure 7A:
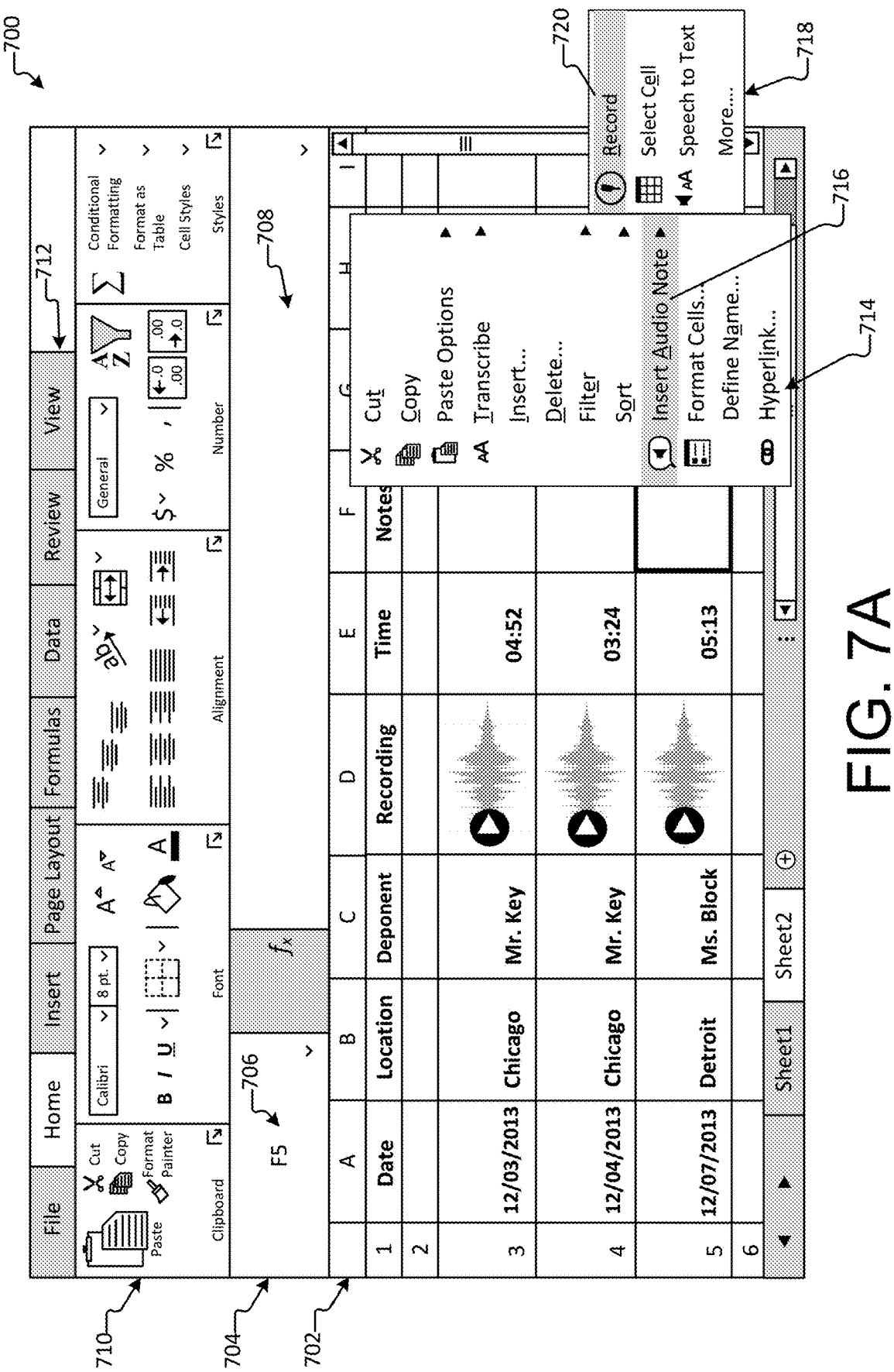
FIG. 7A illustrates an interface showing a popup menu for inserting an audio note in a cell of a spreadsheet, according to an example embodiment.

As should be appreciated, the various devices, components, etc., described with respect to FIG. 6B are not intended to limit the systems and methods to the particular components described. Accordingly, additional topology configurations may be used to practice the methods and systems herein and/or some components described may be excluded without departing from the methods and systems disclosed herein.

FIG. 7A illustrates an interface showing a popup menu for inserting an audio note in a cell of a spreadsheet, according to an example embodiment.

As illustrated, an interface 700 of a spreadsheet application is provided. Interface 700 includes a spreadsheet 702, a navigation ribbon 704 (including a cell identifier 706 and a formula bar 708), and a toolbar 710. Interface 700 further includes a plurality of tabs 712 for accessing various aspects and operations of the spreadsheet application. As illustrated, cell F5 is selected, as indicated by thickened and/or colored outlining of the cell border of cell F5. As shown, a cell identifier 706 (e.g., "F5") for the selected cell is displayed in navigation ribbon 704. In this case, cell F5 is empty and formula bar 708, which displays the contents of cell F5, is also empty.

In aspects, upon selecting a cell (e.g., cell F5), a popup menu 714 (or other interface) may be provided. In other aspects, popup menu 714 may be provided in response to additional input (e.g., right click, hover over, etc.). Popup menu 714 may provide any number of options for adding content and/or manipulating data or objects associated with a selected cell, as described above with reference to FIG. 6A. For instance, as illustrated, an option 716 may be selected to "Insert Audio Note." In aspects, an audio note may be a brief sound clip conveying instructions, information, comments, reminders, explanations, and the like. In some cases, an audio note may automatically play in response to satisfaction of a condition within a formula. For instance, when a condition is met within the spreadsheet (e.g., a revenue number hits a threshold value, or orders for a product hit a threshold number, etc.), the audio note may be sent in an email, voicemail, text, etc., or may be associated with the spreadsheet such that the audio note plays the next time the spreadsheet application is opened. The audio file may be a notification (e.g., revenue hit "x"), a reminder (e.g., orders hit 500 units, remember to order boxes for shipping), an encouragement (e.g., "Way to go!" sent to a sales team upon hitting sales goal), an explanation (e.g., "EBITDA number is down due to higher than expected labor costs."), or any other message.

In aspects, in response to selection of option 716, a secondary popup menu 718 may be displayed. Secondary popup menu 718 may provide a number of options for inserting an audio note. For example, "Record," "Select Cell," "Speech to Text," etc. As illustrated, the "Record" option 720 has been selected (e.g., evidenced by shading). In this case, upon selection of the "Record" option 720, a user may speak the message into a microphone associated with a computing device. The recorded audio note may then be associated with a selected cell (e.g., cell F5), which in this case has already been selected. In other examples, a user may select a cell after recording the audio note by selecting option "Select Cell." In further aspects, a user may select to transcribe the audio note by selecting "Speech to Text." In this case, a text transcription of the audio note may be provided in a balloon, bubble, or otherwise, either displayed automatically or upon user selection (e.g., by hovering over, clicking, etc.).

As should be appreciated, the various devices, components, etc., described with respect to FIG. 7A are not intended to limit the systems and methods to the particular components described. Accordingly, additional topology configurations may be used to practice the methods and systems herein and/or some components described may be excluded without departing from the methods and systems disclosed herein.

Figure 7B:
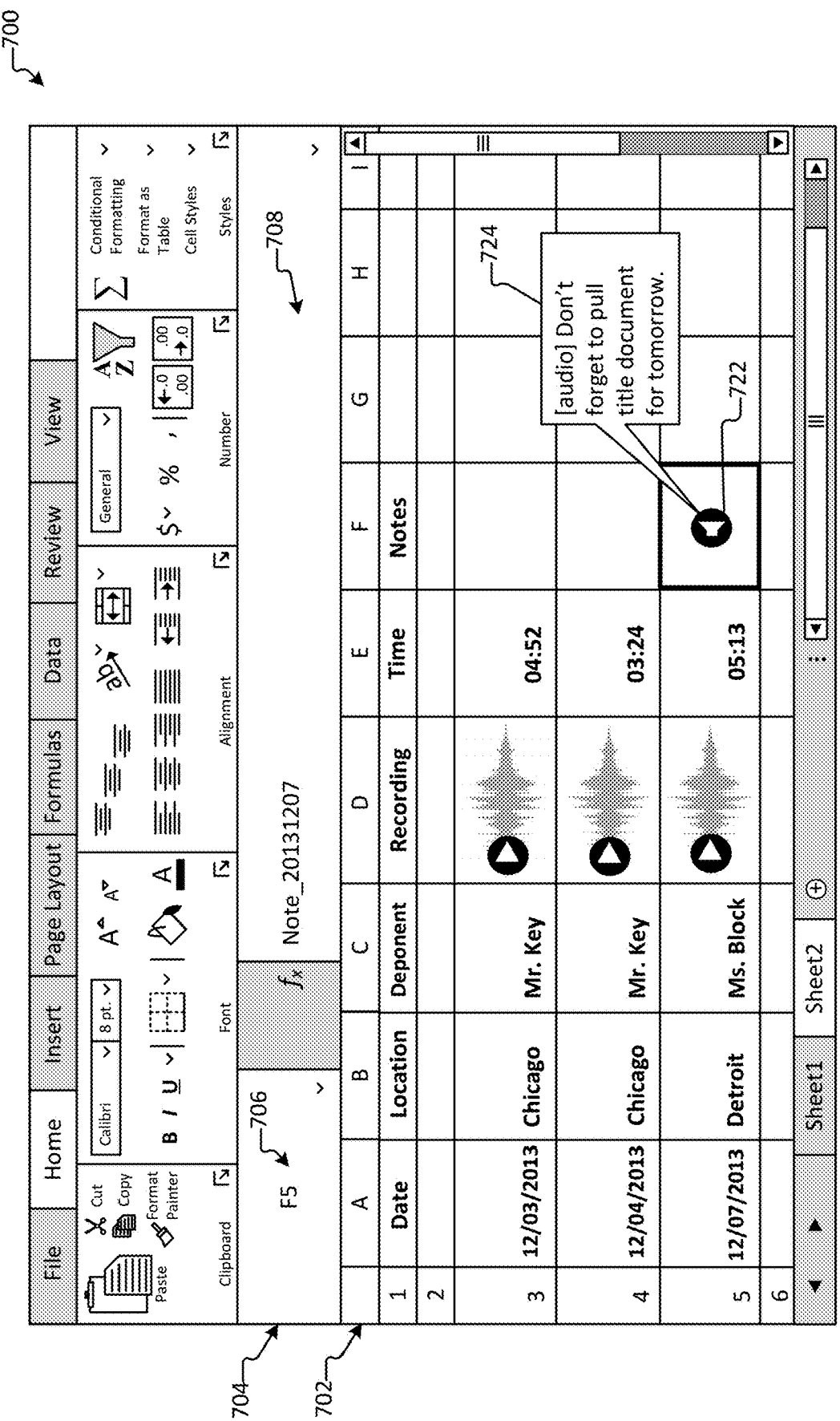
FIG. 7B illustrates an interface showing an audio note inserted in a cell of a spreadsheet, according to an example embodiment.

FIG. 7B illustrates an interface showing an audio note inserted in a cell of a spreadsheet, according to an example embodiment.

Similar to FIG. 7A, FIG. 7B shows interface 700 of a spreadsheet application including spreadsheet 702 and navigation ribbon 704, which includes cell identifier 706 and formula bar 708. As illustrated, cell F5 is selected, as indicated by thickened and/or colored outlining of the cell border of cell F5. As shown, a cell identifier 706 (e.g., "F5") for the selected cell is displayed in navigation ribbon 704. In this case, whereas formula bar 708 was empty in FIG. 7A, the formula bar 708 of FIG. 7B displays a name of the audio note inserted in cell F5 (e.g., "Note_20131207").

Additionally, an audio icon 722 is displayed in cell F5, indicating that an audio note is associated with the cell. In aspects, any suitable indicator of an associated audio note may be displayed in cell F5. In further aspects, a text transcription balloon 724 is provided. For instance, in response to hovering over audio icon 722 (or right click on audio icon 722), text transcription balloon 724 may be displayed to a user. In other aspects, the audio note may be played (e.g., spoken) in response to hovering over or clicking audio icon 722. In still further aspects, the audio not may be displayed and spoken upon hovering over or clicking audio icon 722. The above examples are provided for purposes of explanation and should not be considered limiting.

As should be appreciated, the various devices, components, etc., described with respect to FIG. 7B are not intended to limit the systems and methods to the particular components described. Accordingly, additional topology configurations may be used to practice the methods and systems herein and/or some components described may be excluded without departing from the methods and systems disclosed herein.

Figure 8:
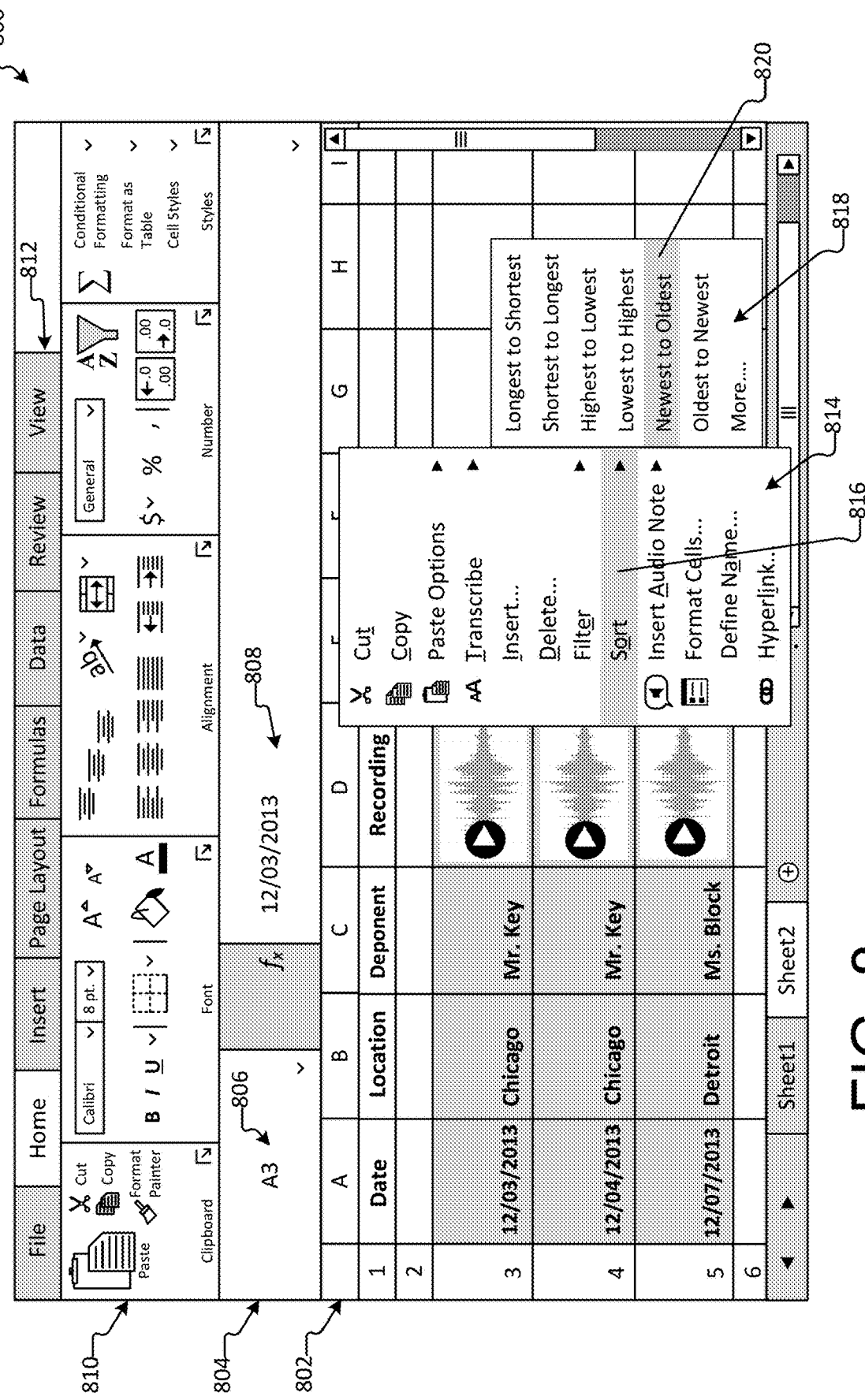
FIG. 8 illustrates an interface showing a popup menu for sorting a range of cells in a spreadsheet based on one or more attributes of audio files associated with the range of cells, according to an example embodiment.

FIG. 8 illustrates an interface showing a popup menu for sorting a range of cells in a spreadsheet based on one or more attributes of audio files associated with the range of cells, according to an example embodiment.

As illustrated, an interface 800 of a spreadsheet application is provided. Interface 800 includes a spreadsheet 802 and a navigation ribbon 804, including a cell identifier 806 and a formula bar 808. Interface 800 further includes a plurality of tabs 812 for accessing various aspects and operations of the spreadsheet application. As further illustrated, a range of cells (A3:D5) is selected, as illustrated by shading or highlighting over the range of cells. As shown, cell identifier 806 (e.g., "A3"), identifying a cell at the top left corner of the range of cells, is displayed in navigation ribbon 804. Additionally, formula bar 808 displays the contents of cell A3 (e.g., "Dec. 3, 2013").

As indicated above, the range of cells (i.e., A3:D5) has been selected. The range of cells may be selected by highlighting the range of cells, touching (or swiping) the range of cells, entering "=A3:D5" into the formula bar, etc. In aspects, upon selecting a range of cells including associated audio files, a first popup menu 814 (or other interface) may be provided for manipulating associated audio files or other data in the selected range of cells. In other aspects, first popup menu 814 may be provided in response to additional input (e.g., right click, hover over, etc.).

Similar to popup menus 614 and 714, first popup menu 814 may provide any number of options for manipulating data or objects associated with the selected range of cells.

For instance, first popup menu 814 may provide "Filter" and "Sort" options for filtering or sorting the spreadsheet based on one or more audio attributes of the associated audio files. For example, in response to selecting "Sort" option 816, a second popup menu 818 may be provided. The second popup menu 818 may provide options for sorting the spreadsheet based on audio attributes of associated audio files (e.g., audio files associated with the selected range of cells). As described above, an audio file may be defined by audio data (e.g., modulated data for storing sound waves) and/or audio attributes (e.g., volume, pitch, channel, bitrate, creation date and/or time, file name, file size, etc.). Sorting may be performed based on audio data and/or audio attributes, e.g., duration of associated audio files (e.g., "Sort Longest to Shortest" or "Sort Shortest to Longest"), pitch of associated audio files (e.g., "Sort Highest to Lowest" or "Sort Lowest to Highest"), creation dates of associated audio files (e.g., "Sort Newest to Oldest" or "Sort Oldest to Newest"), and the like. Additionally, sort, filter and conditional formatting operations may be performed on metadata attributes that are not visible or displayed in the cell. For instance, tangible may be identified, e.g., GEO location data that was captured and stored as part of metadata for an audio file recorded by a mobile device, and surfaced and/or manipulated the spreadsheet. In aspects, a spreadsheet may be sorted based on any identifiable audio attribute, and in some cases identifiable audio data, of associated audio files.

As should be appreciated, the various devices, components, etc., described with respect to FIG. 8 are not intended to limit the systems and methods to the particular components described. Accordingly, additional topology configurations may be used to practice the methods and systems herein and/or some components described may be excluded without departing from the methods and systems disclosed herein.

Figure 9A:
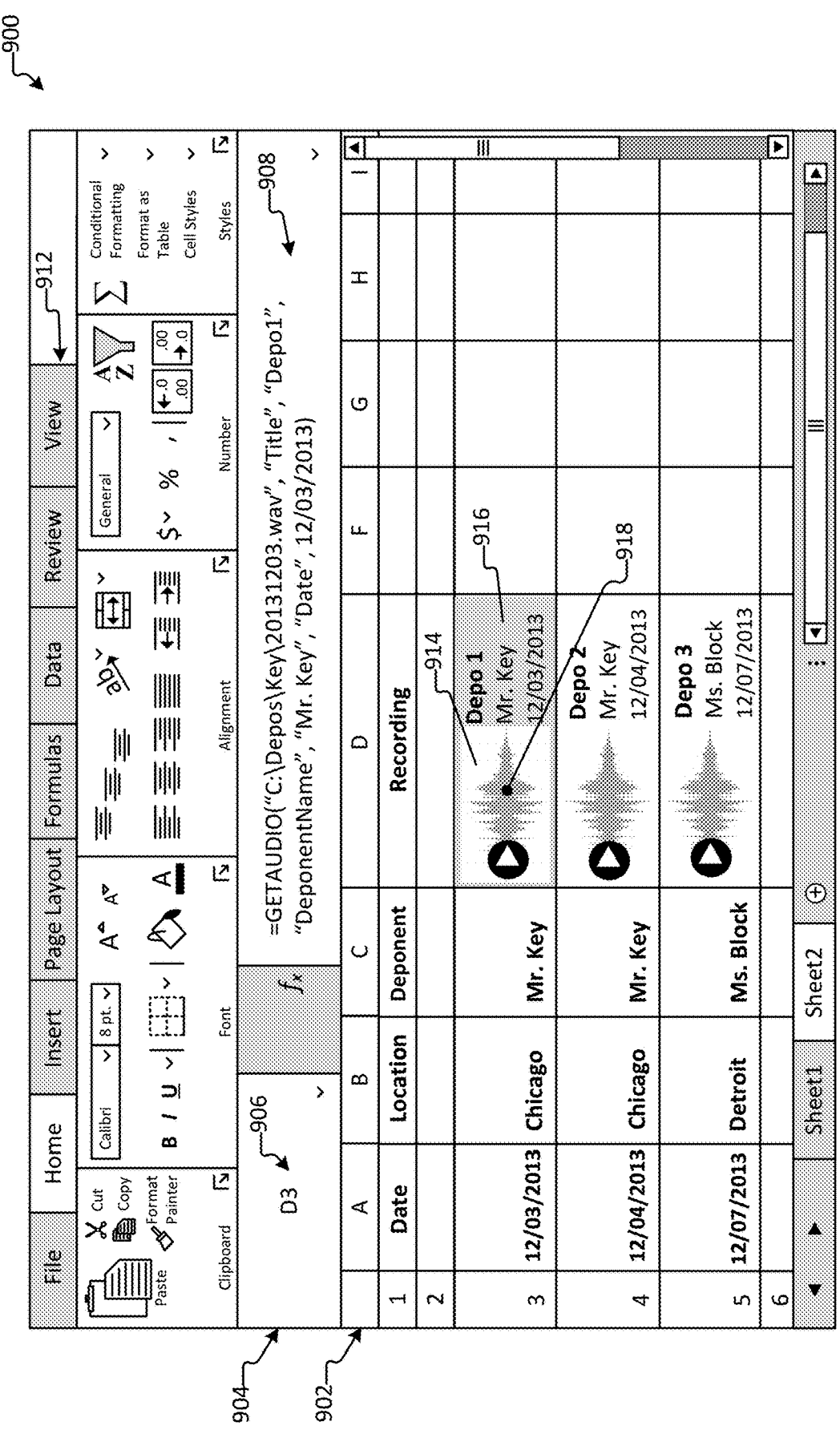
FIG. 9A illustrates an interface showing one or more audio files and additional data associated with one or more cells of a spreadsheet, according to a first example embodiment.

FIG. 9A illustrates an interface showing one or more audio files and additional data associated with one or more cells of a spreadsheet, according to a first example embodiment.

As illustrated, an interface 900 of a spreadsheet application is provided. Interface 900 includes a spreadsheet 902 and a navigation ribbon 904, including a cell identifier 906 and a formula bar 908. Interface 900 further includes a plurality of tabs 912 for accessing various aspects and operations of the spreadsheet application. As further illustrated, cell D3 is selected, as indicated by shading of cell D3. However, selection of a cell may be indicated by any suitable means, such as highlighting, perceived three-dimensional enlargement, outlining of the cell border, and the like. As shown, a cell identifier 906 (e.g., "D3") for the selected cell is displayed in navigation ribbon 904.

As illustrated, cell D3 contains both an audio file (e.g., audio file 914) and additional data (e.g., additional data 916). In the illustrated embodiment, visual representation 918 identifies an audio file 914 and additional data 916 describes audio file 914, e.g., title "Depo 1," deponent "Mr. Key," and date "Dec. 3, 2013." In some aspects, audio file 914 and additional data 916 may be associated with a compound data type. In this case, a formula bar 908 for cell D3 may display a function referencing a globally unique name for the compound data type (e.g., the compound data type representing the audio file 914 and the additional data 916) associated with cell D3. In other aspects, formula bar 908 may display a function calling audio file 914 and additional data 916 contained in cell D3.

A function representing the compound data type may be identified using a variety of syntax. For instance, the function may surface whatever attribute-value pairs are stored in the compound data type and may be represented as: =GETAUDIO("C:\Depos\Key\20131203.wav", "Title", "Depo1", "DeponentName", "Mr. Key", "Date", Dec. 3, 2013). In other aspects, where a user combines an audio file with an arbitrary set of values (e.g., a record), the function may be represented as: =GETAUDIO("C:\depos\key\2013203.wav", RECORD("Title", "Depo1", "DeponentName", "Mr. Key", "Date", Dec. 3, 2013)). In still other aspects, where an audio file (identified by a ".wav" file extension) is added to a compound data type constructed by a user, the audio file would amount to a value within the compound data type (e.g., a record) and the function may be represented as: =RECORD("Audio", "C:\depos\key\2013203.wav", "Title", "Depo1", "DeponentName", "Mr. Key", "Date", Dec. 3, 2013). In still other aspects, a user may create a compound data type and give the compound data type a name (e.g., "Deposition"). The next time the compound data type is used, each attribute name is already known as a field in the "Deposition" compound data type and only the values need to be called out in the function, which may be represented as: =DEPOSITION("C:\depos\key\2013203.wav", "Depo1", "Mr. Key", Dec. 3, 2013). Further, the function may simply reference attributes of the audio file and read the values from metadata, e.g., =RECORD("Audio", "C:\depos\key\2013203.wav", "Title", Audio.Title "DeponentName", "Mr. Key", "Date", Audio.CreatedDate). In this case, a user may provide custom fields within the compound data type (e.g., record) and, by dereferencing the 'audio' field, values may be read from metadata and populated in the user's defined fields in the record.

As should be appreciated, the various devices, components, etc., described with respect to FIG. 9A are not intended to limit the systems and methods to the particular components described. Accordingly, additional topology configurations may be used to practice the methods and systems herein and/or some components described may be excluded without departing from the methods and systems disclosed herein.

Figure 9B:
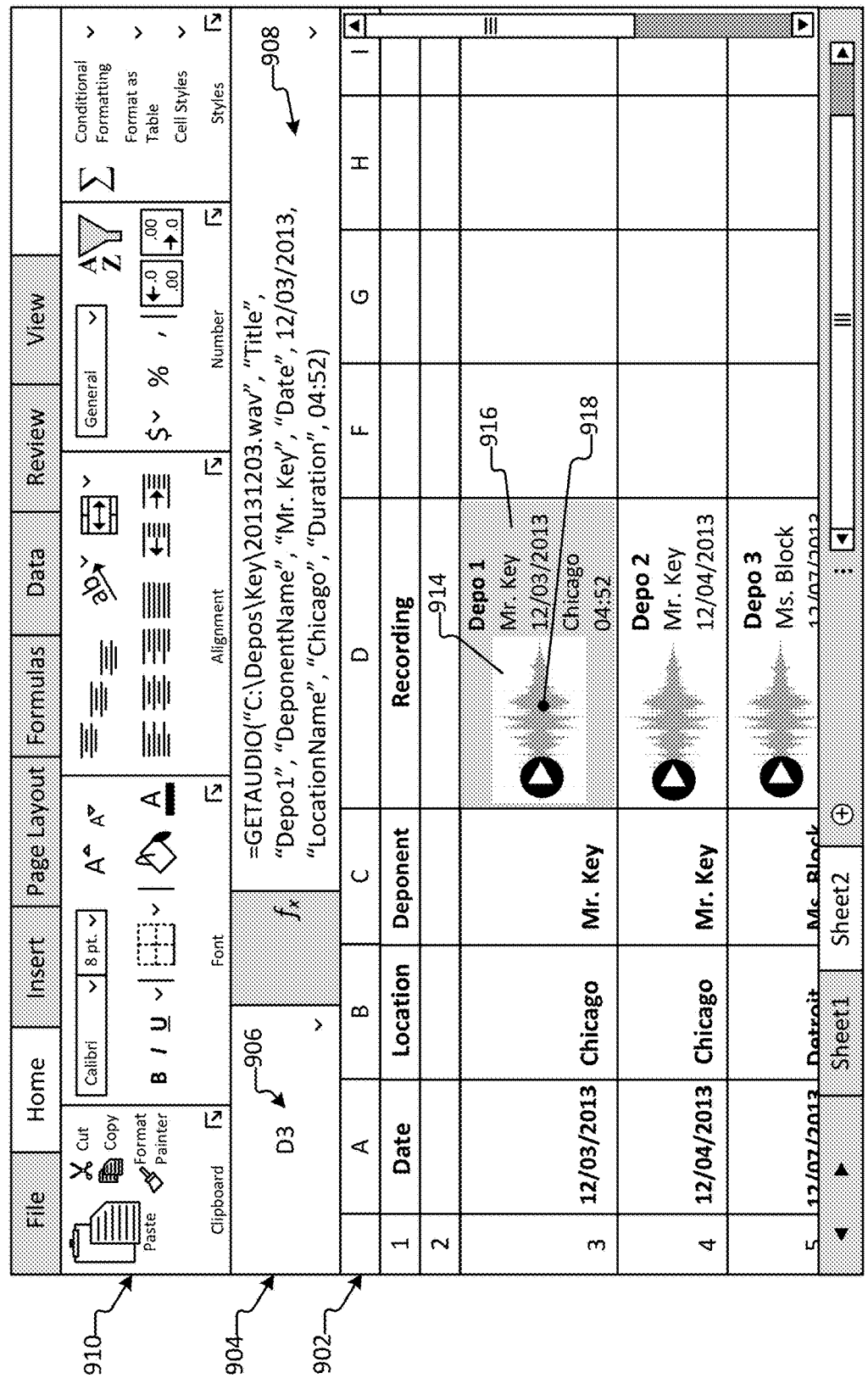
FIG. 9B illustrates an interface showing one or more audio files and additional data associated with one or more cells of a spreadsheet, according to a second example embodiment.

FIG. 9B illustrates an interface showing one or more audio files and additional data associated with one or more cells of a spreadsheet, according to a second example embodiment.

As illustrated, an interface 900 of a spreadsheet application is provided. Interface 900 includes a spreadsheet 902 and a navigation ribbon 904, including a cell identifier 906 and a formula bar 908. As further illustrated, cell D3 is selected, as indicated by background shading of cell D3. However, selection of a cell may be indicated by any suitable means, such as highlighting, perceived three-dimensional enlargement, outlining of the cell border, and the like. As shown, a cell identifier 906 (e.g., "D3") for the selected cell is displayed in navigation ribbon 904.

Similar to cell D3 of FIG. 9A, cell D3 contains both an audio file (e.g., audio file 914) and additional data (e.g., additional data 916). However, cell D3 of FIG. 9B has been resized. In response to resizing cell D3, additional data 916 displays more information regarding audio file 914, e.g., location "Chicago" and duration "04:52." As explained above, in some aspects, the display of additional data 916 may be dynamic. For instance, a minimal amount of additional data may be displayed in a small-sized cell, whereas progressively more additional data may be displayed as the cell is enlarged. For instance, in a small-sized cell, an audio icon may be displayed, indicating that an audio file is associated with the cell. In contrast, as the cell is enlarged, a rendering of a visual representation of the audio file may be displayed along with progressively more additional data, including audio attributes such as file name and creation data/time, and information regarding audio file content, such as a text transcription of the audio file.

In some aspects, audio file 914 and additional data 916 may be associated with a compound data type. In this case, a formula bar 908 for cell D3 may display a function referencing a globally unique name for the compound data type (e.g., the compound data type representing the audio file 914 and the additional data 916) associated with cell D3. Alternatively, formula bar 908 may display a function describing audio file 914 and additional data 916 contained in cell D3. For instance, the function may be represented as: =GETAUDIO("C:\Depos\Key\20131203.wav", "Title", "Depo1", "DeponentName", "Mr. Key", "Date", Dec. 3, 2013, "LocationName", "Chicago", "Duration", "04:52"). Alternatively, the function may be represented in any of the forms identified for FIG. 9A above.

As should be appreciated, the various devices, components, etc., described with respect to FIG. 9B are not intended to limit the systems and methods to the particular components described. Accordingly, additional topology configurations may be used to practice the methods and systems herein and/or some components described may be excluded without departing from the methods and systems disclosed herein.

Figure 9C:
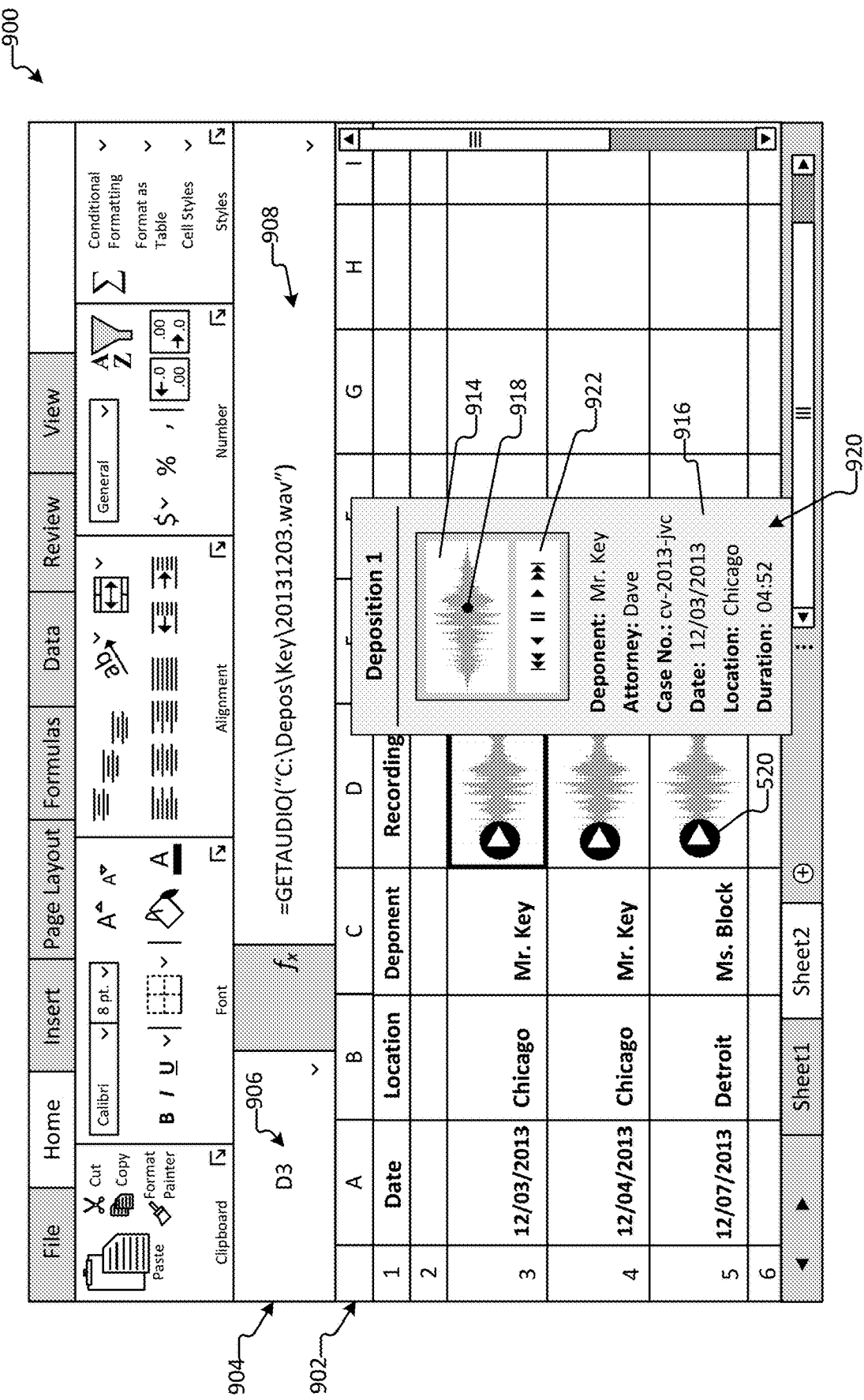
FIG. 9C illustrates an interface showing one or more audio files and additional data associated with one or more cells of a spreadsheet, according to a third example embodiment.

FIG. 9C illustrates an interface showing one or more audio files and additional data associated with one or more cells of a spreadsheet, according to a third example embodiment.

As illustrated, an interface 900 of a spreadsheet application is provided. Interface 900 includes a spreadsheet 902 and a navigation ribbon 904, including a cell identifier 906 and a formula bar 908. As further illustrated, cell D3 is selected, as indicated by thickened and/or colored outlining of the cell border of cell D3. However, selection of a cell may be indicated by any suitable means, such as highlighting, shading, perceived three-dimensional enlargement, and the like. As shown, a cell identifier 906 (e.g., "D3") for the selected cell is displayed in navigation ribbon 904. Additionally, formula bar 908 displays a function calling a file locator (e.g., =GETAUDIO("C:\Depos\Key\20131203.wav")) for the audio file (i.e., audio file 914) displayed within cell D3.

In this case, additional data 916 is not displayed in the same cell as audio file 914. Rather, additional data 916 is displayed in a popup window 920. For example, in response to selecting cell D3 (e.g., by right click, hover over, etc.), popup window 920 may be displayed. Popup window 920 displays a visual representation 918 of audio file 914, along with additional data 916, in an organized and stylized layout. For instance, popup window 920 includes a full title (e.g., "Deposition 1" as opposed to "Depo 1") and a visual representation 918 identifying audio file 914, which is displayed with an interactive play bar 922 providing controls for "fast rewind" (or "skip back"), "rewind," "pause," "play," and "fast forward" (or "skip forward"). Further, additional data 916 includes data descriptors for each piece of information. In this regard, popup window 920 provides a user-friendly interface (e.g., organized and stylized) for viewing additional data associated with audio file 914 upon user selection.

As should be appreciated, the various devices, components, etc., described with respect to FIG. 9C are not intended to limit the systems and methods to the particular components described. Accordingly, additional topology configurations may be used to practice the methods and systems herein and/or some components described may be excluded without departing from the methods and systems disclosed herein.

Figure 10:
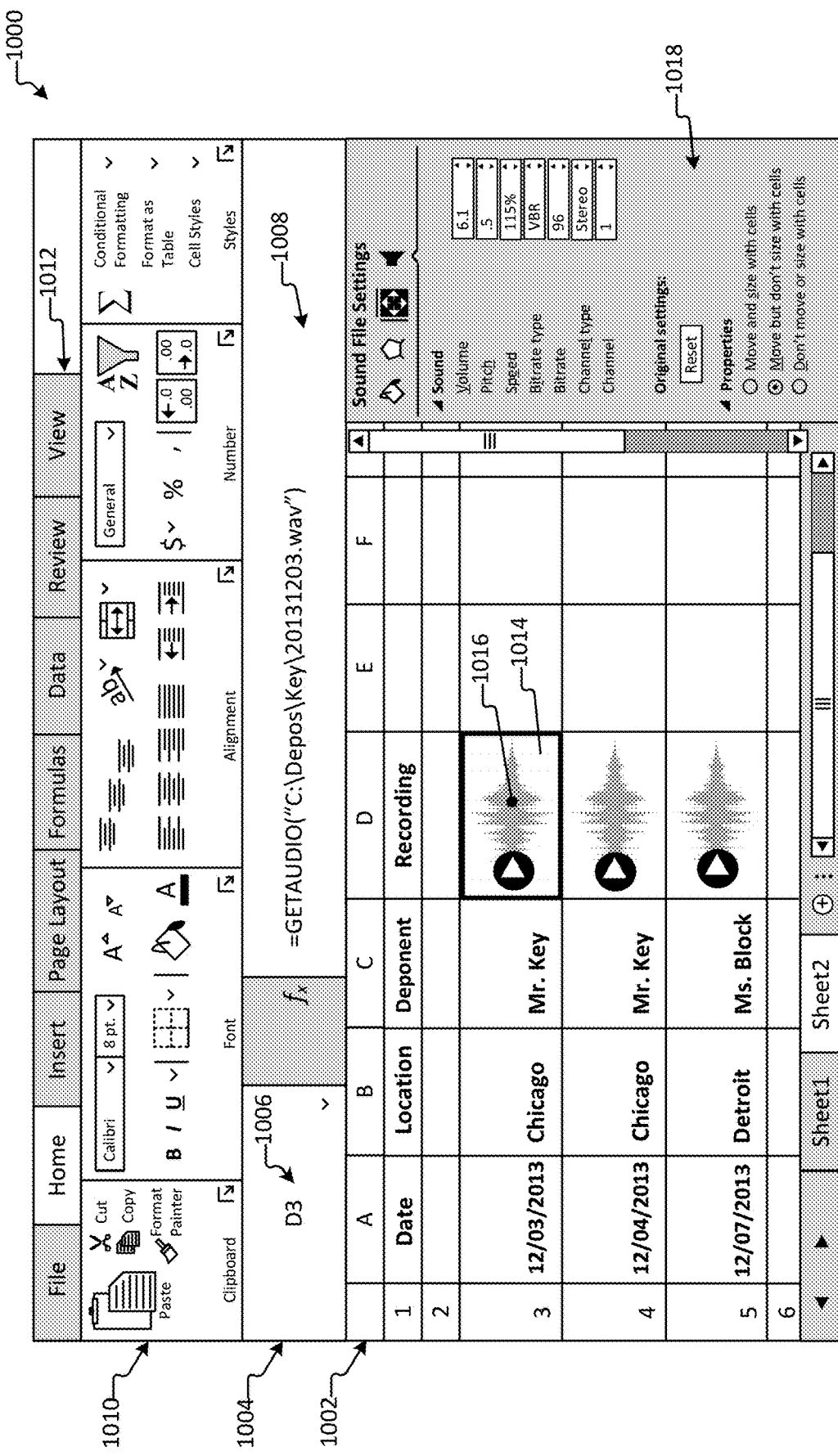
FIG. 10 illustrates an interface showing a settings toolbar for manipulating one or more attributes of an audio file associated with a cell of a spreadsheet, according to an example embodiment.

FIG. 10 illustrates an interface showing a settings toolbar for manipulating one or more attributes of an audio file associated with a cell of a spreadsheet, according to an example embodiment.

As illustrated, an interface 1000 of a spreadsheet application is provided. Interface 1000 includes a spreadsheet 1002 and a navigation ribbon 1004, including a cell identifier 1006 and a formula bar 1008. Interface 1000 further includes a plurality of tabs 1012 for accessing various aspects and operations of the spreadsheet application. As further illustrated, cell D3 is selected, as indicated by thickened and/or colored outlining of the cell border of cell D3. As shown, cell identifier 1006 (e.g., "D3") for the selected cell is displayed in navigation ribbon 1004. Additionally, formula bar 1008 displays a function calling a file locator, e.g., fx=GETAUDIO("C:\Depos\Key\20131203.wav"), for an audio file (i.e., audio file 1014) displayed within cell D3.

In some aspects, in response to selecting a cell that includes an associated audio file, a settings toolbar 1018 (or other interface) may be provided for manipulating the associated audio file. In other aspects, a settings toolbar 1018 may be provided in response to additional input (e.g., a right click) within a selected cell. Settings toolbar 1018 may include a number of tabs for viewing and manipulating various audio attributes. For instance, a sound tab may display audio attributes including "volume," "pitch," "speed," "bitrate type," "bitrate" "channel type," and "channel." Additionally, other tabs associated with settings toolbar 1018 may provide audio attributes, such as resolution, codec, sample rate, frequency, amplitude, duration, creation date/time, and the like (not shown). In some cases, e.g., where both an audio file and additional data are associated with a single cell, settings toolbar 1018 may provide relative attributes between the audio file and the additional data, such as alignment, background opacity or transparency, and the like (not shown). As should be appreciated, any number of audio attributes may be displayed in settings toolbar 1018, or any other suitable interface.

Settings toolbar 1018 may also expose one or more operations for manipulating audio data and/or audio attributes of an associated audio file. For example, input fields and/or UI controls (e.g., +/− controls) may be provided for one or more of the audio attributes displayed by the settings toolbar 1018. In this regard, a user may directly input values for audio attributes and/or adjust audio attributes up or down based on user preference. For instance, with reference to audio attributes displayed by the sound tab above, values for "volume," "pitch," "speed," "bitrate type," "bitrate" "channel type," and/or "channel" may be adjusted by direct input and/or adjusted up or down using +/− controls. Additionally or alternatively, a "reset" button may be provided to return adjusted parameters back to an original version of the audio file. As should be appreciated, the above examples of audio attributes are not exhaustive and any audio attribute may be surfaced and adjusted based on one or more exposed operations.

With reference to sizing a visual representation of an audio file, additional selections may be provided to "move and size" the visual representation with a cell, "move without sizing" the visual representation with a cell, and "don't move or size" the visual representation with a cell. In further aspects, audio data (e.g., modulated data encoding sound wave data) may be surfaced and operations for manipulating the audio data may be exposed to a user (not shown). In this way, audio processing may be enabled for audio files within a spreadsheet. In some cases, some options may be disabled when certain settings are selected. For example, sizing options may be disabled when a "fit to cell" setting is selected. The above examples are provided for purposes of explanation only and should not be understood as limiting. Indeed, any of the operations described herein may be exposed via any suitable user interface for access to a user. In other aspects of the present disclosure, rather than providing a settings toolbar (as illustrated by FIG. 10), a settings ribbon may be provided (not shown). Options available in a settings ribbon (not shown) may include, for instance, editing the audio file (e.g., processing, filtering, etc.), splicing the audio file, and/or adding acoustic effects. Any number of options for enabling operations on audio files associated with cells may be provided in any suitable ribbon, tab, toolbar, and the like.

As should be appreciated, the various devices, components, etc., described with respect to FIG. 10 are not intended to limit the systems and methods to the particular components described. Accordingly, additional topology configurations may be used to practice the methods and systems herein and/or some components described may be excluded without departing from the methods and systems disclosed herein.

FIGS. 11-14 and the associated descriptions provide a discussion of a variety of operating environments in which aspects of the disclosure may be practiced. However, the devices and systems illustrated and discussed with respect to FIGS. 11-14 are for purposes of example and illustration and are not limiting of a vast number of computing device configurations that may be utilized for practicing aspects of the disclosure, as described herein.

Figure 11:
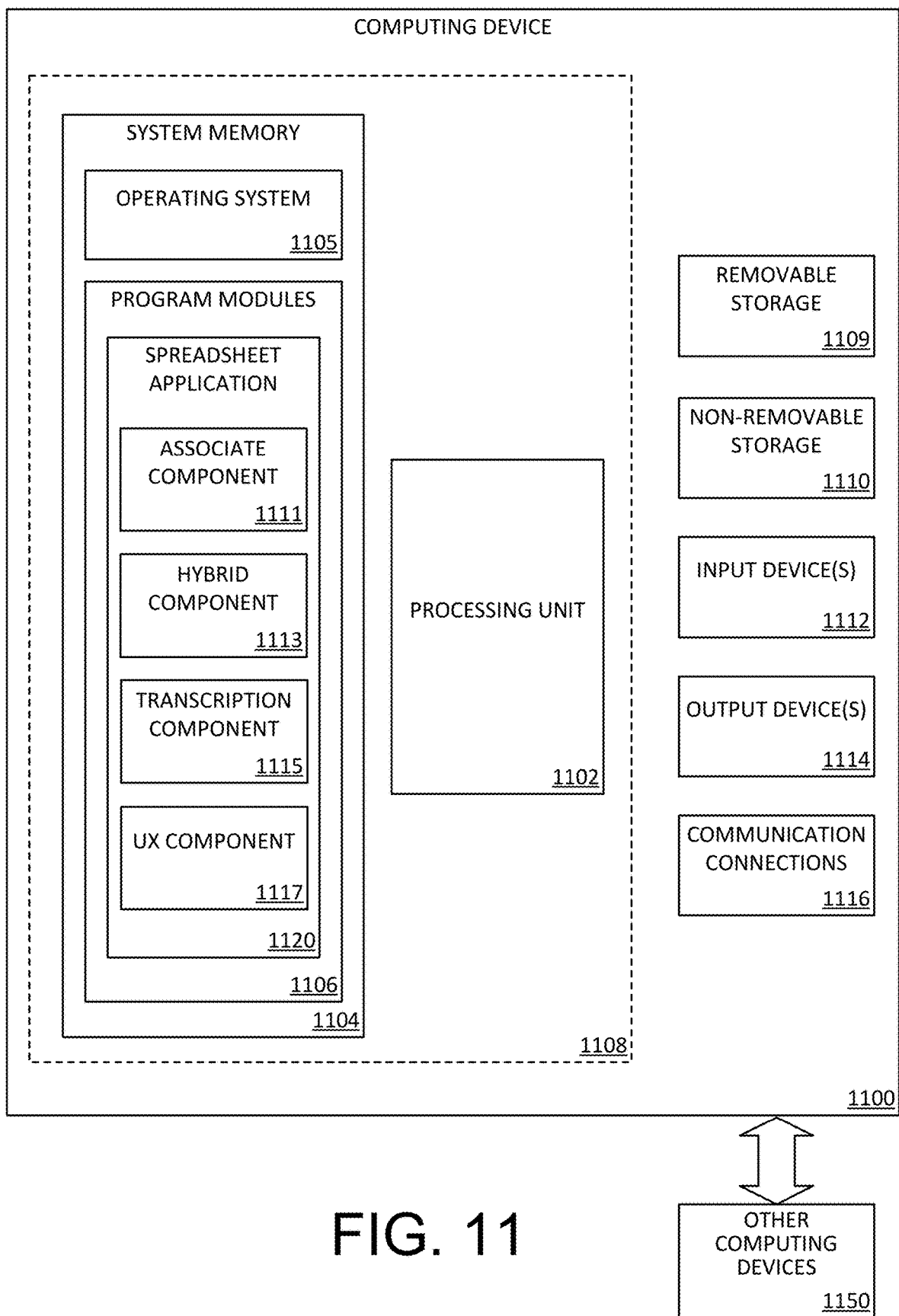
FIG. 11 is a block diagram illustrating example physical components of a computing device with which aspects of the disclosure may be practiced.

FIG. 11 is a block diagram illustrating physical components (e.g., hardware) of a computing device 1100 with which aspects of the disclosure may be practiced. The computing device components described below may have computer executable instructions for implementing a spreadsheet application 1120 on a computing device (e.g., server computing device 108 and/or client computing device 104), including computer executable instructions for spreadsheet application 1120 that can be executed to implement the methods disclosed herein. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running spreadsheet application 1120, such as one or more components with regard to FIG. 1 and, in particular, associate component 1111 (e.g., including associate component 112 and/or attribute component 118), hybrid component 1113 (e.g., corresponding to hybrid component 114), transcription component 1115 (e.g., corresponding to transcription component 116), and/or UX component 1117 (e.g., including operation component 120 and UX component 122).

The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., spreadsheet application 1120) may perform processes including, but not limited to, the aspects, as described herein. Other program modules that may be used in accordance with aspects of the present disclosure, and in particular for associating audio files with cells of a spreadsheet, may include associate component 1111, hybrid component 1113, transcription component 1115, and/or UX component 1117, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media is non-transitory and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12A:
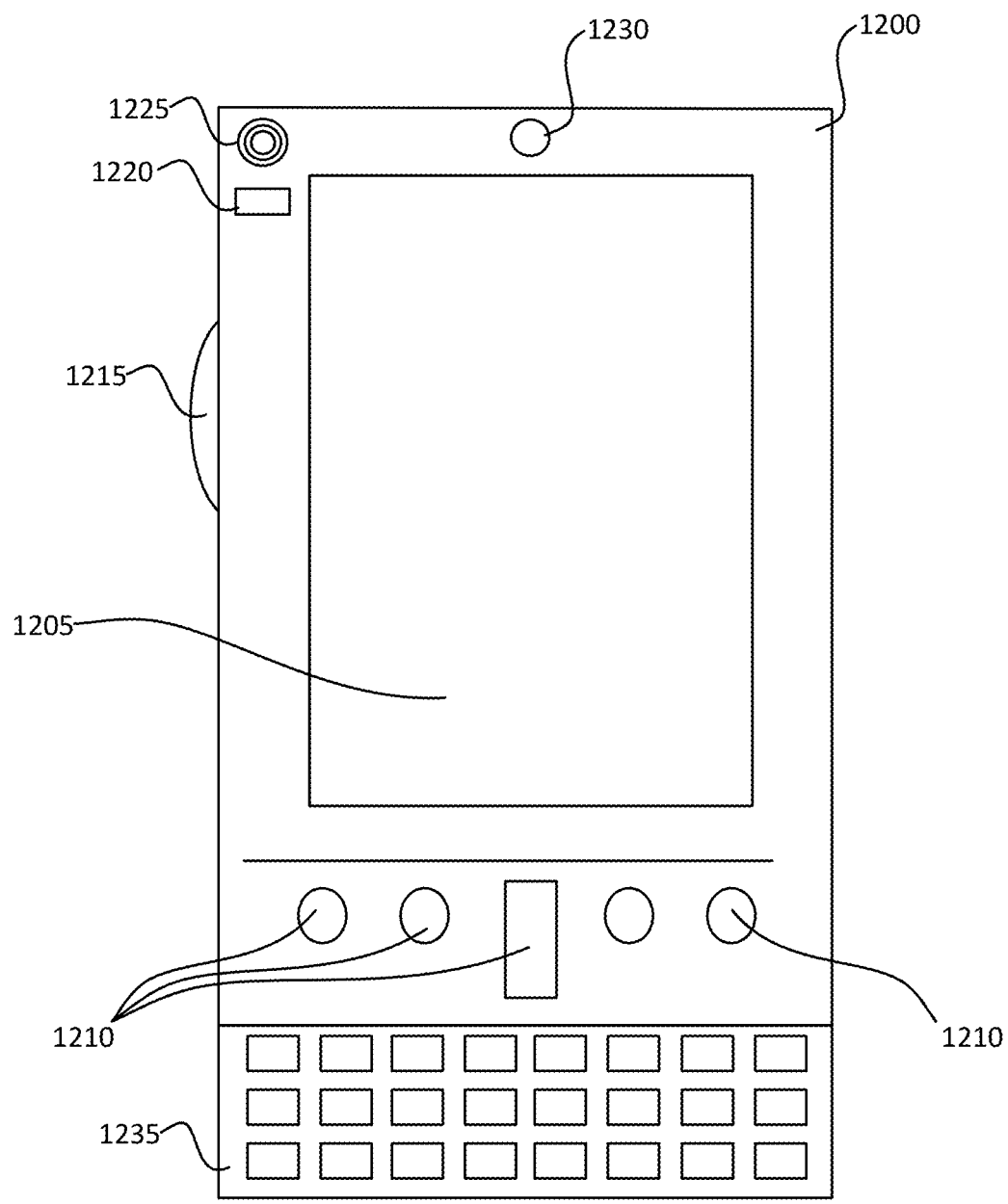
FIGS. 12A and 12B are simplified block diagrams of a mobile computing device with which aspects of the present disclosure may be practiced.
Figure 12B:
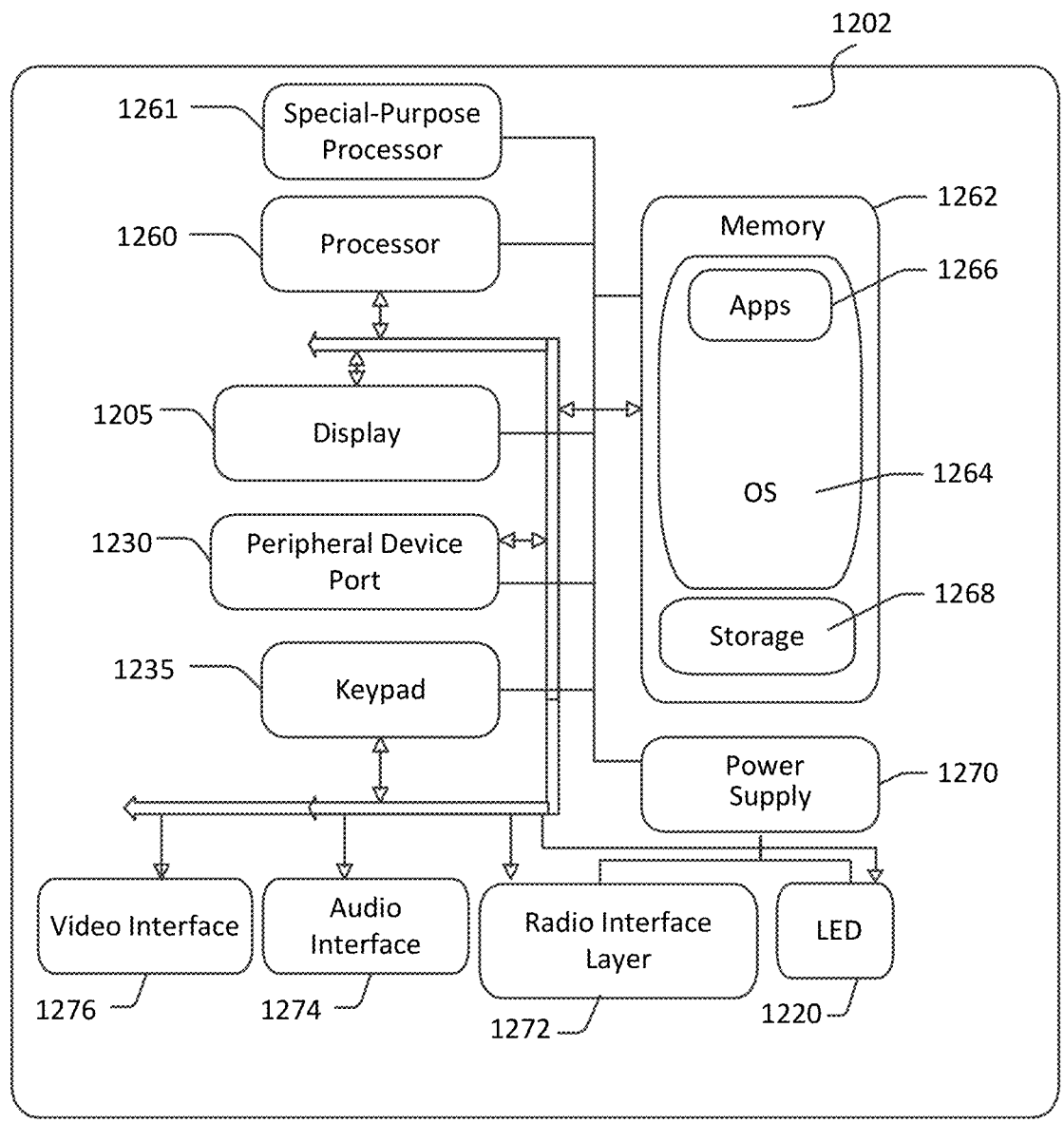

FIGS. 12A and 12B illustrate a mobile computing device 1200, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 12A, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative aspects, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile computing device. That is, the mobile computing device 1200 can incorporate a system (e.g., an architecture) 1202 to implement some aspects. In one embodiment, the system 1202 is implemented as a "smart phone" capable of running one or more applications (e.g., browser, e-mail, calendaring, contact managers, messaging clients, games, and media clients/players). In some aspects, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as email or other messages used by an email application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the instructions for associating one or more audio files with one or more cells of a spreadsheet as described herein (e.g., associate component, hybrid component, transcription component, attribute component, operation component, and/or UX component, etc.).

The system 1202 has a power supply 1270, which may be implemented as one or more batteries. The power supply 1270 may further include an external power source, such as an AC adapter or a powered docking cradle that supplements or recharges the batteries. The system 1202 may also include a radio interface layer 1272 that performs the function of transmitting and receiving radio frequency communications. The radio interface layer 1272 facilitates wireless connectivity between the system 1202 and the "outside world," via a communications carrier or service provider. Transmissions to and from the radio interface layer 1272 are conducted under control of the operating system 1264. In other words, communications received by the radio interface layer 1272 may be disseminated to the application programs 1266 via the operating system 1264, and vice versa.

The visual indicator 1220 may be used to provide visual notifications, and/or an audio interface 1274 may be used for producing audible notifications via an audio transducer 1225 (e.g., audio transducer 1225 illustrated in FIG. 12A). In the illustrated embodiment, the visual indicator 1220 is a light emitting diode (LED) and the audio transducer 1225 may be a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present disclosure, the microphone may also serve as an audio sensor to facilitate control of notifications, as will be described below. The system 1202 may further include a video interface 1276 that enables an operation of peripheral device 1230 (e.g., on-board camera) to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio interface layer 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio interface layer 1272 or via a distributed computing network. Similarly, such data/information may be readily transferred between computing devices for storage and use according to well-known data/information transfer and storage means, including electronic mail and collaborative data/information sharing systems.

As should be appreciated, FIGS. 12A and 12B are described for purposes of illustrating the present methods and systems and are not intended to limit the disclosure to a particular sequence of steps or a particular combination of hardware or software components.

Figure 13:
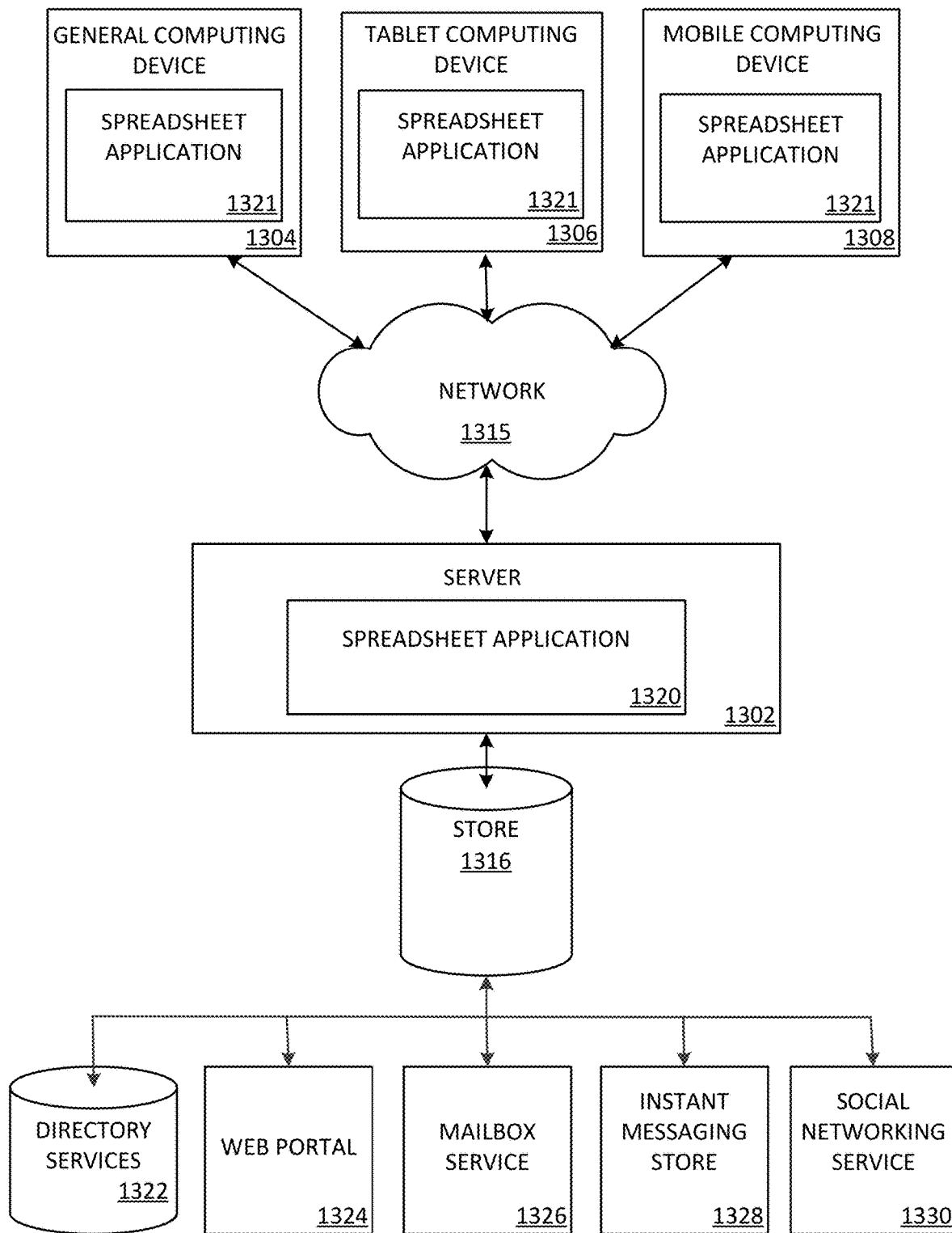
FIG. 13 is a simplified block diagram of a distributed computing system in which aspects of the present disclosure may be practiced.

FIG. 13 illustrates one aspect of the architecture of a system for processing data received at a computing system from a remote source, such as a general computing device 1304 (e.g., personal computer), tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking service 1330. The spreadsheet application 1321 may be employed by a client that communicates with server device 1302, and/or the spreadsheet application 1320 may be employed by server device 1302. The server device 1302 may provide data to and from a client computing device such as a general computing device 1304, a tablet computing device 1306 and/or a mobile computing device 1308 (e.g., a smart phone) through a network 1315. By way of example, the computer system described above with respect to FIGS. 1-12 may be embodied in a general computing device 1304 (e.g., personal computer), a tablet computing device 1306 and/or a mobile computing device 1308 (e.g., a smart phone). Any of these embodiments of the computing devices may obtain content from the store 1316, in addition to receiving graphical data useable to either be pre-processed at a graphic-originating system or post-processed at a receiving computing system.

As should be appreciated, FIG. 13 is described for purposes of illustrating the present methods and systems and is not intended to limit the disclosure to a particular sequence of steps or a particular combination of hardware or software components.

Figure 14:
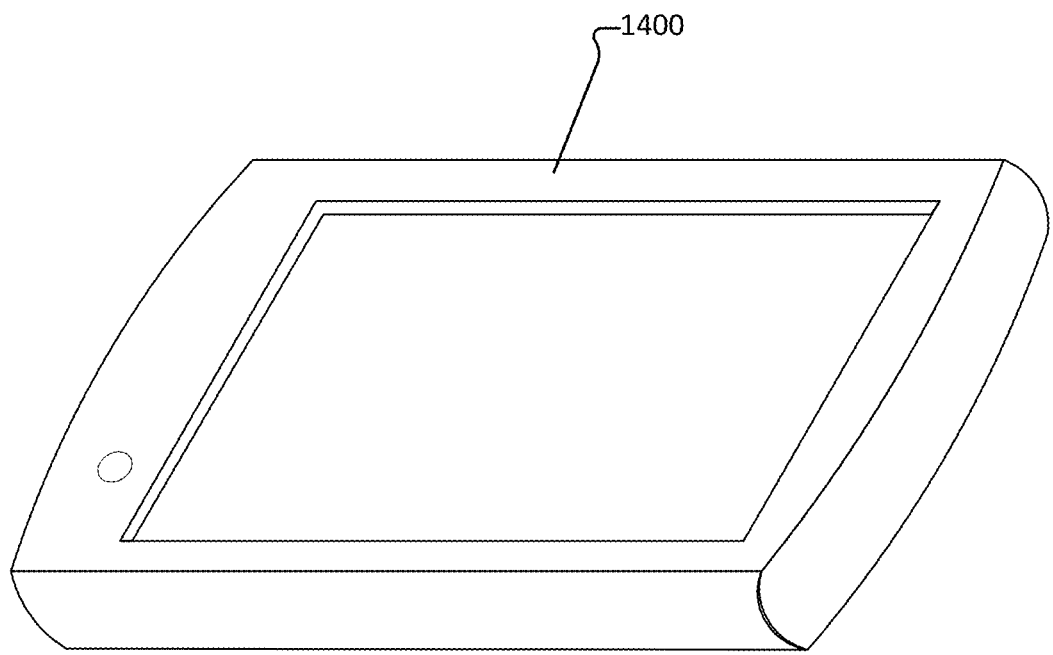
FIG. 14 illustrates a tablet computing device for executing one or more aspects of the present disclosure.

FIG. 14 illustrates an exemplary tablet computing device 1400 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 14 is described for purposes of illustrating the present methods and systems and is not intended to limit the disclosure to a particular sequence of steps or a particular combination of hardware or software components.

Figure 15:
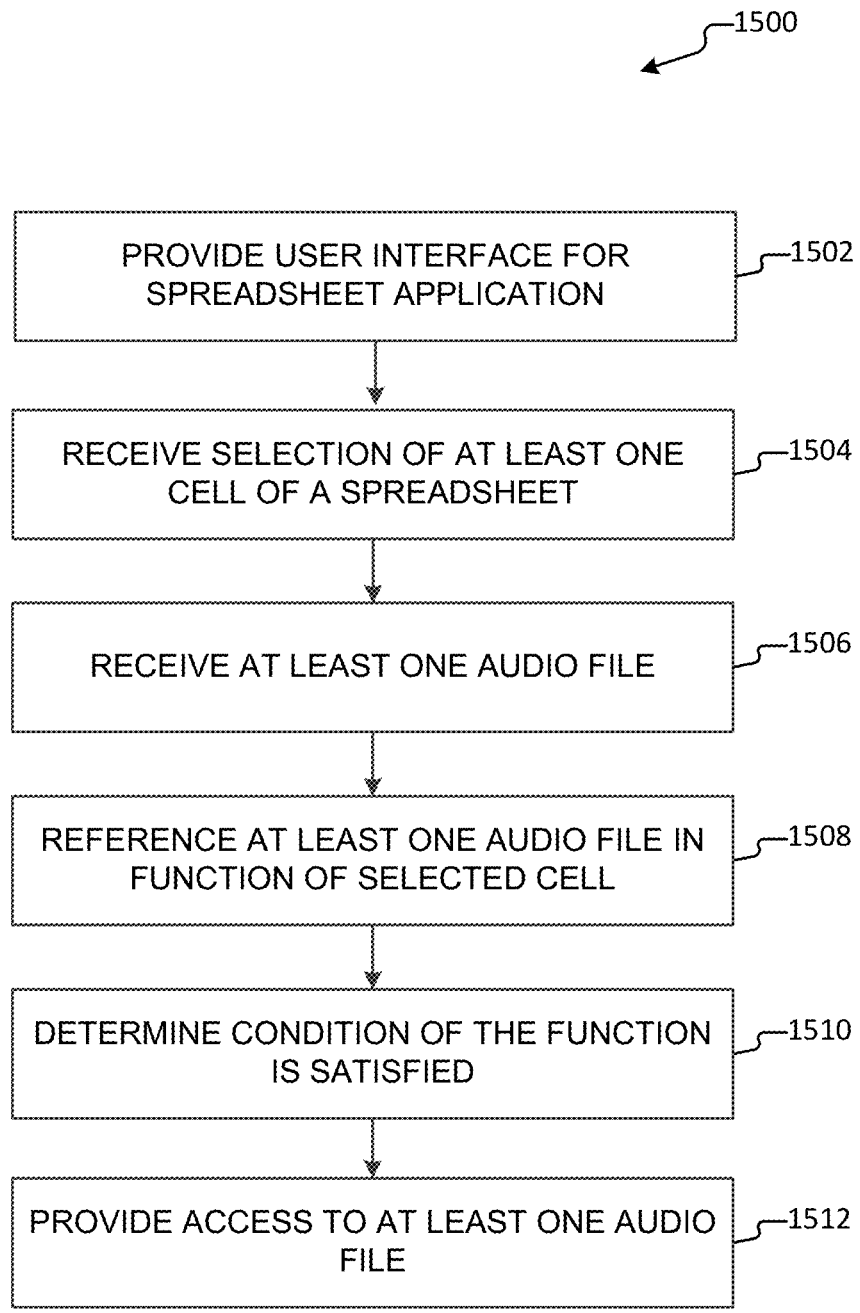
FIG. 15 illustrates a method for referencing one or more audio files in functions of one or more cells of a spreadsheet, according to an example embodiment.

FIG. 15 illustrates a method for referencing one or more audio files in functions of one or more cells of a spreadsheet, according to an example embodiment.

Method 1500 begins with provide interface operation 1502, where a spreadsheet application may provide (or cause to be provided) a user interface to a user. For example, a UX component (e.g., UX component 122) may facilitate a user experience (UX) by providing the user interface of a spreadsheet application (e.g., spreadsheet application 110) via a display. Selections and/or inputs may be received by the user interface based on gestures, touch, mouse movements, keyboard input, and the like. The user interface may operate in conjunction or communication with one or more other components of the spreadsheet application (e.g., associate component 112, hybrid component 114, transcription component 116, attribute component 118, and operation component 120) to reference at least one audio file in a function of at least one cell of the spreadsheet.

At select cell operation 1504, at least one cell of a spreadsheet may be selected, either automatically (e.g., based on a function) or by user selection. That is, in some aspects, operations may call (or select) a cell without requiring user input, e.g., operations such as 'data refresh,' 'import from such and such data source,' 'copy paste,' etc. In other aspects, cells may be selected by highlighting or otherwise identifying the cell or range of cells using a gesture, touch, mouse click, keyboard input, and the like.

At receive audio file operation 1506, at least one audio file may be received for association with the at least one cell, either automatically (e.g., based on a function) or by user selection. In some aspects, in response to a selection of a cell (or a range of cells), a menu may be provided for inserting or associating various objects (including audio files) with the selected cell (or range of cells). In aspects, a user may select a textual document, convert the textual document to an audio file (e.g., by text-to-speech transcription), select the at least one cell and associate the audio file with the selected cell. Alternatively, a user may select a range of values (e.g., within a range of cells), convert the range of values to an audio file (e.g., using a value-to-sound conversion algorithm), select the at least one cell and associate the audio file with the selected cell. Alternatively, a user may select a musical score, convert the musical score (e.g., using optical character recognition (OCR)), select the at least one cell and associate the audio file with the selected cell. Alternatively, a function may calculate a translation from musical score for piano to a musical score for saxophone (e.g., a scale and note translation may result in new values for each note in the music, where the 'result' is the new score). In still further aspects, a user may record the at least one audio file (e.g., via a mobile device) for association with the selected cell. Alternatively, a user may manually enter a cell locator for the at least one audio file into a function associated with the selected cell. Alternatively, a user may copy and paste the audio file into the selected cell and/or drag and drop the audio file into a selected cell. As should be appreciated, the user interface may receive the at least one audio file by any suitable means.

At reference audio file operation 1508, the at least one audio file may be referenced in a function associated with the selected cell. In some aspects, a visual representation of the audio file may be displayed in the at least one cell. In other aspects, a visual representation of the audio file may not be displayed in the least one cell but may float over the grid. In still other aspects, a visual representation of the at least one audio file may not be displayed within the spreadsheet but may be referenced in storage. Reference audio file operation 1508 may be performed by an associate component (e.g., associate component 112) of a spreadsheet application (e.g., spreadsheet application 110). For example, the audio file may be referenced in the selected cell by entering a URL for the audio file within a function, e.g., fx=GETAUDIO("C:\Music\favorites\song1.wav") or fx=GETAUDIO("http://www.music.com/90smix/song1.wav") or by entering a unique name that is global to the spreadsheet, e.g., fx=GETAUDIO("song1.wav"). For example, a unique name for an audio file may be referenced within a formula of the selected cell for performing an operation upon satisfaction of a condition.

At determine operation 1510, it may be determined that a condition of the function is satisfied. For instance, the function may specify that "when revenue hits 'X,' play referenced audio file." In this case, when revenue hits "X" the condition is satisfied. As should be appreciated, any number of conditions may be included in a function and may be satisfied by any suitable means.

At provide operation 1512, access to the at least one audio file may be provided. For instance, the at least one audio file may be automatically played upon satisfaction of the condition. Alternatively, a user interface may be launched that provides one or more play controls for accessing the audio file. In other examples, the at least one audio file may be accessed by sending the audio file in a message or as a voicemail to a user. As should be appreciated, the at least one audio file may be accessed in any suitable way upon satisfaction of the condition.

As should be appreciated, operations 1502-1512 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 16:
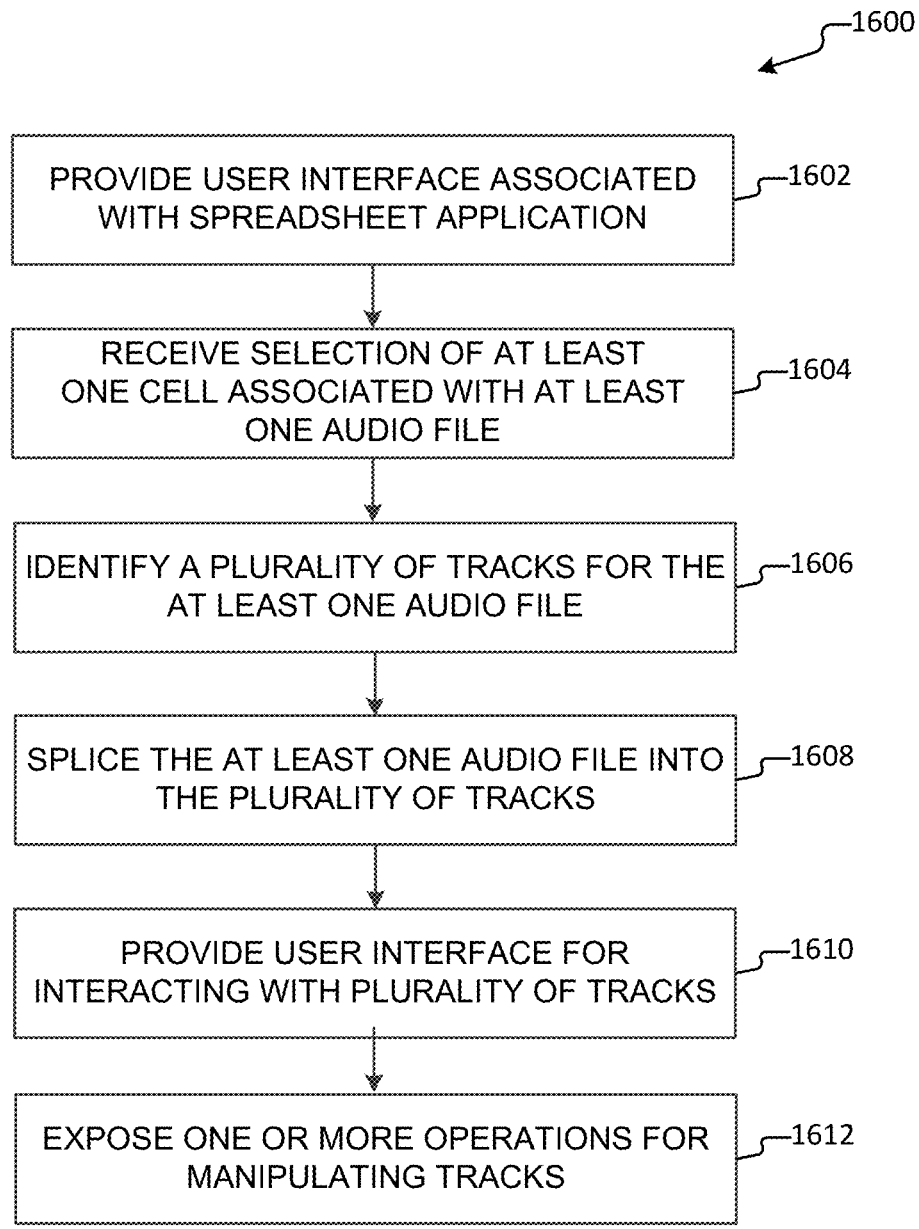
FIG. 16 illustrates a method for splicing an audio file associated with at least one cell of a spreadsheet, according to an example embodiment.

FIG. 16 illustrates a method for splicing an audio file associated with at least one cell of a spreadsheet, according to an example embodiment.

Method 1600 begins with provide interface operation 1602, where a spreadsheet application may provide (or cause to be provided) a user interface to a user. For example, a UX component may facilitate a user experience (UX) by providing a user interface (UI) of a spreadsheet application via a display. Selections and/or inputs may be received by the user interface based on gestures, touch, mouse movements, keyboard input, and the like. Additionally, the user interface may operate in conjunction or communication with one or more other components of the spreadsheet application (e.g., associate component 112, hybrid component 114, transcription component 116, attribute component 118, and operation component 120) to manipulate one or more audio files associated with one or more cells of a spreadsheet.

At select cell operation 1604, at least one cell having at least one associated audio file may be selected, either automatically (e.g., based on a function) or by user selection. In some aspects, operations may call (or select) a cell without requiring user input, e.g., operations such as 'data refresh,' 'import from such and such data source,' 'copy paste,' etc. As detailed above, in other aspects, cells having one or more associated audio files may be selected by highlighting or otherwise identifying the cell or range of cells using a gesture, touch, mouse click, keyboard input, and the like.

At identify tracks operation 1606, one or more tracks may be identified for the at least one audio file associated with the selected cell or range of cells. An audio file may include a number of segments, or tracks, which may be identified by topic (e.g., all tracks including a discussion of a vacation), identified by speaker (e.g., all tracks directed to a particular speaker), directed to a particular loop or wave or sound, etc. As should be appreciated, any number of tracks may be identified for the at least one audio file by any suitable criteria.

At splice operation 1608, the audio file (e.g., of a conversation between multiple individuals) may be sent to a service and an array of audio files (e.g., tracks) may be returned (e.g., including an audio file for each individual's voice identified and extracted from the audio file). In other examples, a single audio file may be divided into multiple tracks (e.g., each track representing a particular loop or wave or sound from the original audio file). As should be appreciated, other examples are possible and may be incorporated according to the methods and systems described herein.

At provide operation 1608, a user interface (UI) element may be provided by a UX component (e.g., UX component 122) in order to display, interact with and/or manipulate the plurality of tracks. For example, the UI element may provide a visual representation for each of the plurality of tracks, which may be displayed in any suitable arrangement (e.g., linear, carousel, grid, etc.) and may overlay additional cells of the spreadsheet for viewing and interacting with the plurality of tracks. A user may interact with the UI element by translating through the plurality of tracks to view, add, delete, edit, or otherwise manipulate one or more of the plurality of tracks.

At expose operation 1612, one or more operations may be exposed to a user in the user interface. The one or more operations may include operations for manipulating parameters of one or more tracks of the audio file. For example, UI controls (e.g., +/− controls) or input fields may be provided for manipulating the one or more parameters, e.g., the audio attributes detailed above. In this regard, a user may directly input values to adjust audio attributes up or down for one or more tracks. For instance, values for "pitch," "volume," "speed," and/or "channel," may be adjusted by direct input and/or adjusted up or down using +/− controls. Additionally, as indicated above, the user interface may provide controls for viewing, adding, deleting, or editing one or more of the plurality of tracks. As should be appreciated, the above examples of operations are not exhaustive and any suitable operation may be exposed.

As should be appreciated, operations 1602-1612 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 17:
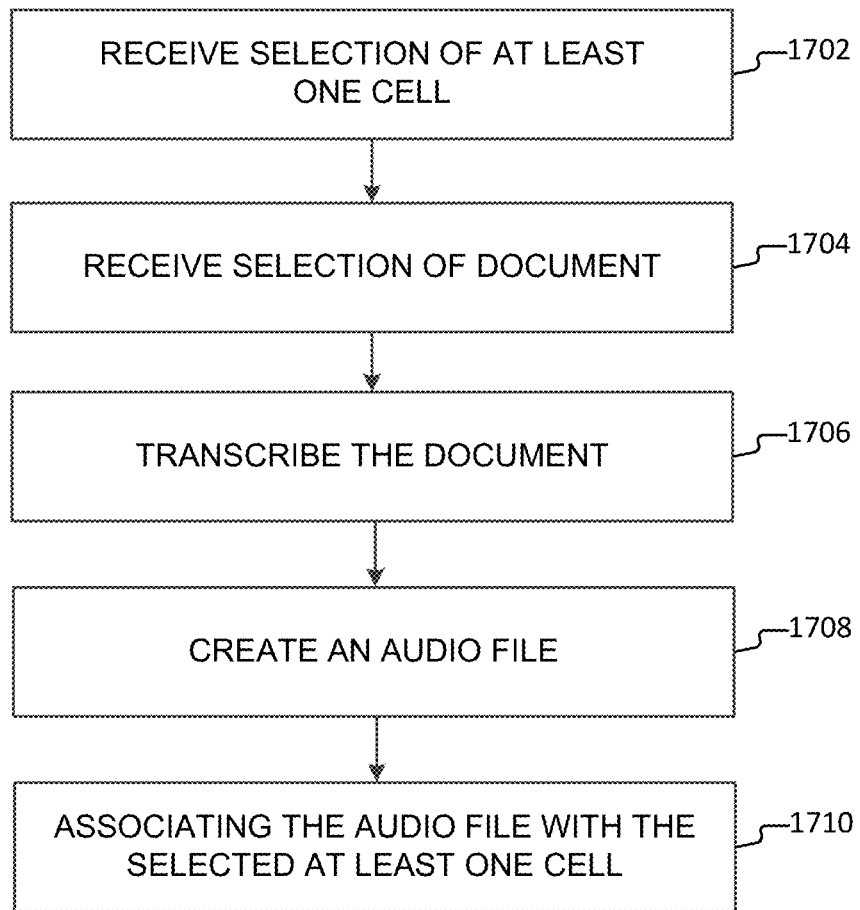
FIG. 17 illustrates a method for creating an audio file and associating the audio file with at least one cell of a spreadsheet, according to an example embodiment.

FIG. 17 illustrates a method for creating an audio file and associating the audio file with at least one cell of a spreadsheet, according to a first example embodiment.

Method 1700 begins with select cell operation 1702, where at least one cell may be selected, either automatically (e.g., based on a function) or by user selection. In some aspects, operations may call (or select) a cell without requiring user input, e.g., operations such as 'data refresh,' 'import from such and such data source', 'copy paste,' etc. As detailed above, in other aspects, cells may be selected by highlighting or otherwise identifying the cell or range of cells using a gesture, touch, mouse click, keyboard input, and the like.

At receive document operation 1704, a document may be received. The document may be a text document, a musical score, a range of values, and the like. As should be appreciated, any type of document may be received.

At transcribe operation 1706, the document may be transcribed, e.g., by a transcription component of a spreadsheet application. In some aspects, the document may be transcribed by a service in communication with a spreadsheet application. For example, spoken words may be generated that correspond to text of the document. Alternatively, sound waves representative of the musical score may be generated based on optical character recognition (OCR) of sheet music. Alternatively, a function may calculate a translation from musical score for piano to a musical score for saxophone (e.g., a scale and note translation may result in new values for each note in the music, where the 'result' is the new score). In some cases, a range of values may be mapped to different pitches and converted into sound using a value-to-sound algorithm, or the like.

At create operation 1708, an audio file may be created from the sound. In some aspects, the audio file may be created by a service in communication with the spreadsheet application. In other aspects, the audio file may be created locally. For example, a textual document may be converted into an audio file, e.g., spoken words may be generated that correspond to the text of the document. Alternatively, a musical score may be converted into an audio file, e.g., sound waves representative of the musical score may be generated. Alternatively, algorithms may be used to convert raw numerical data into an audio file, such as converting different numbers or events to sounds with different pitch. Upon generating sound, an audio file may be created using an analog-to-digital converter (ADC), e.g., using pulse-code modulation. The digital signal may be processed and/or compressed and stored in a file format as an audio file.

At associate operation 1710, the audio file may be associated with the selected cell of the spreadsheet. As described above, an audio file may be associated with a cell by any suitable means.

As should be appreciated, operations 1702-1710 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 18:
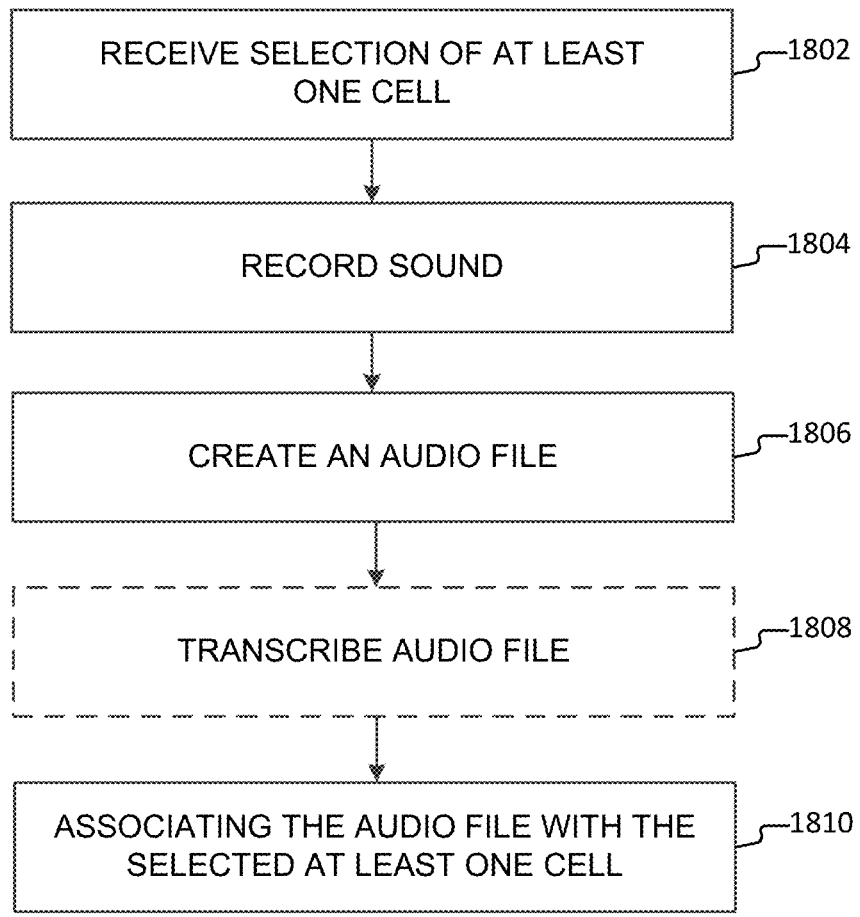
FIG. 18 illustrates a method for creating an audio file and associating the audio file with at least one cell of a spreadsheet, according to a second example embodiment.

FIG. 18 illustrates a method for creating an audio file and associating the audio file with at least one cell of a spreadsheet, according to a second example embodiment.

Method 1800 begins with select cell operation 1802, where at least one cell may be selected, either automatically (e.g., based on a function) or by user selection. In some aspects, operations may call (or select) a cell without requiring user input, e.g., operations such as 'data refresh,' 'import from such and such data source', 'copy paste,' etc. As detailed above, in other aspects, cells may be selected by highlighting or otherwise identifying the cell or range of cells using a gesture, touch, mouse click, keyboard input, and the like.

At record operation 1804, a sound may be recorded. For example, a microphone of a mobile device may record (or capture) sound waves (e.g., of a conversation, music, etc.) and may convert the sound waves into an analog electric signal. As should be appreciated, sound may be recorded by any suitable recording device.

At create operation 1806, an audio file may be created from the recorded sound. For instance, an analog-to-digital converter (ADC) may convert the analog signal into a digital signal, e.g., using pulse-code modulation. In some cases, the ADC may be available on a mobile device, while in other cases the analog signal may be downloaded from the mobile device and converted to a digital signal on another device (e.g., personal or server computing device). The digital signal may be processed and/or compressed and stored in a file format as an audio file.

At optional transcribe operation 1808, the audio file may be transcribed, e.g., by a transcription component of a spreadsheet application. In some aspects, the audio file may be transcribed by a service in communication with a spreadsheet application. For example, spoken words in the audio file may be converted to text (e.g., speech-to-text). Alternatively, sound waves corresponding to music may be transcribed to sheet music.

At associate operation 1810, the audio file may be associated with the selected cell of the spreadsheet. As described above, an audio file may be associated with a cell by any suitable means. Additionally, if a text transcription was performed, the text transcription may optionally be associated with the selected cell or another cell.

As should be appreciated, operations 1802-1810 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processing unit; and
   at least one memory storing computer executable instructions that, when executed by the at least one processing unit, cause the system to perform, steps of:
      receiving at least one audio file;
      extracting a value of a parameter of the at least one audio file;
      storing the value of the parameter and the at least one audio file in a compound data type having a structured format, wherein the compound data type is associated with at least one cell of a spreadsheet;
      exposing one or more spreadsheet operations; and
      based on the value of the parameter, performing a spreadsheet operation of the one or more spreadsheet operations on the at least one cell, wherein the spreadsheet operation relocates the at least one cell and the at least one audio file within the spreadsheet.

2. The system of claim 1, wherein the parameter comprises one of:
   audio data; or
   an audio attribute.

3. The system of claim 2, wherein the audio attribute comprises one of:
   a volume;
   a pitch;
   a speed;
   a resolution;
   a channel; or
   a bitrate.

4. The system of claim 1, wherein the memory further stores computer executable instructions that, when executed by the at least one processing unit, cause the system to further perform the step of providing a user interface with play controls for the at least one audio file.

5. The system of claim 4, wherein the play controls further comprise controls for one or more of:
   playing the at least one audio file;
   pausing the at least one audio file;
   stopping the at least one audio file;
   fast forwarding the at least one audio file; or
   rewinding the at least one audio file.

6. The system of claim 1, wherein the memory further stores computer executable instructions that, when executed by the at least one processing unit, cause the system to further perform the step of providing a toolbar associated with the at least one audio file, the toolbar:
   surfacing the parameter; and
   providing controls for manipulating the parameter.

7. The system of claim 1, wherein the memory further stores computer executable instructions that, when executed by the at least one processing unit, cause the system to further perform the step of displaying a visual representation of the at least one audio file in the at least one cell.

8. The system of claim 7, wherein the spreadsheet operation comprises:
   fitting the visual representation of the at least one audio file to a size of the at least one cell; and
   resizing the visual representation of the at least one audio file when the at least one cell is resized.

9. The system of claim 7, wherein the memory further stores computer executable instructions that, when executed by the at least one processing unit, cause the system to further perform the steps of:
   scrolling to a position on the visual representation of the at least one audio file; and
   playing the at least one audio file from the position.

10. A method for operating on a range of cells within a spreadsheet, the method comprising:
    receiving a plurality of audio files;
    extracting a value of a parameter for each of the plurality of audio files;
    storing the value of the parameter and each audio file in a compound data type having a structured format, wherein each compound data type is associated with at least one cell of the range of cells of the spreadsheet;
    exposing one or more spreadsheet operations based at least in part on the parameter; and
    based on the value of the parameter, performing a spreadsheet operation of the one or more spreadsheet operations on the range of cells, wherein the spreadsheet operation relocates the at least one cell of the range of cells and a corresponding audio file within the spreadsheet.

11. The method of claim 10, wherein the parameter comprises one of:
    audio data; or
    an audio attribute.

12. The method of claim 11, wherein the audio attribute comprises one of:
    a volume;
    a pitch;
    a speed;
    a resolution;
    a channel; or
    a bitrate.

13. The method of claim 10, wherein the spreadsheet operation comprises one of:
    sorting the range of cells based at least in part on the parameter; or
    filtering the range of cells based at least in part on the parameter.

14. The method of claim 10, wherein the spreadsheet operation comprises performing conditional formatting on the range of cells.

15. The method of claim 14, wherein the conditional formatting comprises:
    displaying a heat map over the range of cells, wherein the heat map is based at least in part on the parameter for each of the plurality of audio files.

16. The method of claim 10, further comprising:
    surfacing the parameter for each of the plurality of audio files in a user interface; and
    exposing the one or more operations for manipulating the parameter.

17. The method of claim 10, further comprising:
in response to performing the spreadsheet operation on the range of cells, reordering one or more cells within the range of cells; and
moving a corresponding one of the plurality of audio files that is associated with a reordered cell.

18. The method of claim 10, further comprising:
performing the spreadsheet operation automatically upon satisfaction of a condition.

19. One or more computer storage media storing computer-useable instructions that, when used by one or more computing devices, cause the one or more computing devices to perform steps of:
receiving at least one audio file;
extracting a value of a parameter of the at least one audio file;
storing the value of the parameter and the at least one audio file in a compound data type having a structured format, wherein the compound data type is associated with at least one cell of a spreadsheet;
exposing one or more spreadsheet operations; and
based on the value of the parameter, performing a spreadsheet operation of the one or more spreadsheet operations on the at least one cell, wherein the spreadsheet operation relocates the at least one cell and the at least one audio file within the spreadsheet.

20. The one or more computer storage media of claim 19, further storing the computer-useable instructions that, when used by the one or more computing devices, cause the one or more computing devices to further perform the step of providing a toolbar associated with the at least one audio file, the toolbar:
surfacing the parameter; and
providing controls for manipulating the parameter.

\* \* \* \* \*